(12) United States Patent
Ziran et al.

(10) Patent No.: US 12,090,409 B2
(45) Date of Patent: Sep. 17, 2024

(54) GAME TILE SYSTEM

(71) Applicant: National Entertainment Collectibles Association, Inc., Hilllside, NJ (US)

(72) Inventors: Justin Ziran, San Marcos, CA (US);
Chas Delong, Tacoma, WA (US);
Bryan Kinsella, Chapel Hill, SC (US);
Josh Piezas, Cranford, NJ (US)

( * ) Notice: Subject to any disclaimer, the term of this patent is extended or adjusted under 35 U.S.C. 154(b) by 0 days.

(21) Appl. No.: 17/411,814

(22) Filed: Aug. 25, 2021

(65) Prior Publication Data
US 2022/0040584 A1 Feb. 10, 2022

Related U.S. Application Data

(63) Continuation-in-part of application No. PCT/US2020/026244, filed on Apr. 1, 2020.
(Continued)

(51) Int. Cl.
*A63F 13/65* (2014.01)
*A63F 13/213* (2014.01)
*G06F 3/03* (2006.01)

(52) U.S. Cl.
CPC ............ *A63F 13/65* (2014.09); *A63F 13/213* (2014.09); *G06F 3/03* (2013.01); *A63F 2300/807* (2013.01)

(58) Field of Classification Search
None
See application file for complete search history.

(56) References Cited

U.S. PATENT DOCUMENTS

| | | |
|---|---|---|
| 2,143,667 A | 1/1939 | Troiel |
| 2,320,292 A | 5/1943 | Nelson |

(Continued)

FOREIGN PATENT DOCUMENTS

| | | |
|---|---|---|
| CA | 2515821 A1 | 2/2006 |
| CN | 106457056 A | 2/2017 |

(Continued)

OTHER PUBLICATIONS

Examination Report No. 1 dated May 19, 2022 issued by the Australian Patent Office in connection with Australian Patent Application No. 2020253446 (2 page).
Invitation to Pay Additional Fees and, Where Applicable, Protest Fee of the International Searching Authority mailed Nov. 2, 2021, issued in connection with International Application No. PCT/US21/47552 (2 pages).

(Continued)

*Primary Examiner* — Seng H Lim
(74) *Attorney, Agent, or Firm* — McCarter & English, LLP

(57) ABSTRACT

A tile game system is provided that includes a plurality of two-dimensional and three-dimensional components. The two-dimensional components can include a plurality of modular tiles provided in various sizes and configurations that can be joined together to form a grid-based gameplay area. The three-dimensional components can include external boundaries for the gameplay area, internal boundaries, terrain elements such as columns and staircases, and game figures. According to aspects of the present disclosure, the external and internal boundaries can be provided with recessed sections that allow a game figure to be contained within a single grid square and prevent the grid of the gameplay area from becoming warped. According to some aspects of the present disclosure the internal and external boundaries can be illuminated and provided with removable and interchangeable light-permeable skins that allow a user to switch between various illuminated designs.

15 Claims, 72 Drawing Sheets

Related U.S. Application Data

(60) Provisional application No. 63/171,303, filed on Apr. 6, 2021, provisional application No. 63/069,954, filed on Aug. 25, 2020, provisional application No. 62/950,576, filed on Dec. 19, 2019, provisional application No. 62/827,821, filed on Apr. 1, 2019.

(56) References Cited

U.S. PATENT DOCUMENTS

| | | | |
|---|---|---|---|
| 2,461,535 A | | 2/1949 | Erhardt |
| 4,057,253 A | | 11/1977 | Csoka |
| 4,545,582 A | * | 10/1985 | Andrews ............. A63F 3/00643 273/249 |
| 4,696,476 A | | 9/1987 | Eplett |
| 5,231,876 A | * | 8/1993 | Peet, II ...................... G01P 5/07 73/861.85 |
| 5,251,904 A | * | 10/1993 | Cruz ................... A63F 3/00643 273/238 |
| 5,683,087 A | | 11/1997 | Henshaw et al. |
| 7,766,335 B1 | * | 8/2010 | Greenawalt ......... A63F 3/00006 273/241 |
| 7,934,724 B1 | * | 5/2011 | Esquivel ............. A63F 3/00075 273/287 |
| 8,602,857 B2 | * | 12/2013 | Morichau-Beauchamp .................. A63F 3/00643 463/9 |
| 8,827,270 B1 | * | 9/2014 | Fiore ................... A63F 3/00697 273/287 |
| 8,951,088 B2 | * | 2/2015 | Binder .................. A63F 9/1044 446/124 |
| 9,061,216 B1 | * | 6/2015 | Hooper ..................... A63H 3/28 |
| 9,684,483 B2 | * | 6/2017 | Ekkaia ....................... F21S 8/03 |
| 10,035,061 B1 | * | 7/2018 | Huffman ............. A63F 3/00075 |
| 10,857,450 B1 | * | 12/2020 | Aman .................. A63F 13/213 |
| 10,881,948 B2 | | 1/2021 | Ziran et al. |
| 2003/0077975 A1 | | 4/2003 | Barringer et al. |
| 2004/0051244 A1 | | 3/2004 | Weisman |
| 2005/0116667 A1 | * | 6/2005 | Mueller ................... E04F 15/02 315/312 |
| 2005/0143173 A1 | * | 6/2005 | Barney .................. A63H 30/04 463/37 |
| 2006/0033273 A1 | | 2/2006 | Borne et al. |
| 2006/0043674 A1 | | 3/2006 | Van Ness |
| 2006/0131989 A1 | | 6/2006 | Daftari |
| 2006/0154726 A1 | * | 7/2006 | Weston ................... A63F 13/90 463/36 |
| 2007/0281580 A1 | | 12/2007 | Sambenedetto |
| 2009/0184468 A1 | * | 7/2009 | Huang ................... H02J 50/10 307/17 |
| 2009/0315258 A1 | * | 12/2009 | Wallace .............. A63F 3/00643 273/238 |
| 2010/0192698 A1 | * | 8/2010 | Hansen ............. B60R 21/01516 73/779 |
| 2011/0042894 A1 | * | 2/2011 | Rylander ............ A63F 3/00643 273/237 |
| 2011/0175287 A1 | | 7/2011 | Lin |
| 2017/0056758 A1 | * | 3/2017 | Baxter ...................... A63F 3/02 |
| 2017/0266558 A1 | * | 9/2017 | Rath ....................... A63F 13/60 |
| 2018/0229141 A1 | | 8/2018 | Miller |
| 2019/0009168 A1 | * | 1/2019 | Aman .................. A63F 3/00643 |
| 2019/0022520 A1 | * | 1/2019 | Leeming ................ A63F 13/28 |
| 2019/0143204 A1 | * | 5/2019 | Aman ..................... A63F 13/50 463/31 |
| 2020/0306618 A1 | | 10/2020 | Ziran et al. |
| 2020/0376366 A1 | * | 12/2020 | Patterson ............ A63F 3/00643 |

FOREIGN PATENT DOCUMENTS

| | | |
|---|---|---|
| CN | 206295607 U | 7/2017 |
| CN | 108367204 A | 8/2018 |
| GB | 26707 | 4/1913 |
| GB | 2204244 A | 11/1988 |
| JP | 2004065899 A | 3/2004 |
| WO | 96/20033 A1 | 7/1996 |

OTHER PUBLICATIONS

Supplementary European Search Report dated Nov. 9, 2022 issued by the European Patent Office in connection with European Patent Application No. 20784704.7 (6 pages).
First Office Action, along with an English translation, dated Oct. 13, 2022, issued by the China National Intellectual Property Administration issued in connection with Chinese Patent Application No. 202080040491.6 (11 pages).
International Search Report of the International Searching Authority mailed on Jan. 18, 2022, issued in connection with International Application No. PCT/US21/47552 (5 pages).
Written Opinion of the International Searching Authority mailed on Jan. 18, 2022, issued in connection with International Application No. PCT/US21/47552 (5 pages).
International Search Report of the International Searching Authority mailed on Jun. 24, 2020, issued in connection with International Application No. PCT/US20/26244 (3 pages).
Written Opinion of the International Searching Authority mailed on Jun. 24, 2020, issued in connection with International Application No. PCT/US20/26244 (9 pages).
Edwards, "WarLock Tiles Advances Starter Set—WizKids," PHD Games, Sep. 18, 2019 https://www.phdgames.com/warlock-tiles-starter-sets-wizkids/ (3 pages).
"Dragonlock Ultimate: Dungeon Starter Set FDG0160," Fat Dragon Games, Mar. 9, 2019, https://web.archive.org/web/20190309032149/http://www.fatdragongames.com/fdgfiles/?page_id-2658 (7 pages).
Notice of Allowance mailed Sep. 4, 2020, issued in connection with U.S. Appl. No. 16/837,862 (10 pages).
Office Action, along with an English translation, mailed Feb. 20, 2024, issued by the Japanese Patent Office issued in connection with Japanese Patent Application No. 2023-513776 (10 pages).

* cited by examiner

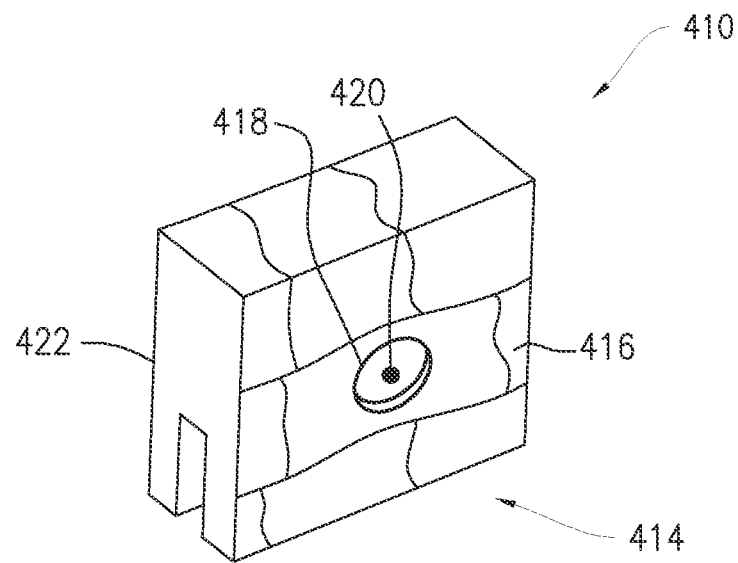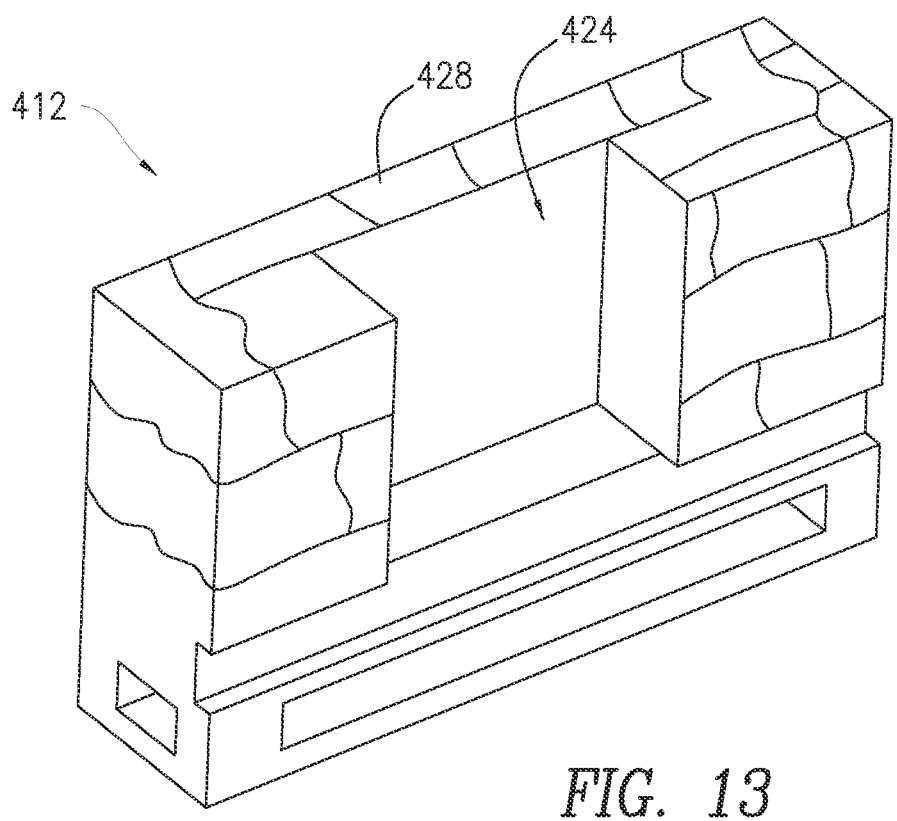
FIG. 13

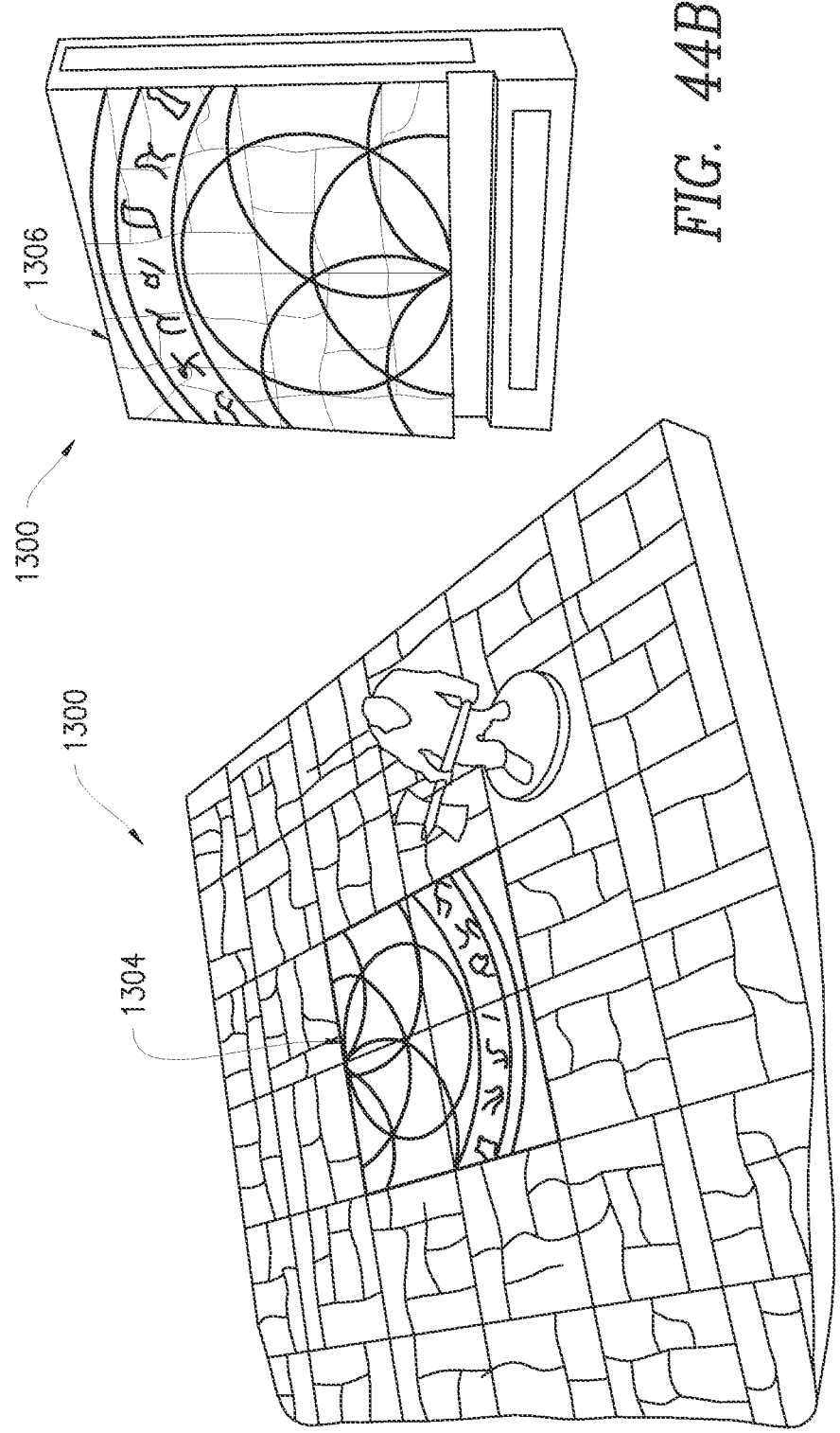

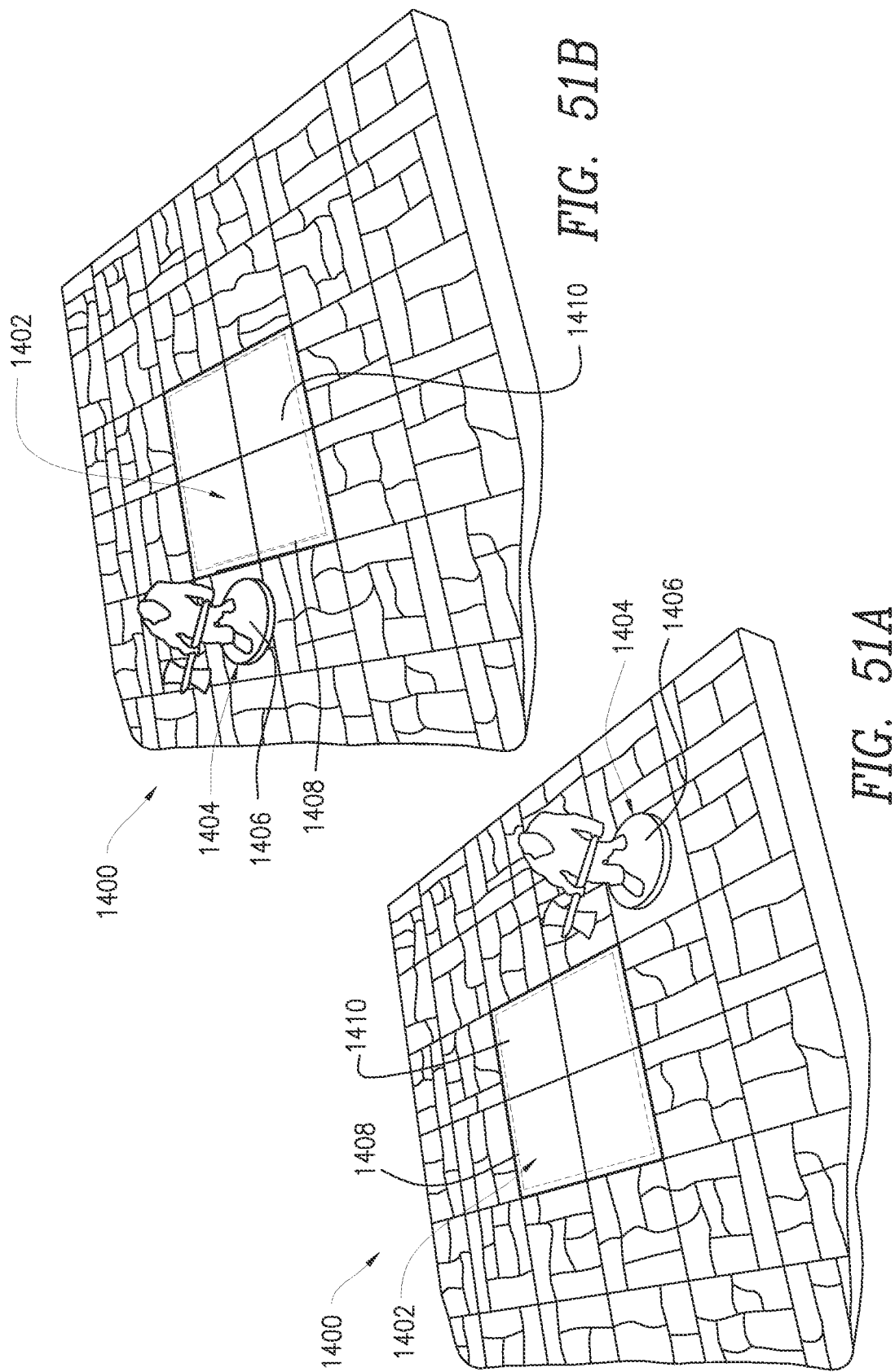

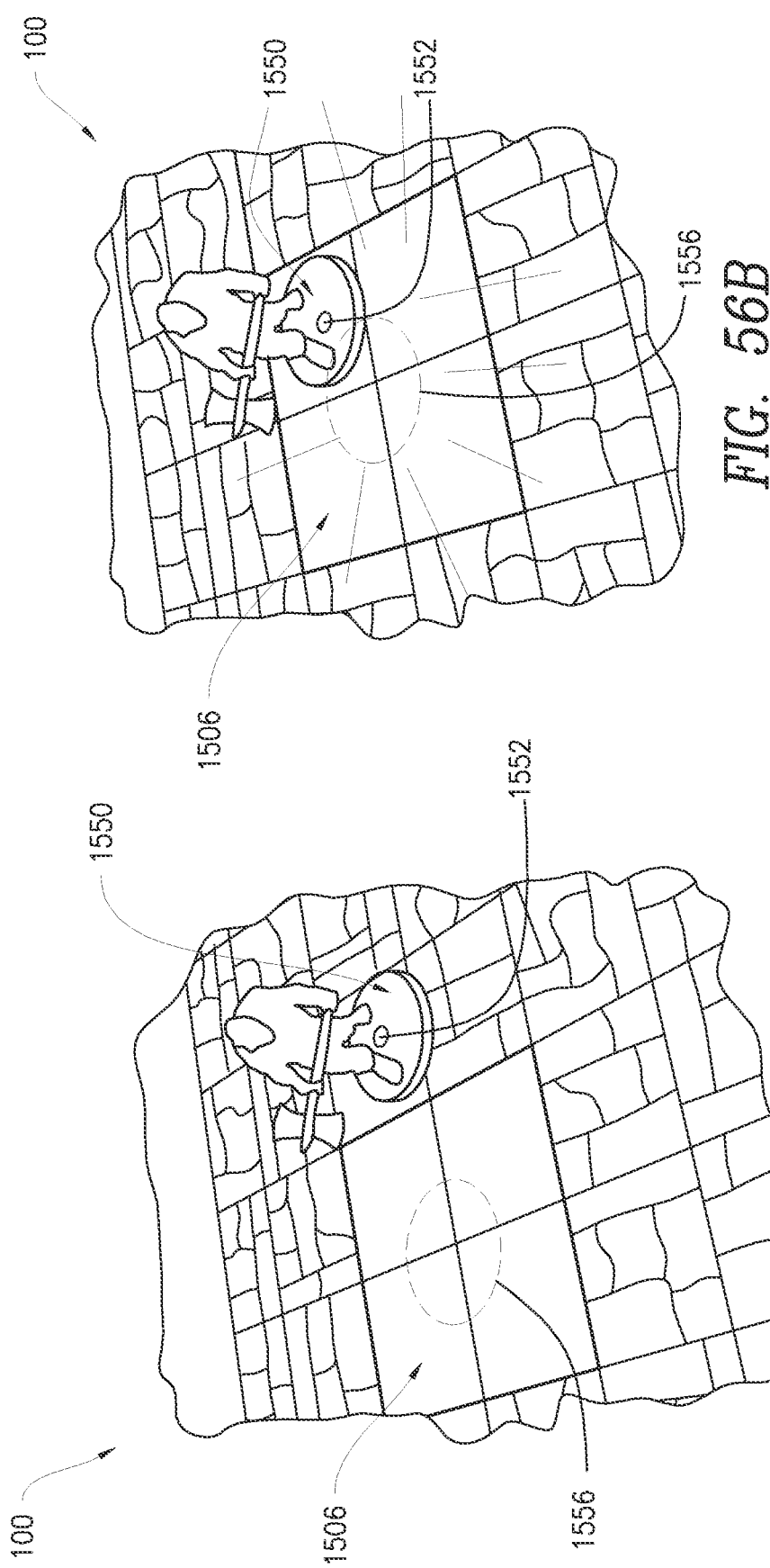

GAME TILE SYSTEM

CROSS-REFERENCE TO RELATED APPLICATIONS

This application claims the benefit of U.S. Provisional Patent Application No. 63/069,954, filed Aug. 25, 2020, and U.S. Provisional Application No. 63/171,303, filed Apr. 6, 2021. This application is also is a continuation-in-part of International Application No. PCT/US2020/026244, filed Apr. 1, 2020, which claims priority to U.S. Provisional Application No. 62/827,821, filed Apr. 1, 2019, and U.S. Provisional Application No. 62/950,576, filed Dec. 19, 2019. The entire disclosures of which are hereby expressly incorporated by reference.

BACKGROUND

Field of the Disclosure

The present disclosure relates to a customizable game board tile system that allows the construction of a grid layout across a playable area.

Related Art

In the realm of role-playing games ("RPG"), a square-gridded map or board is often used as the environment in which play is conducted. This consistent and repeating square-grid creates the world that establishes relative position of all players—much the same way a chess board establishes possible positions of play. Two players who are X squares away from each may interact only by the rules governing the X interval. As RPG entertainment has evolved, game environments have advanced from one-dimensional paper-based maps to sophisticated three-dimensional ("3D") simulations of natural topographies, landscapes, and architectures—particularly dungeons—defined as an interior space with rooms, hallways, hidden rooms, hidden passages, etc. In the last example of architectures, it is the creation of physical 3D walls (defined as things that separate) that—while advancing the immersive experience of RPG play, has warped the continuity of the square-gridded map world that is the fabric of excruciatingly detailed game play. Walls (and other separating things such as doors and windows)—whether on the border of the tile grid and table, or internal to the tile grid—creating hall ways, rooms, building exteriors, fences and other structures where a clear delineation of one side and the other side is required, impose a real physical thickness forcing itself on a three-dimensional square-grid. In paper maps, a wall, or boundary, is a decorated line that can be imagined and re-imagined as needed. In sophisticated 3D environments, boundaries, as they are currently executed—if not the width of the square-grid, either subtract space from the adjacent grid squares OR expand the grid by some arbitrary measurement not in line with the natural space of the game. For a game paying special attention to detail—real or fantastic, the inability for game pieces to occupy the space—the grid squares, they rightfully should can cause play inconsistencies as much as physical piece placement problems; often inciting the passions of a very committed game community.

Accordingly, what is needed, but has not been developed, is a grid-based three-dimensional game system that provided for the creation of three-dimensional internal barriers, without adversely impacting the continuity of the grid-based game area.

SUMMARY

The present disclosure relates to a game tile system addressing a modularly customizable play-space created via maintenance of a rectilinear grid layout. The square or rectangular grid layout can be consistent and uninterrupted throughout the customizable play-space. The architecture of the play space utilizes a boundary mechanism for the secure attachment of modular boundaries to a modular tile base such that the base of a game-piece may fully occupy the grid-square adjacent to the boundary. It also establishes a continuous square grid via a boundary locking mechanism with a limited horizontal fluctuation to the square grid created by three-dimensional interlocking tiles.

BRIEF DESCRIPTION OF THE DRAWINGS

The foregoing features of the disclosure will be apparent from the following Detailed Description, taken in connection with the accompanying drawings, in which:

FIG. 13 is an exploded view of the illuminated external boundary of FIG. 12;

FIGS. 44A and 44B are perspective views of a repurposable illuminated tile system according to the present disclosure;

FIGS. 51A, 51B and 51C illustrate operation of a magnetically activated repurposable illuminated tile system according to the present disclosure;

FIG. 56A is a perspective view of components of the tile game system of the present disclosure arranged in an exemplary configuration including an illuminated tile unit in a deactivated state;

FIG. 56B is a perspective view illustrating the illuminated tile unit of FIG. 56A in an activated state;

DETAILED DESCRIPTION

The present disclosure relates to a customizable game board tile system that allows the construction of a grid layout across a playable area. The present disclosure is not limited to embodiments having specific dimensions. Thus, any dimensions provided herein are exemplary and are not intended to limit the scope of the present disclosure.

Figure 1:
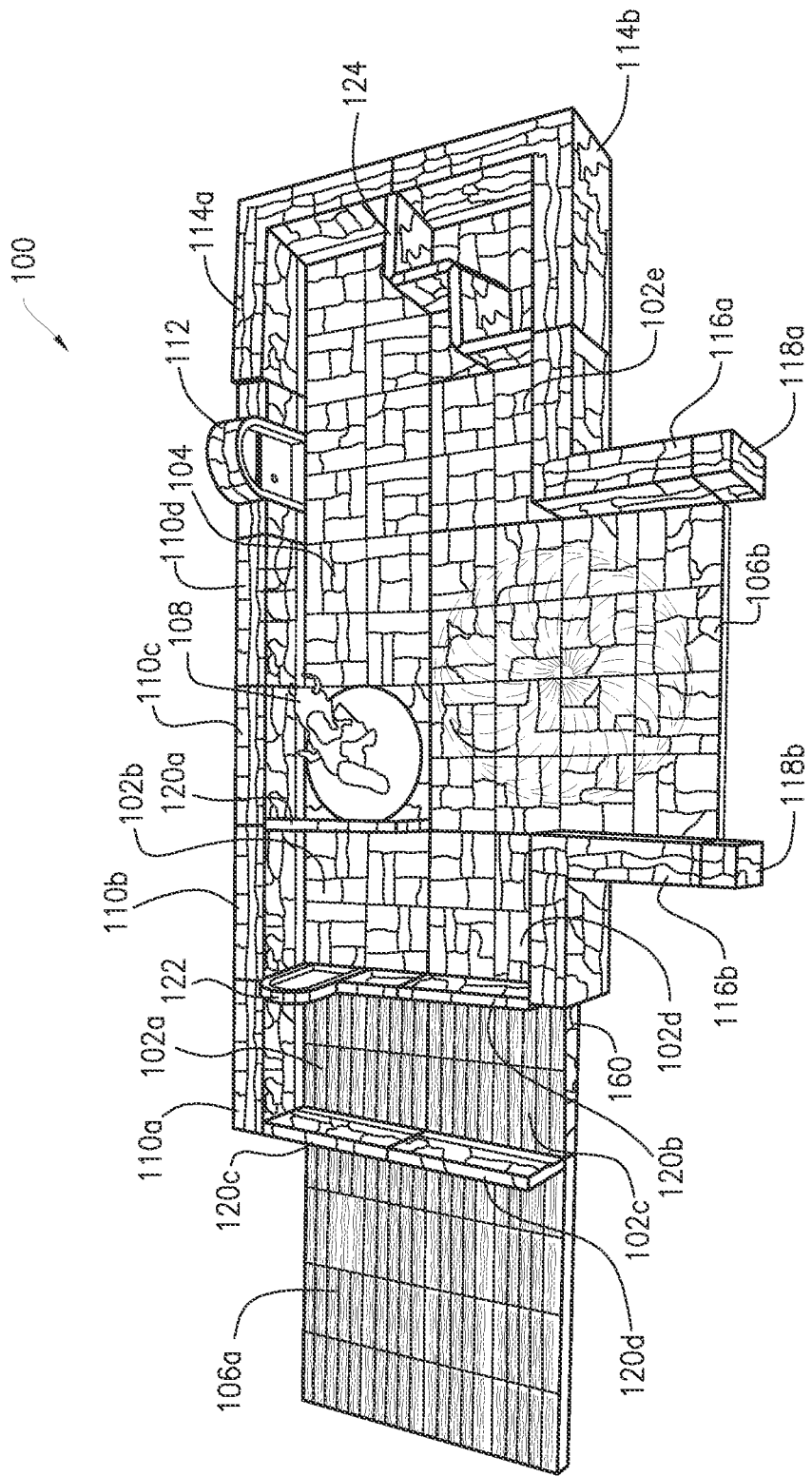
FIG. 1 is a perspective view of components of a tile game system, assembled in an exemplary configuration, according to the present disclosure.

FIG. 1 is a perspective view of an exemplary tile game system, indicated generally at 100, of the present disclosure. The tile game system 100 includes a plurality of modular components that can be arranged to form a customized playable area. One or more game FIG. 108 and/or game components 188 (see FIG. 21) can be positioned within the customized playable area and moved by users (e.g., players) during gameplay.

The components include a plurality of tiles, provided in various sizes and configurations, which can be connected to form a continuous grid-based playing surface. The components can also include external boundaries, internal boundaries, and other gameplay elements. As shown in FIG. 1, the tile game system 100 can include 2×2 tiles 102a-d, one or more 2×8 tiles 104, and one or more 4×4 tiles 106a and 106b. The 2×2 tiles 102a-d can represent a base unit, with other tiles of the game system 100 having dimensions that can represent multiples of the base unit. For example, a 2×8 tile can have the same dimensions as four (4) 2×2 tiles arranged alongside each other (e.g., in a row) and a 4×4 tile can have the same dimensions as four (4) 2×2 tiles arranged in a square pattern. As such, any number of the tiles disclosed herein can be arranged to form a continuous repeating grid pattern having a 1×1 base unit (e.g., a grid square 150, shown in FIG. 4). The given dimensions of the tiles (e.g., 1×1, 1×4, and 2×2) represent arbitrary units and could represent any real-world dimension. Of course, the tiles do not have to form a grid with square base units and tiles of other shapes (e.g., rectangles, triangles, hexagons, etc.) can be used to form a continuous grid pattern for the playing surface. Additionally, the tiles of the present disclosure can include other shapes having non-linear sides (e.g., curves), a mixture of linear and non-linear sides, and can be three dimensional (e.g., not being a flat tile). For example, one or more tiles of the present disclosure can be formed as tunnels that represent naturally occurring cave systems. Furthermore, the tile game system 100 of the present disclosure can include tiles having one or more configurations. As such, tiles having linear sides and forming a rectilinear grid pattern (e.g., as shown in FIG. 1) can be joined with tiles having curved sides that do not form a rectilinear, or any other, grid pattern.

As shown in FIG. 1, the components can also include, but are not limited to, one or more external boundaries 110a-d, external boundaries with design features (e.g., doors, windows, wall treatments, etc.) 112, exterior wall corners 114a and 114b, interior wall corners 116a and 116b, exterior boundary caps 118a and 118b, interior boundaries 120a-d, interior boundaries with design features (e.g., doors, windows, wall treatments, etc.) 122, and adjustable internal boundaries 124.

Figure 2:
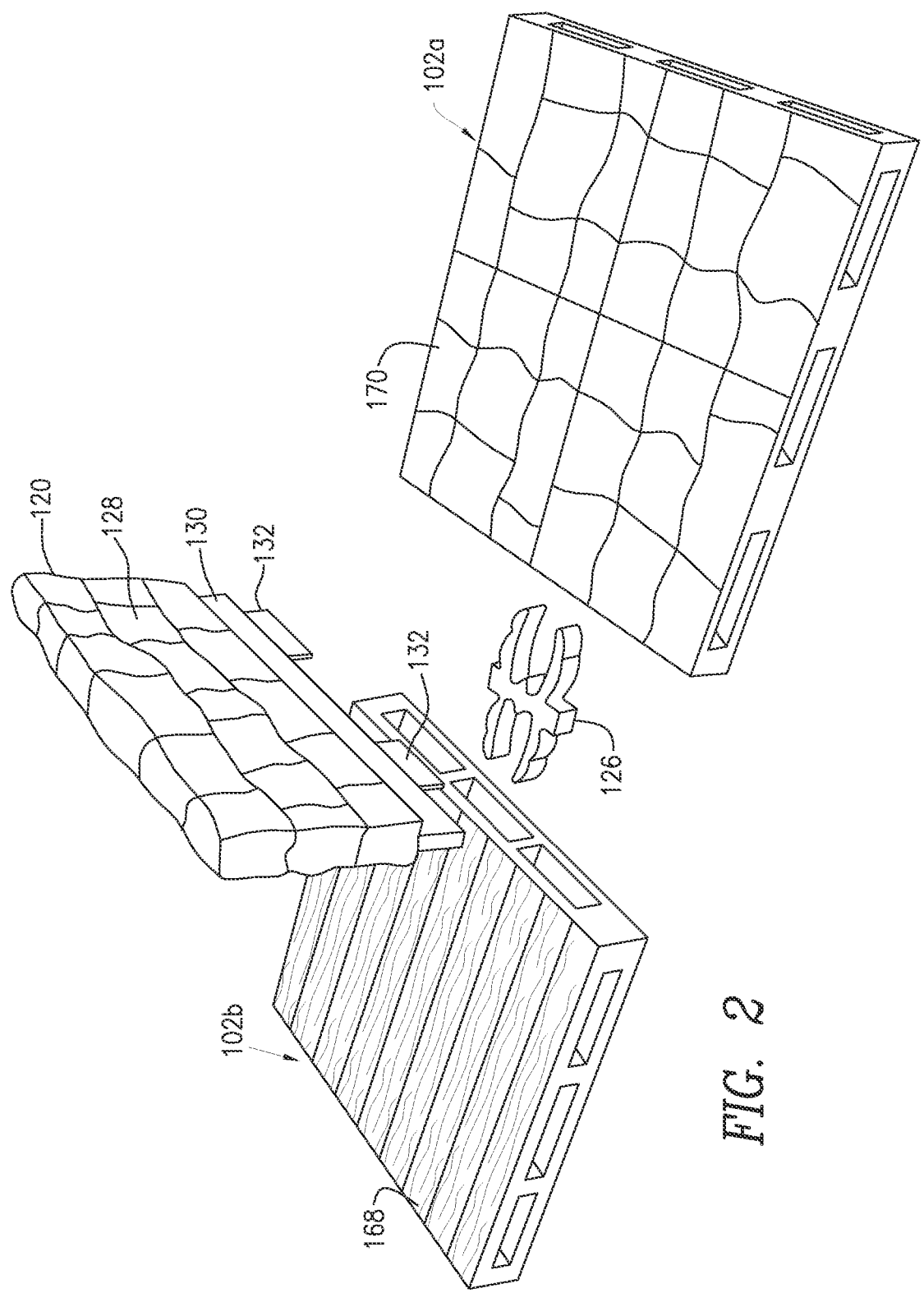
FIG. 2 is an exploded view of interior components of the tile game system, illustrating connections therebetween.

FIG. 2 is an exploded view of components of the tile game system 100, illustrating connections therebetween. More specifically, the components of the tile game system 100 shown in FIG. 2 include a first modular base tile 102a, a second modular base tile 102b, an internal boundary 120, and a locking clip 126. As shown, internal boundary 120 includes a decorative section 128, a recessed decorative section 130, and one or more attachment sections 132. Attachment sections 132 protrude downward from the recessed decorative section 130. The attachment sections 132 can be, for example, rigid, partly rigid, plastic, etc.

As shown, the attachment sections 132 of internal boundary 120 can be configured as two (2) metal plates inserted between the adjacent sides of the modular base tiles 102a and 102b, such that each of the two (2) protruding metal plates is on either side of the locking clip 126. Furthermore, when assembled (see FIG. 3), the recessed decorative section 130 begins at the point where the adjacent sides of tiles 102a and 102b no longer contact attachment sections 132 and continues upward until decorative section 128. The attachments sections 132 of internal boundary 120, or other game components described herein (e.g., other internal boundaries, adjustable boundaries, illuminated boundaries, terrain elements, and the like), can be inserted between the adjacent sides of the modular base tiles 102a and 102b at any time (e.g., before, during, or after connection of the modular base tiles), for example, by sliding the attachment sections 132 into a small gap between the adjacent sides of the modular base tiles 102a and 102b. Likewise, the attachments sections 132 of internal boundary 120 can be removed at any time by sliding them out from between the modular base tiles. As such, game components having attachment sections 132, such as internal boundary 120, can be quickly inserted and removed, thereby enabling a user quickly reconfigure the gameplay area of the of the tile game system 100. Furthermore, adjacent modular base tiles (e.g., tiles 102a and 102b) that are joined together (e.g., by clip 126) do not need to be disassembled, or significantly displaced, in order to insert or remove a game component having the attachment sections 132 from the game play area. Accordingly, a user can reconfigure game components having the attachment sections 132 within the game play area, without reconfiguring the modular tiles thereof.

According to other aspects of the present disclosure, the internal boundary 120 can include a decorative top section having a reduced thickness and a bottom attachment section, which can perform the functions of the decorative section 128, the recessed decorative section 130, and the attachment sections 132, discussed above. For example, the decorative top section of reduced thickness can have a height that encompasses the combined heights of the recessed decorative section 130 and the decorative section 128 of internal boundary 120 and the decorative top section can have, for example, a thickness at any point along its height, that is no greater than the thickness of the recessed decorative section 130, so that the thickness of the decorative top section is sufficient to maintain the secure attachment of the bottom attachment section.

According to other aspects of the present disclosure, the attachment sections 132 of internal boundary 120 can be composed of any rigid or partly rigid production material, including metal or plastic. The attachment sections 132 can be configured in any plate or non-plate format that inserts between the modular base tiles 102a and 102b. Because the attachment sections 132 are retained between the modular base tiles 102a and 102b, the internal boundary 120 is limited in rotational motion along the axis of the downward protrusions 132 and limited in back and forth tipping motion along the axis defined by the length of the internal boundary 120.

For example, attachment sections 132 can be configured as metal posts, metal wires, plastic posts, or any other rigid or partly rigid material in a post-of-minimal-diameter format that provides structural rigidity of the decorative section 128 and the decorative recessed section 130 of the internal boundary 120 (or the thin decorative top section and bottom attachment section of the alternate internal boundary, described above), relative to the base tiles 102a and 102b, and can be configured to be less than or equal to the width of a gap 134 (see FIG. 3) between adjacent sides of the modular base tiles 102a and 102b when connected via locking clip 126.

According to other aspects of the present disclosure, the attachment sections 132 can be configured as a single thin plate or one or more (non-plate) posts positioned on one side of the locking clip 126 when inserted between the modular base tiles 102a and 102b. In this example, two protruding posts or a single thin plate protrusion can perform the same function as the attachment sections 132, thereby limiting rotational and tipping motion of the internal boundary 120.

The modular base tiles described herein can be reversible, with a first design side and a second design side on the respective top and bottom sides thereof, such that each side can display a different type of surface material (e.g., wood planks vs. stone slabs). The surface material designs for the modular base tiles 102 can also include naturally forming wood, stone, other organic textures, and the like. For example, as shown in FIG. 2, modular base tile 102a can include a first design side 170 with stone slab design elements and a second design side 168 with wood plank design elements. Modular base tile 102b can be similarly configured, including a first design side 170 with stone slab design elements and a second design side 168 with wood plank design elements. Furthermore, the surface details of the first and second design sides can be sculpted/manufactured such that design details across the grid square crest at the same height allowing a round (or square) game figure base to sit flat on the surface.

Figure 3:
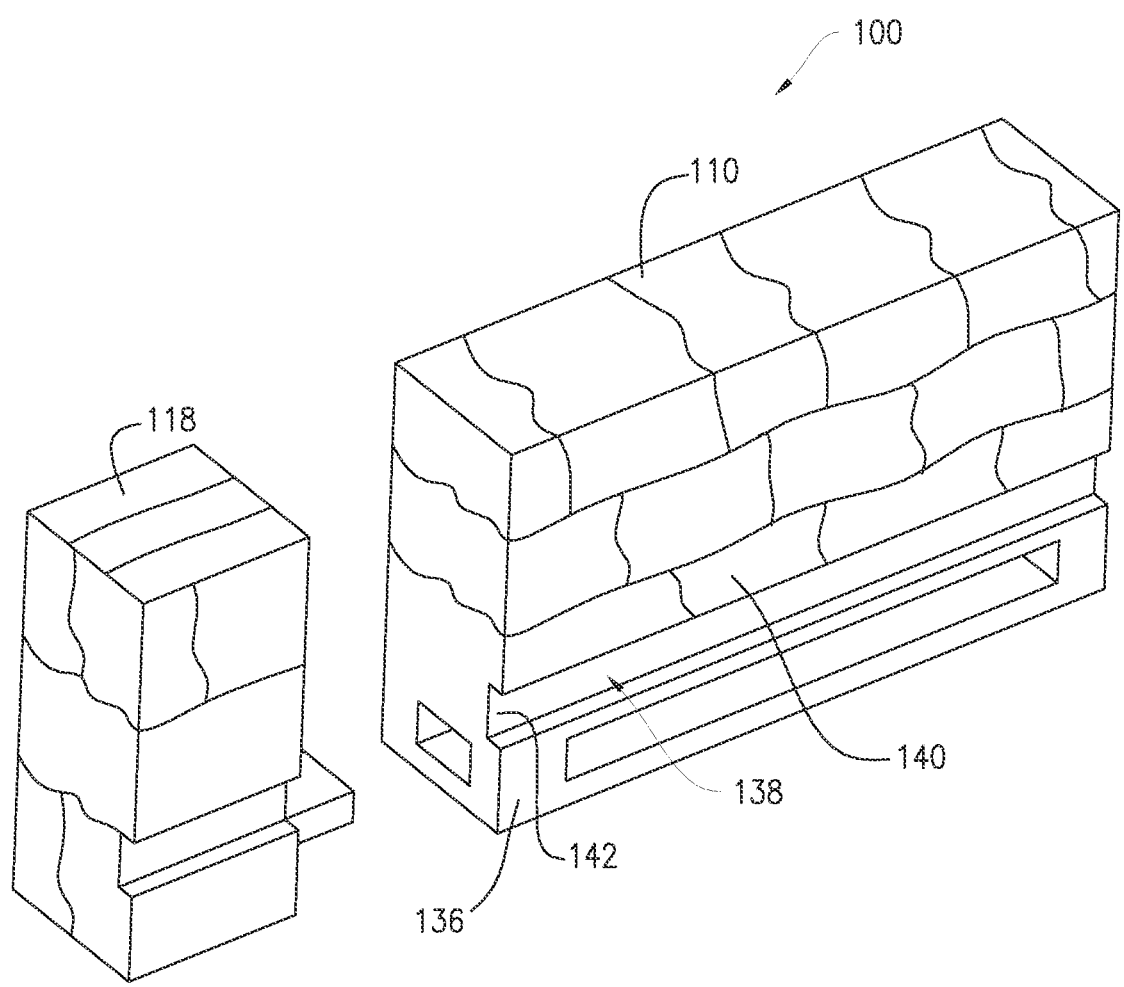
FIG. 3 is an exploded view of external components of the tile game system, illustrating connections therebetween.

FIG. 3 is an exploded view of components of the tile game system 100, illustrating connections therebetween. More specifically, the components of the tile game system 100 shown in FIG. 3 include an external boundary 110 and an exterior boundary cap 118. As shown, external boundary 110 includes a connecting section 136, a decorative recessed section 138 extending from the connecting section 136 (from a height generally even with the top surfaces of the modular base tiles 102a and 102b) and a decorative section 140.

According to some aspects of the present disclosure, external boundary 110, rather than including the decorative section 140, the recessed decorative section 138, and the connecting section 136, can include, for example, two (2) sections, for example, an external thin decorative top section and an external bottom connecting section. In this embodiment, the external thin decorative top section can be formed such that its height is generally equal to the combined heights of the recessed decorative section 138 and the decorative section 140 and the external thin decorative top section can have, for example, a thickness, at any point along its height, that is less than or equal to the thickness of the recessed decorative section 138, discussed in connection with FIG. 3. The thickness of the recessed decorative section 138 can be the thickness along a vertical surface 142 emanating from connecting section 136 at a point no higher than a surface of the modular base tiles 102a or 102b and said vertical surface 142—can be positioned at the same distance from an edge 144 (see, e.g., FIG. 4) of an adjacent side of a base tile 102 as a vertical surface 146 of the decorative recessed section 130 of the interior boundary 120 is from the edge 144 of the modular base tiles 102a or 102b that is adjacent to interior boundary 120.

Figure 4:
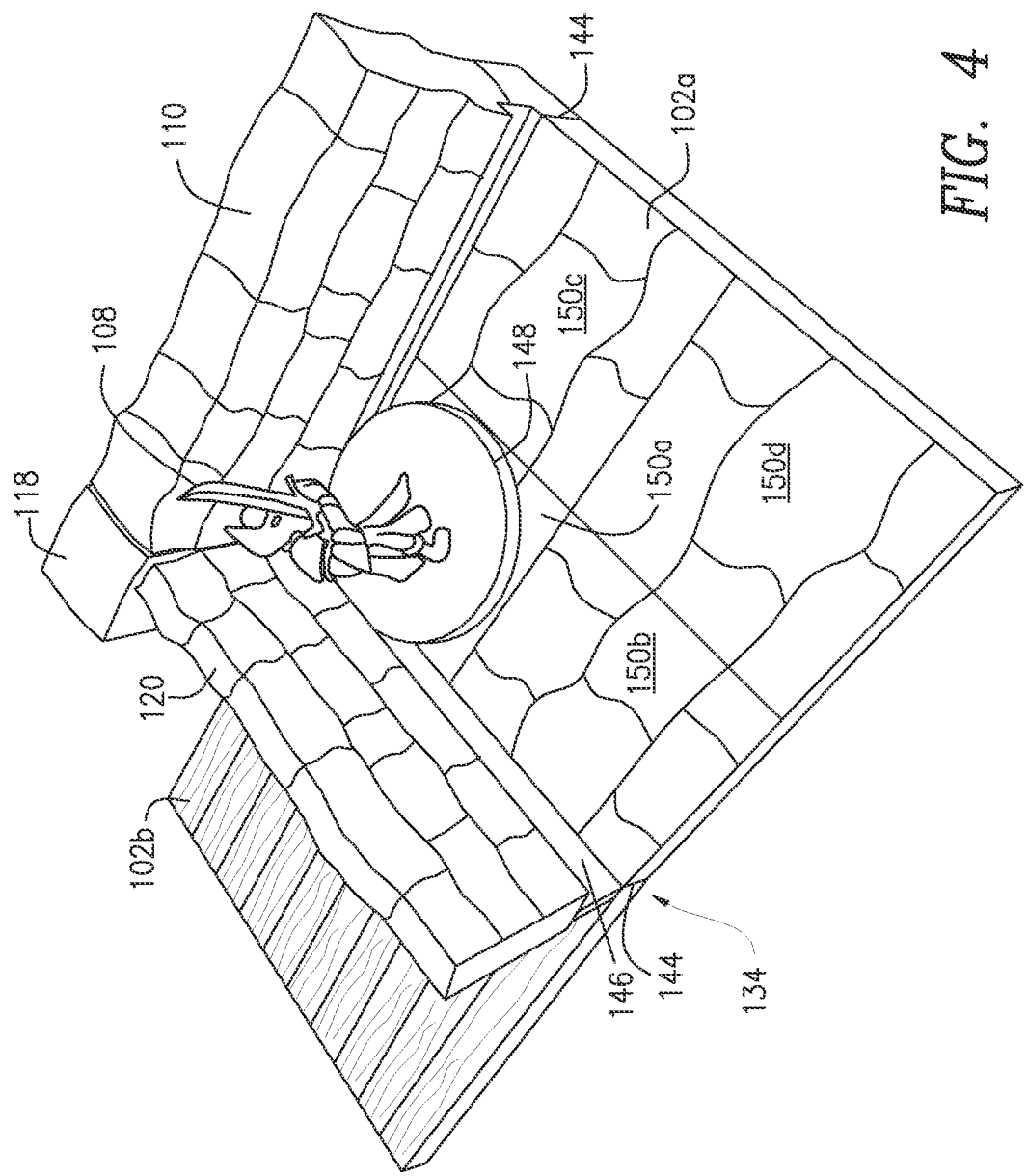
FIG. 4 is a perspective view of components of the tile game system, assembled in an exemplary configuration, according to the present disclosure.

FIG. 4 is a perspective view of the components of the tile game system 100, assembled in an exemplary configuration. More specifically, the configuration shown in FIG. 4 includes a first modular base tile 102a, a second modular base tile 102b, an internal boundary 120, an external boundary 110, an exterior boundary cap 118, and a game figure 108. the game FIG. 108 includes a base 148 with a diameter that can be equal to the length of a grid square 150a, which can be consistent across every square in the playing space. As shown in FIG. 4, the base of figure 108 can be configured to occupy only a single grid square 150a, without overlapping unintended grid squares 150b-c.

Making this single grid square occupation possible are the recessed sections 130 and 138 of the internal boundaries 120 and the external boundaries 110, respectively. The increased width of the decorative sections 128 and 140 (which would otherwise force base 148 out of grid square 150a) begins above base 148, such that the height of the recessed sections 130 and 138 is greater than the height of base 148 from the reference point of the surface plane of the modular base tiles 120a and 120b. This height discrepancy subsequently provides a clearance allowing a portion of base 148 to situate under a ridge created by the junction of the decorative sections 128 and 140 to decorative recessed sections 130 and 138, respectively.

Furthermore, while not a system requirement, the minimal height of the decorative recessed sections 130 and 138 required to provide clearance for base 148 ensures that the decorative sections 128 and 140 of the boundaries 120 and 110 are the primary visual component perceived during game play.

According to some aspects of the present disclosure, a larger game figure can be provided. For example, tile game system 100 can include a larger game figure on a base having a diameter that is a multiple of the length of the sides of grid squares 150. In this embodiment, the mechanics of appropriate grid square occupation are maintained, where the height of the base is less than the height of the recessed sections 130 and 138, allowing a portion of the base of the larger game figure to be positioned within the recessed areas defined by the decorative recessed sections 130 and 138 of the internal boundary 120 and external boundary 110, respectively. Accordingly, the base of the larger game figure can appropriately occupy a larger area created by the combination of, for example, grid squares 150a-d.

According to other aspects of the present disclosure, the base of game figure 108 can be implemented as a square with side lengths matching a grid square 150 or a multiple thereof, which illustrates the non-restrictive nature of the continuous square-grid tile system 100. As such, the size of the base of the game figure is only limited by the size of the game play area.

Figure 5:
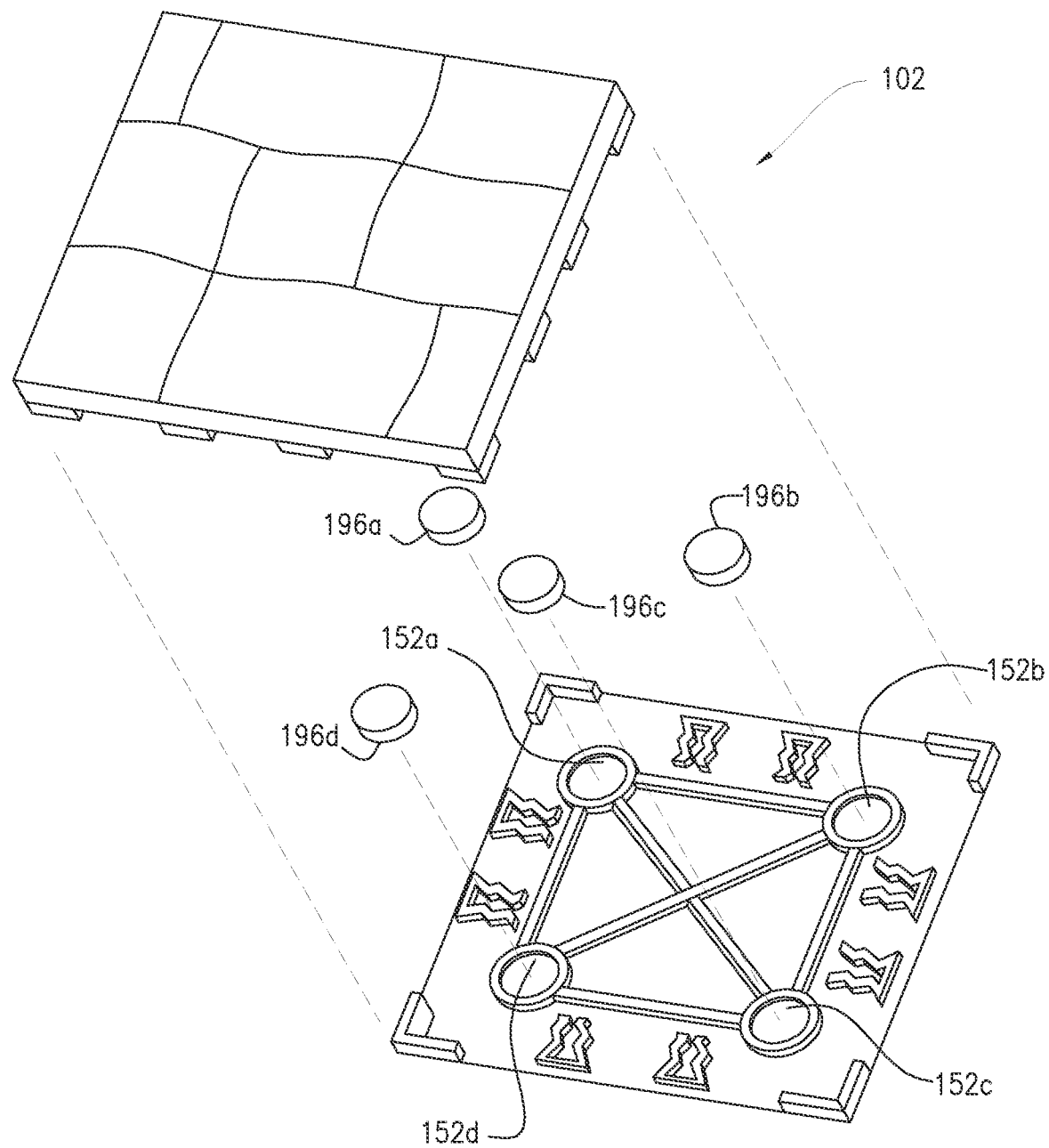
FIG. 5 is an exploded view of a modular base tile of the tile game system according to the present disclosure.

FIG. 5 is an exploded view of a base tile 102 showing multiple internal recessed spaces 152a-d inside the modular base tile 102 to allow insertion of magnets 196a-d, which can enable a magnetic connection to game components placed on top of the tiles, such as furnishings, terrain, and building components such as columns.

Figure 6:
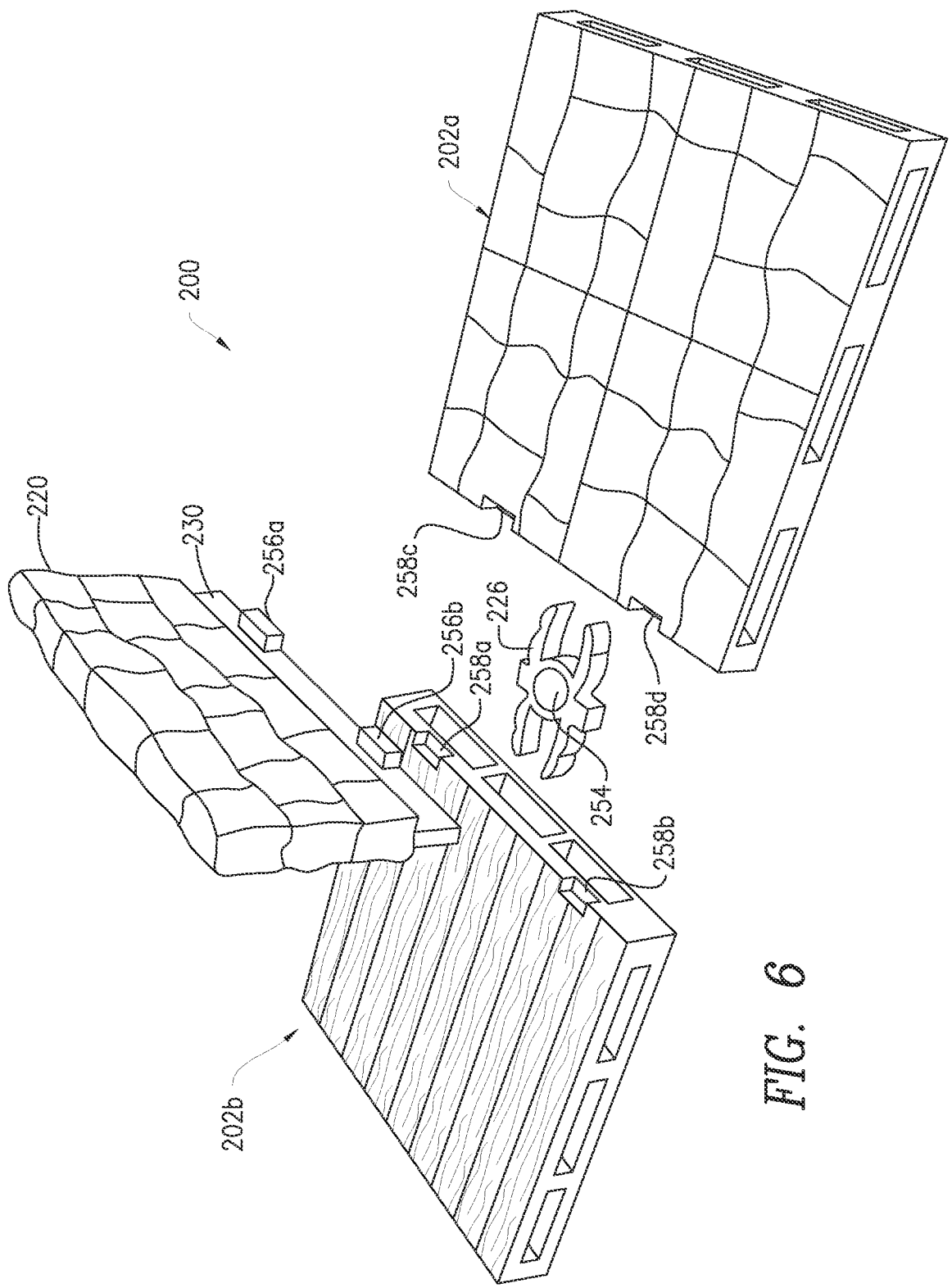
FIG. 6 is an exploded view of interior components of the tile game system, according to some aspects of the present disclosure, illustrating connections therebetween.

FIG. 6 is an exploded view of components of the tile game system 100, illustrating connections therebetween. More specifically, the components shown in FIG. 6 include a first base tile 202a, a second base tile 202b, an internal boundary 220, and a magnetized locking clip 226. As shown, the magnetized locking clip 226 can be similar to locking clip 126, described herein, with the addition of a magnet 254 disposed therein. As such, the magnetized locking clip 226 can secure the attachment of modular base tiles 202a and 202b and can secure a magnetically attractable piece 230 of the interior boundary 220. The magnetically attractable piece 230 of the interior boundary 220 can be similar to the recessed decorative section 130 of interior boundary 120, except that magnetically attractable piece 230 can be formed from a (e.g., ferrous) material that is attracted to the magnet 254.

Additionally, one or more horizontal locking tabs 256 can be provided at the base of the interior boundary 220, securing the boundary 220 to the modular base tiles 202a and 202b. For example, as shown in FIG. 6, the internal boundary 220 can include first and second horizontal locking tabs 256a-d (collectively, locking tabs 256) extending from the magnetically attractable piece 230 and the modular base tiles 202a and 202b can be provided with reciprocal notches 258a-d (collectively, notches 258) that are configured to receive the horizontal locking tabs 256 of the interior boundary 220, thereby maintaining the boundary 220 in an upright position. According to certain aspects of the present disclosure, the horizontal locking tabs 256 and the reciprocal notches 258 can be configured to frictionally engage each other and can be provided in place of, or in addition to, the magnet 254 of the magnetized locking clip 226 and the magnetically attractable piece 230 of the interior boundary 220.

According to other aspects of the present disclosure, the horizontal locking tabs 256 at the base of the interior boundary 220 can extend outward and can be configured as pressure fit dimples or nubs slotting into receptacles below the visible surface area of the modular base tiles 202. In this configuration, the design continuity of the playable square grid is maintained. According to still further aspects of the present disclosure, interior boundary 220 can be provided with one or more attachment sections, similar to attachment sections 132 of interior boundary 120, described in connection with FIG. 2.

Figure 7:
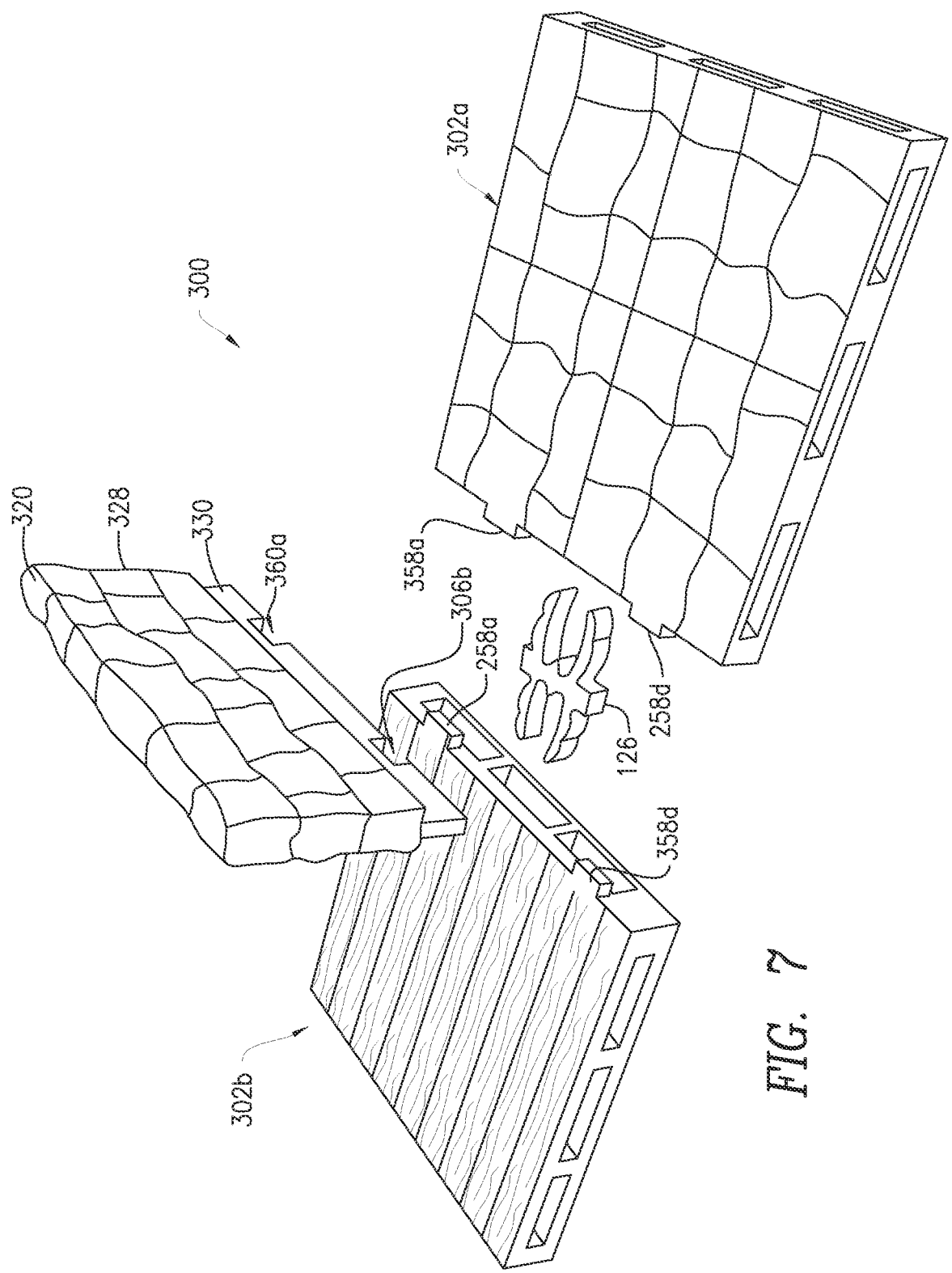
FIG. 7 is an exploded view of interior components of the tile game system, according to some aspects of the present disclosure, illustrating connections therebetween.

FIG. 7 is an exploded view of components of the tile game system 100, illustrating connections therebetween. More specifically, the components shown in FIG. 7 include a first modular base tile 302a, a second modular base tile 302b, an interior boundary 320, and a locking clip 126. As shown, modular base tiles 302a and 302b can be configured with pressure or friction fit tabs 358a-d supporting the interior boundary 320, configured without an attachment section (e.g., attachment sections 132), and configured as either an interior boundary of uniform thickness, for example, the thickness of the recessed decorative section 130, or as an internal boundary configured with two (2) sections, including a recessed decorative section and decorative section. For example, as shown in FIG. 7, the interior boundary 320 includes a decorative section 328 and a recessed decorative section 330. Furthermore, the recessed decorative section 330 can include notches 360a and 360b. Further still, tabs 358a-d and notches 360a and 360b can be configured to frictionally engage each other, thereby securing interior boundary 320 in an upright position, generally perpendicular to the modular base tiles 302a and 302b.

Accordingly, the present disclosure includes an attachment mechanism that positions a boundary (e.g., interior boundaries 120, 220, and 320) at the meeting points of (e.g., between) modular base tiles (e.g., modular base tiles 102, 202, and 302) such that the boundary refrains from infringing upon the area of a grid square (e.g., grid square 150) at any point below the height of a game figure base (e.g., base 184), as shown, for example, in FIG. 4.

Figure 8B:
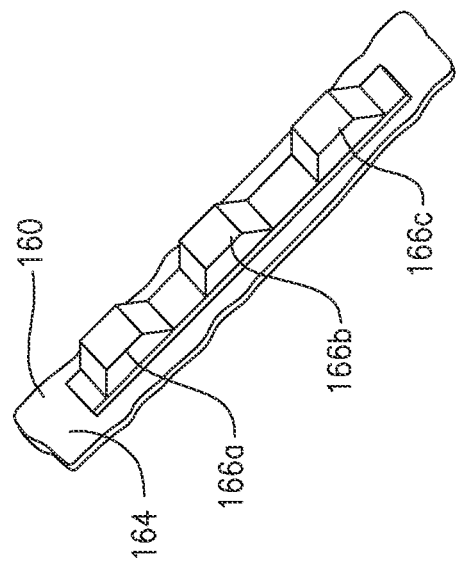
FIG. 8B is a rear perspective view of the tile veneer of FIG. 8A.
Figure 8A:
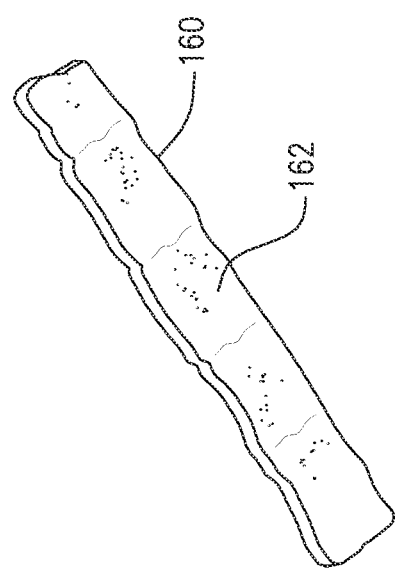
FIG. 8A is a front perspective view of a tile veneer according to the present disclosure.

FIG. 8A is a front view of a tile veneer 160 and FIG. 8B is a rear view of the tile veneer 160. the modular tiles of the present disclosure (e.g., modular base tiles 102, 202, and 302) can be provided with one or more tile veneers 160 (see FIG. 1) that can clip onto the edges of the modular base tiles, so as to conceal the attachment points normally used to insert a locking clip (e.g., clip 126). A front side 162 of these veneers 160 can include the same surface material design as the modular tiles (e.g., wood planks or stone slabs), and a rear side 164 can feature one or more protrusions 166a-c to pressure fit into the attachment points normally used to insert a clip 126 into the modular base tiles.

Figure 9A:
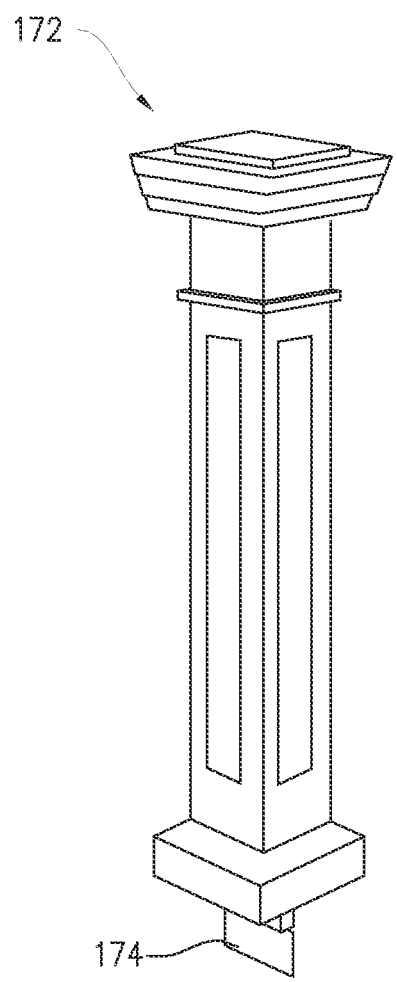
FIG. 9A is a perspective view of an interior terrain element according to the present disclosure.
Figure 9B:
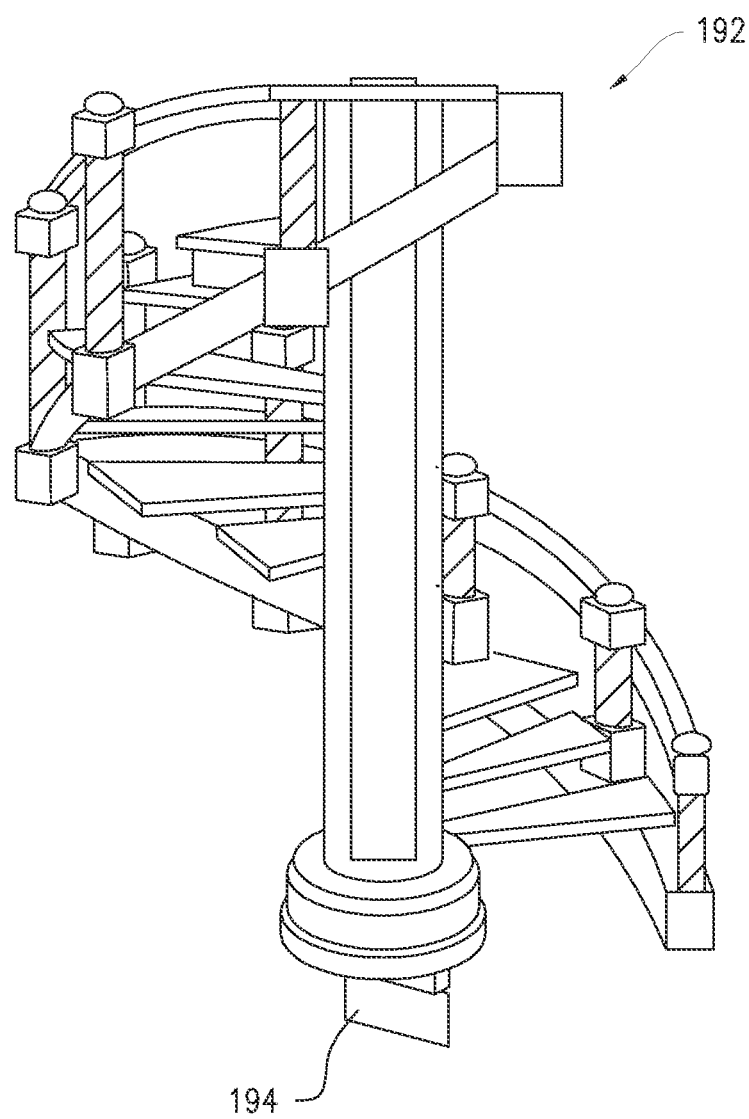
FIG. 9B is a perspective view of another interior terrain element according to the present disclosure.

According to some aspects of the present disclosure, the tile game system 100 can include one or more free-standing interior terrain elements, which can be positioned throughout the gameplay area. For example, FIG. 9A is a perspective view of an interior terrain element 172, which is configured to represent a pillar (e.g., a wood column). As shown, interior terrain element 172 can include one or more attachment sections 174, which can function similar to the attachment sections 132 of interior boundary 120. FIG. 9B is a perspective view of an interior terrain element 192, which is configured to represent a stairwell. As shown, interior terrain element 192 can also include one or more attachment sections 194, which can function similar to the attachment sections 132 of interior boundary 120. As such, one or more interior terrain elements can be positioned within the gameplay area by inserting the one or more attachment sections between adjacent tiles (e.g., modular base tiles 120). In addition to the interior terrain element 172 shown in FIG. 9A and the interior design element 192 shown in FIG. 9B, the interior terrain elements of the present disclosure can be provided in additional configurations, such as other stairwells, spiral staircases, light posts, and the like.

Figure 10:
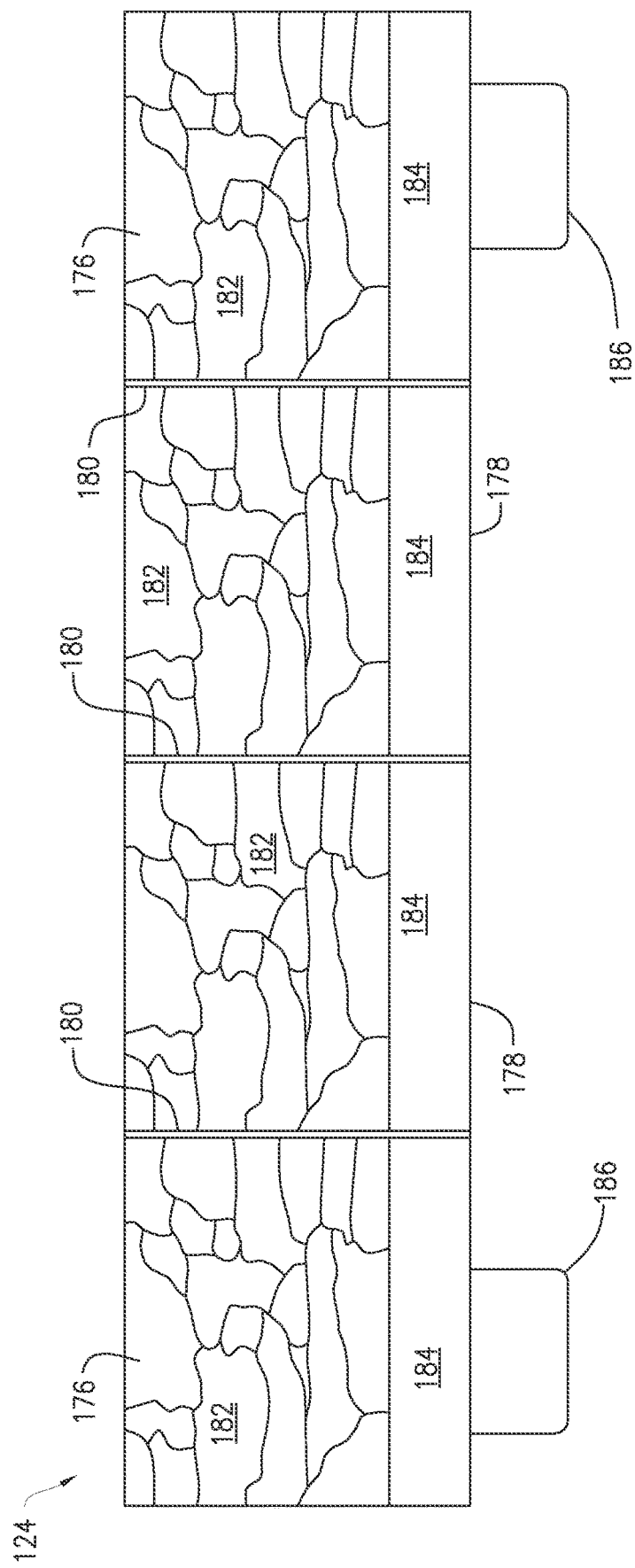
FIG. 10 is a front view of an adjustable internal boundary according to the present disclosure.
Figure 11:
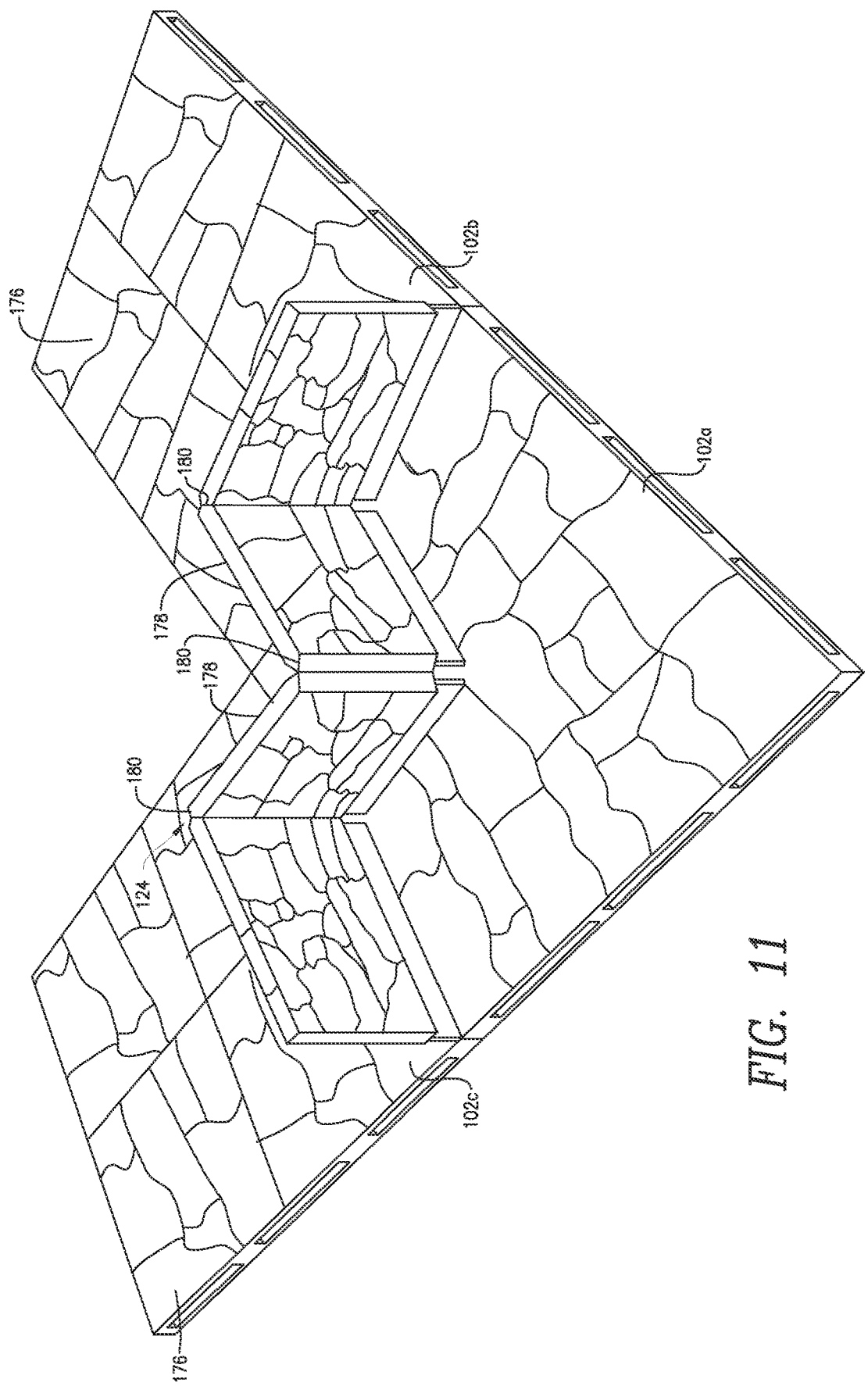
FIG. 11 is a perspective view of the adjustable internal boundary of FIG. 10, in an assembled configuration, according to the present disclosure.

FIGS. 10 and 11 illustrate an adjustable internal wall system for defining internal walls within the grid-space of a single modular base tile according to some aspects of the tile game system 100 of the present disclosure. More specifically, FIG. 10 is a front view of an adjustable internal boundary 124 and FIG. 11 is a perspective view of the adjustable internal boundary 124 positioned on the modular tiles of the present disclosure. As shown best in FIG. 10, adjustable internal boundary 124 can include one or more stabilized sections 176, one or more non-stabilized sections 178, and hinge points 180. As shown, both the stabilized sections 176 and the non-stabilized sections 178 of the adjustable internal boundary 124 can be configured with the decorative and functional characteristics of the internal boundary 120 (see, e.g., FIG. 2), including decorative sections 182, recessed decorative sections 184, and attachment sections 186. As shown, the non-stabilized sections 178 do not include an attachment section 186. Attachment sections 186 can be similar to the attachment sections 132, as discussed herein. As such, the attachment sections 186 can be, for example, rigid or partly rigid and formed from metal, plastic, composite materials, or any other suitable material for securing the adjustable internal boundary 124 to the tile game system 100 of the present disclosure.

As shown in FIG. 11, the adjustable internal boundary 124 can be configured such that the attachment sections 186 of the stabilized sections 176 are inserted between adjacent sides of the modular base tiles 102a-c, thereby preventing rotational motion about the attachment sections or any back and forth tipping motion along the axis defined by the length of the boundary. According to some aspects of the present disclosure, each of the stabilized sections 176 and the non-stabilized sections 178 are less than (e.g., half) the width of the internal boundary 120, such that each of the stabilized sections 176 and the non-stabilized sections 178 can have a width that is equal to the length of a single grid square unit of the tile game system 100 of the present disclosure. The hinge points 180 can connect the stabilized sections 176 and the non-stabilized sections 178 together (e.g., as a single unified piece), and allow the stabilized sections 176 and the non-stabilized sections 178 to pivot independently, for example, along a 180-degree angle of motion. As with the internal boundary 120, discussed in connection with FIG. 4, the decorative sections 182 and the recessed decorative sections 184 of the adjustable internal boundary 124 allow a game figure base 148 to occupy only an intended grid-square 150 of the tile game system 100 of the present disclosure.

According to some aspects of the present disclosure, the hinge points 180 can be a flexible material added to the exterior ends of the stabilized and non-stabilized sections 176 and 178. However, the hinge points 180 can utilize any pivoting hinge mechanism such as an injected living hinge between sections, a flexible material hinge connected internally to the ends of the sections 176 and 178, a magnetic hinge where sections 176 and 178 are connected magnetically whilst still allowing a pivoting action, a mechanical hinge, or any other existing mechanical hinge design suitable for pivotably joining sections 176 and 178 of the adjustable internal boundary 124.

As shown in FIGS. 10 and 11, the stabilized sections 176 can include a single hinge point 180 on one side thereof and a terminating standard boundary side, without a hinge point 180. Additionally, according to some aspects of the present disclosure, each stabilized section 176 can have hinge points 180 on either side thereof, allowing both sides of a stabilized section 176 to be connected to multiple non-stabilized sections 178, such that a continuing arrangement of stabilized and non-stabilized sections can extend across the tiles of the game system 100. Additionally, a non-stabilized section 178 can also be coupled to additional non-stabilized sections 178 on either side thereof. For example, the adjustable internal boundary can include two stabilized sections 176 at opposite ends thereof, with any number (e.g., one or more) of non-stabilized sections 178 therebetween, connected via hinge points 180. A benefit of multiple hinge points 180 is apparent with a game design requiring the inclusion of an interior wall that bisects a 4×4 tile 106. For example, as a 4×4 tile 106 can be single piece, with no seams (as opposed to a 4×4 area created by four (4) 2×2 modular base tiles 102), the attachment section 132 of an internal boundary 120 is not operable. As such, stabilization points via the attachment section 132 of an internal boundary 120 must occur along the perimeter of the 4×4 tile 106. Accordingly, a configuration of the adjustable internal boundary 124, including one or more stabilized sections 174 coupled to multiple non-stabilized sections 178, allows the uninterrupted flow of stabilized internal boundaries 124 across any size tile area.

Figure 12:
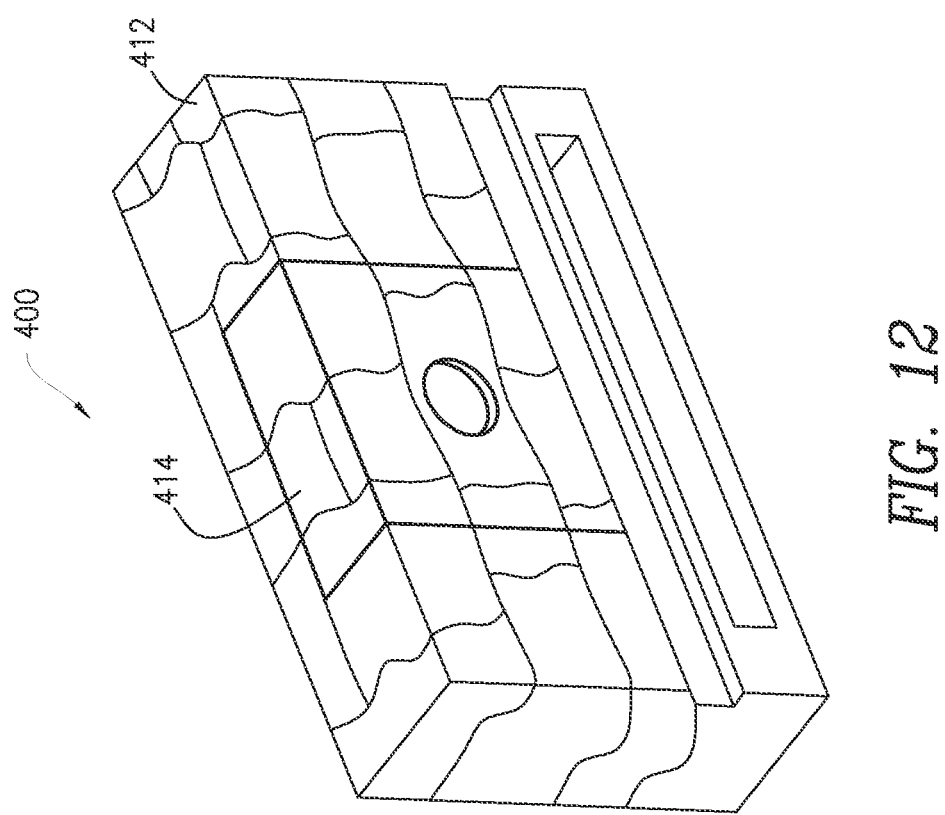
FIG. 12 is a perspective view of an illuminated external boundary, positioned in a first configuration, according to some aspects of the present disclosure.
Figure 14:
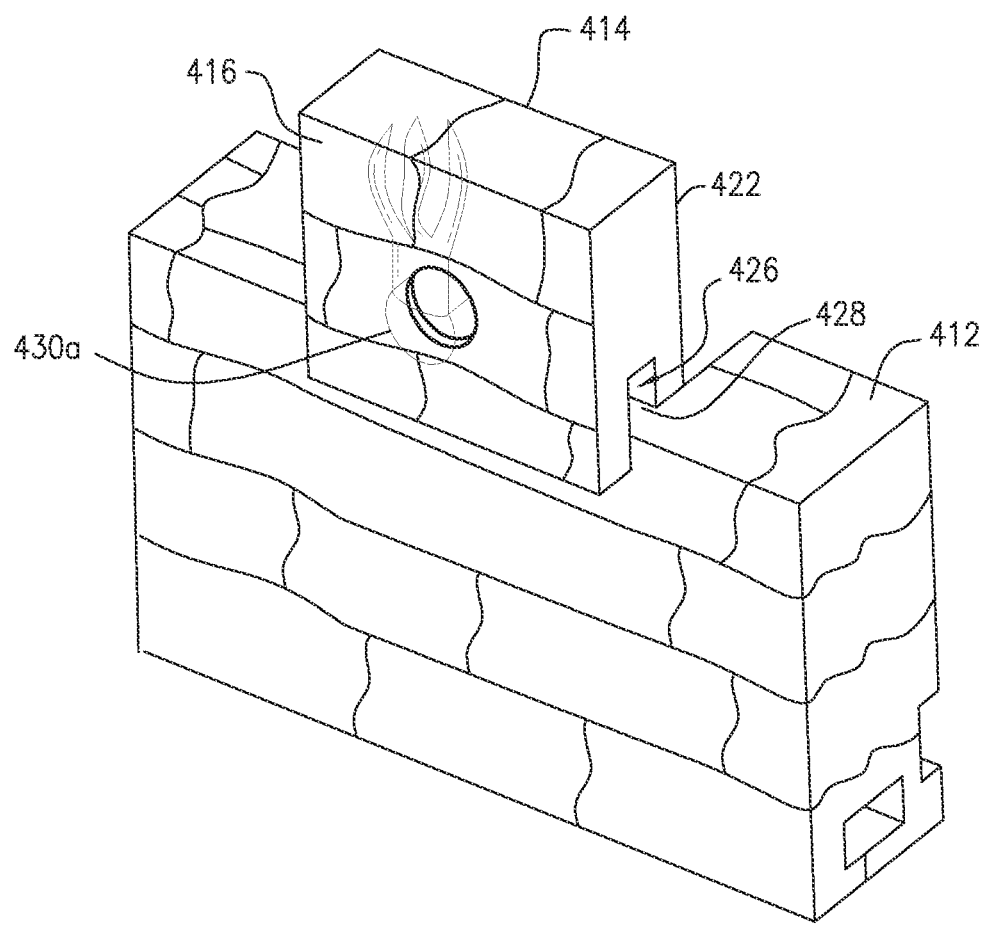
FIG. 14 is a perspective view of the illuminated external boundary of FIG. 12, positioned in a second configuration.
Figure 15:
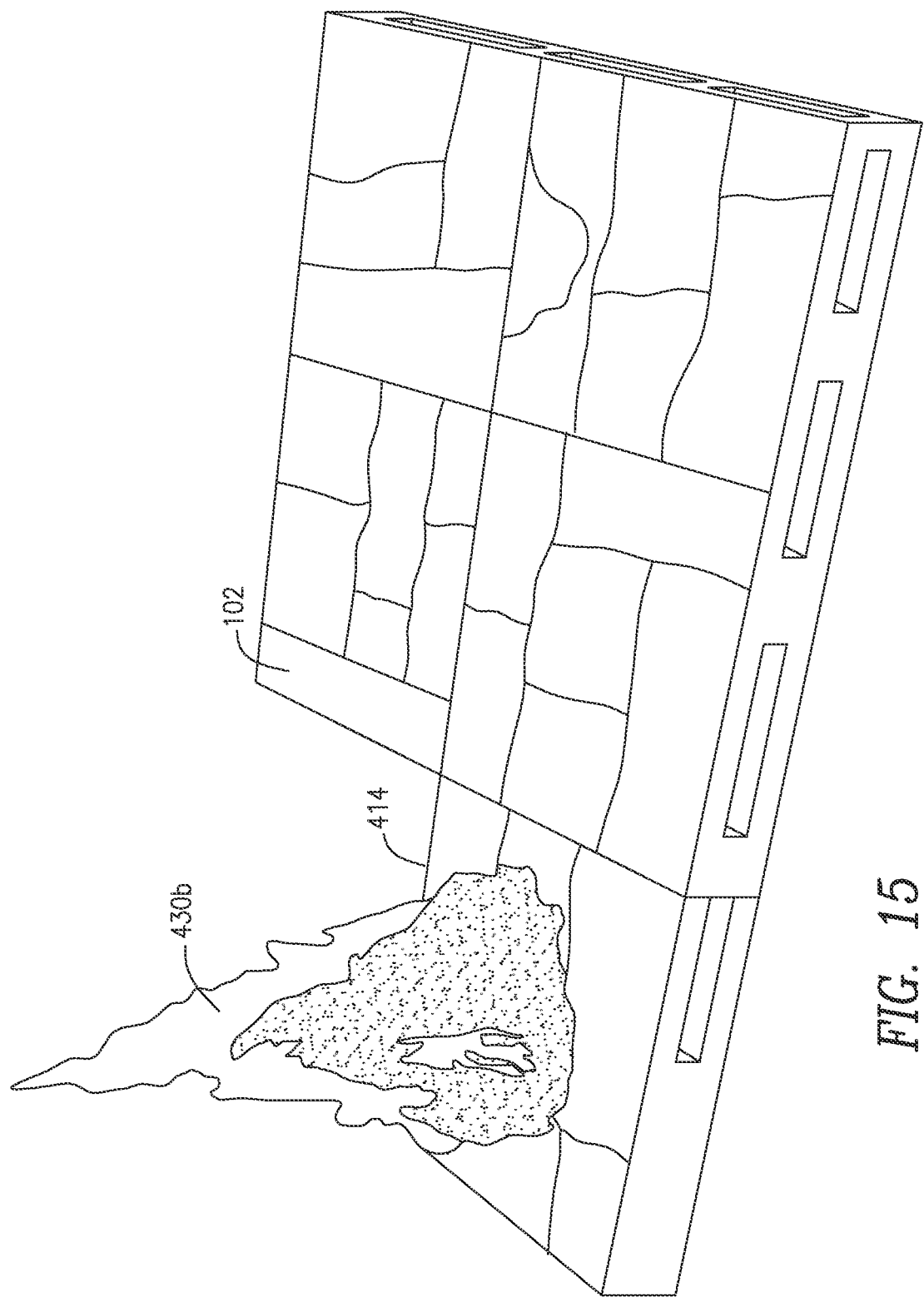
FIG. 15 is a perspective view of an illuminated tile section of the illuminated external boundary of FIG. 12, positioned in a third configuration, according to some aspects of the present disclosure.

FIGS. 12-15 illustrate an external boundary with lighting 410, according to some aspects of the present disclosure. More specifically, FIG. 12 is a perspective view of the external boundary with lighting 410 arranged in a first (e.g., docked) configuration, FIG. 13 is an exploded view of the external boundary with lighting 410, FIG. 14 is a perspective view of the external boundary with lighting 410 arranged in a second configuration, and FIG. 15 is a perspective view of the external boundary with lighting 410 arranged in a third configuration. As shown in FIGS. 12-15, the external boundary with lighting can be arranged in multiple configurations for lighting the tile game system 100 of the present disclosure. The external boundary with lighting 410 can include a docking section 412 and a separated lighted tile segment 414 having a front face 416 with an receptacle 418 that exposes a light source 420, and a back face 422 with a control opening (not shown) for manipulating led operation. As shown in FIG. 12, the lighted tile segment 414 can be seated within a recessed area 424 in docking section 412. According to some aspects of the present disclosure, the external boundary with lighting 410 can be configured to have the have the same exterior dimensions as the external boundary 110.

As shown in FIG. 14, the external boundary with lighting 410 can be configured such that the lighted tile segment 414 can be seated on top of the docking section 412. More specifically, the lighted tile segment 414 can include a channel 426 (or other clip system) created between the front face 416 and the back face 422 of the lighted tile segment 414, which can be sized to clip onto (e.g., positioned on, via friction fit or the like) a rear wall 428 of the external boundary with lighting 410

The lighted tile segment 414 can also be provided with a light transmitting element 430 that depicts a light emitting source, for example, a torch. The light transmitting element 430 can be formed from any material that allows light from the light source 420 to pass therethrough and can include a (e.g., cylindrical, plug-like) protrusion extending from a back surface thereof. The protrusion can be configured to be received by, and mate with, the receptacle 418 of the lighted tile segment 414. The light transmitting element 430 can be shaped to represent any light emitting source and can be formed from any material that can be illuminated via the protrusion. The protrusion can be integrally formed with the light transmitting element 430, or formed as a separate component, and can serve the dual purpose of acting as a conduit for light, and as friction fitting into the receptacle 418 of the lighted tile segment 414. The light transmitting element 430 can be formed to represent, but is not limited to, a miniature sign or engraving, a facial model such as a skull or mask, a figure, or some effect particular to the space, such as fire or energy.

According to some aspects of the present disclosure, the lighted tile segment 414, utilizing the channel clip system described above (e.g., channel 426), can be seated on an internal boundary 120. For example, the thickness of the internal boundary 120 and the thickness of the rear wall 428 of the docking section 412 (e.g., the remaining thin wall of the external boundary with lighting 410 after the lighted tile segment 414 is removed) can be configured to be approximately equal. Likewise, the width of the channel 426 of the lighted tile segment 414 can be configured to accept both the rear wall 428 of the docking section 412 and the internal boundary 120. Furthermore, the width of the channel 426 of the lighted tile segment 414 can also be configured to clip on to, and to accept, both the stabilized sections 176 and the non-stabilized sections 178 of the adjustable internal boundary 124.

As shown in FIG. 15, the lighted tile segment 414 of the external boundary with lighting 410 can be joined with one or more modular tiles of the tile game system 100. For example, the lighted tile segment 414 can have an external length and width that are approximately equal to one (1)

grid-square 150 unit length of a modular tile (e.g., tile 102, 104, or 106) of the tile game system 100 and the lighted tile segment 414 can have a depth (defined as the distance between the front face 416 and the back face 422) that can be approximately equal to the depth of a modular base tile (e.g., modular base tile 102), where the depth of the modular base tile is the distance from the top of the pattern on one side of the tile to the top of the pattern on the opposing side of the tile.

The lighted tile segment 414 can be provided with a light transmitting element 430b. For example, the light transmitting element 430b can be a scaled model of a light emitting source, such as a ground based fire shown in FIG. 15. The light transmitting element 430b can rest on the receptacle 418 of the lighted tile segment 414, and when the light source 420 is activated, the miniature model illuminates accordingly. According to other aspects of the present disclosure, a miniature model of a light emitting source (e.g., light transmitting element 430b) can also be configured with a protrusion such that it mates with the receptacle 418. The light transmitting element 430b can be anything intended to illuminate via a protrusion, which can serve the dual purpose of acting as a conduit for light and as a friction fitting into the receptacle 418. For example, the light transmitting element 430b can be formed to represent, but is not limited to, a miniature sign or engraving, a figure, a light post or some atmosphere effect particular to the space, such a fire or energy. According to some aspects of the present disclosure, the lighted tile segment 414 can include a protrusion configured as a connective means to the receptacle 418 for light transmittable piping to illuminate a game figure, or the like.

According to other aspects of the present disclosure, multiple units of the lighted tile segment 414 can be joined together (e.g., via locking clips 126) to form a larger game tile, for example, a 2×2 grid-square modular base tile 102. Also, a complementary modular base tile can be provided that, when combined with one or more lighted tile segments 414, can form a complete modular tile (e.g., 2×2 unit grid-square). For example, where only a single lighted tile segment 414 is provided, the complementary modular base tile can be "V" shaped, composed of three single grid squares arranged in a 90-degree pattern. According to another example, where two (2) adjacent lighted tile segments 414 are provided, the complementary modular base tile to complete the 2×2 four unit grid-square can be a 2×1 modular base tile.

Figure 16:
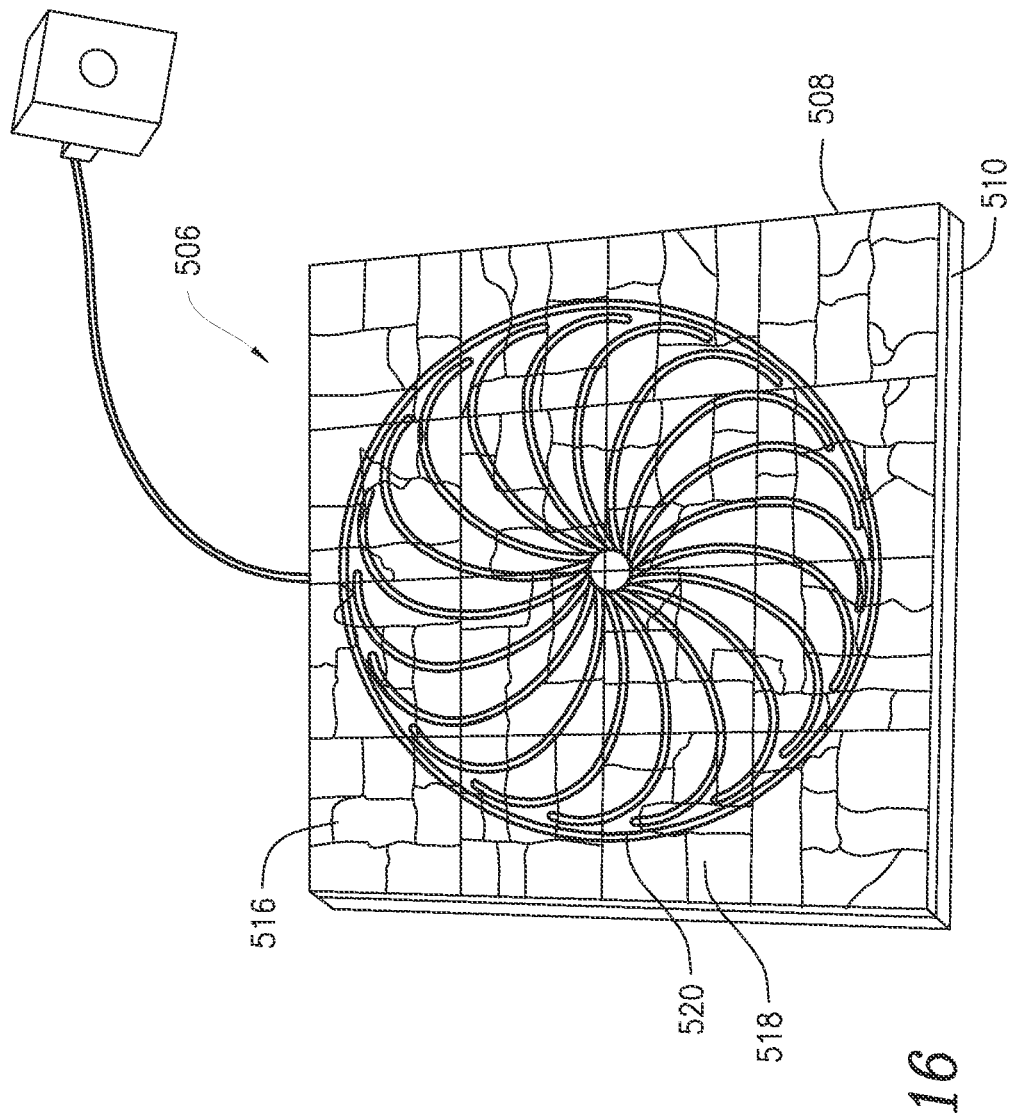
FIG. 16 is a perspective view of an illuminated tile unit according to some aspects of the present disclosure.
Figure 17:
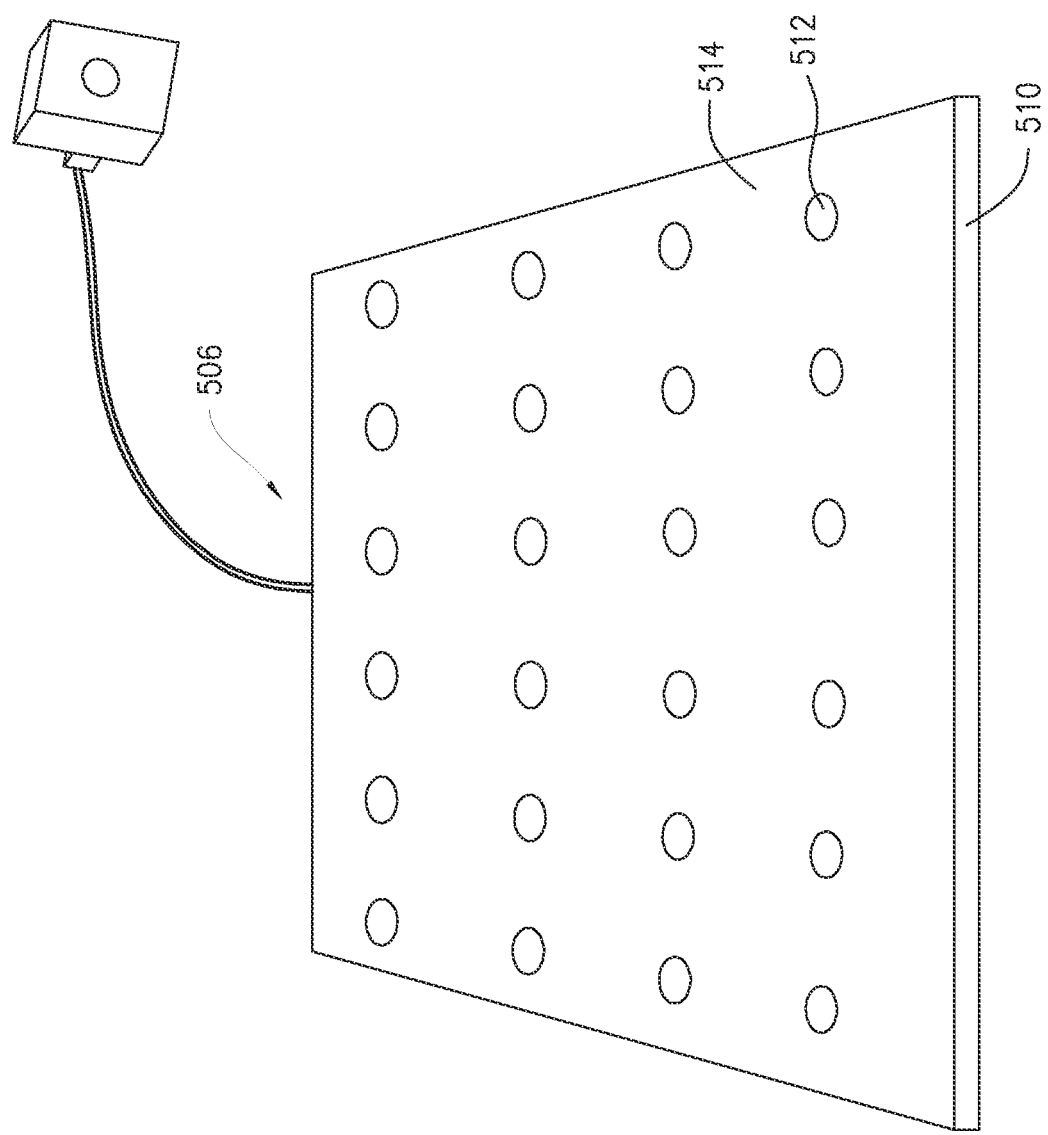
FIG. 17 is a perspective view of the illuminated tile unit of FIG. 16, with a light permeable skin removed.

FIGS. 16 and 17 are perspective views of an illuminated tile unit 506 having a replaceable light permeable decorative skin 508. More specifically, FIG. 16 shows the illuminated tile unit 506 with the replaceable light permeable decorative skin 508 arranged thereon and FIG. 17 shows the illuminated tile unit 506 with the replaceable light permeable decorative skin removed.

As shown in FIG. 17, the illuminated tile unit 506 can be configured as a 4×4 grid-square unit having an illuminating function—whether by LED, incandescent, electroluminescent or some other light transmitting means, whereby light is transmitted upwards. For example, the illuminated tile unit 506 can include a base having one or more (e.g., an array of) LED lights. Furthermore, the illuminated tile unit 506 can include a pressure-activated light function (e.g., via a switch or button) whereby light operations, such as ON and OFF, and light settings, such as color, brightness, and effects (e.g., fade, blink, pulse, etc.), can be accessed by downward pressure applied to an illuminating face 514 of the illuminated tile unit 506.

As shown in FIG. 16, the light permeable decorative skin 508 can include a decorative side 516 including an opaque skin area 518 that prevents the transmission of light and a light permeable skin area 520 that permits the transmission of light. The light permeable decorative skin 508 can also include a translucent skin area that allows for the transmission of light subject to the characteristics of the material of which light permeable decorative skin 508 is composed.

The depth of the illuminated tile unit 506, including both the replaceable light permeable decorative skin 508 and base 510, can be approximately equal to the depth of a modular base tile (e.g., tile 102, 104, or 106). For example, if the depth of modular base tile 102 is 8 mm and the base 510 of the illuminated tile unit 506 is 6 mm, then the light permeable decorative skin 508 can be 2 mm. Conversely, if the light permeable decorative skin 508 is 6 mm, then the base 510 of the illuminated tile unit 506 can be approximately 2 mm.

According to other aspects of the present disclosure, the light permeable decorative skin 508, whilst maintaining the above defined light transmitting characteristics, can be voluminous, exhibiting physical protrusions upward that can emulate natural terrain formations such as rocks, boulders, lava flows, water flows, pools, vegetation, etc. and built terrain formations such as ruins, architecture, and other non-naturally occurring voluminous formations.

Furthermore, while an exemplary configuration of the illuminated tile unit 506 is shown in FIGS. 16 and 17 as a 4×4 size illuminated tile 506 including a 4×4 size light permeable decorative skin 508, other shapes and sizes such as a 1×1, 2×2, 3×3, 5×5, etc., or any irregularly shaped tile including, but not limited to, a 2×3, 2×4, "V" shaped 3×1, etc. are included within the scope of the present disclosure.

Additionally, as shown in FIGS. 16 and 17, the illuminated tile unit 506 can be coupled to an external power source 522 for powering the illuminated tile unit 506 (e.g., providing power to the one or more LED lights 512). Additionally, or alternatively, the illuminated tile unit 506 can also include an internal power source (e.g., one or more batteries) driving the illuminating function, making the illuminated tile 506, a self-contained unit.

The tile game system 100 of the present disclosure can include a plurality of light permeable decorative skins 508, with different types of illuminating patterns. Furthermore, a first light permeable decorative skin 508 can be removed from the base 510 of the illuminated tile unit 506 and replaced with a second light permeable decorative skin having a different illuminating pattern, such that consumers have the ability to utilize a plurality of different replaceable light-permeable decorative skins 508, without requiring replacement of the base 510 of the illuminated tile unit 506, and thereby enjoying the light-transmitting functionality, while limiting the consumer cost associated with the investment in light-emitting technology in the base 510 of the illuminated tile unit 506 of the tile game system 100.

According to other aspects of the present disclosure, the illuminated tile 506 and replaceable light-permeable decorative skin 508 can be configured in a 2×2 grid-unit square format and provided in a multiplicity. These 2×2 illuminated tile units (and illuminated tile units 506) can furthermore be configured such that the multiplicity of units can be remotely controlled by a separate control unit, whether by RF, Bluetooth, Wi-Fi, IR, or other remote control technology that has the ability of actuating synchronized light function change on the multiplicity of illuminated tile units.

According to some aspects of the present disclosure, the illuminated tile units 506 can be placed in an adjacent position to each other, for example, either side to side, or corner to corner, in a meandering or directed pattern, within the tile game system 100. For example, a plurality of paired replaceable light-permeable decorative skin pieces 508 can be configured with decorative side 516 designs representative of a unified path of flow. This unified path of flow can be presented as naturally occurring flows, including but not limited to, lava flows, water flows, and in the world of fantasy, energy flows, fire flow, ice flows, electricity flows, stone path flows, crystal flows, organic matter flows, and the like. These flows can also be presented as non-natural occurring flows, including but not limited to, built pathways or architectures represented as stone, masonry, steel or other built items of a modern, futuristic, fantastic, or ancient styles.

Furthermore, each of the illuminated tile units 506 can be controlled, separately or together, by one or more controllers, such that an effect of flow can be attained among the plurality of units comprising the unified path flow. As an example, where the plurality illuminated tile units 506 and the replaceable light-permeable decorative skin pieces 508 are configured to represent a stream or river, a prescribed light operation can toggle light-emission between light blue, blue, and dark blue. This random oscillation of hues of blue amongst the plurality of replaceable light-permeable decorative skin units 508 can provide the illusion of flowing water.

Figure 18:
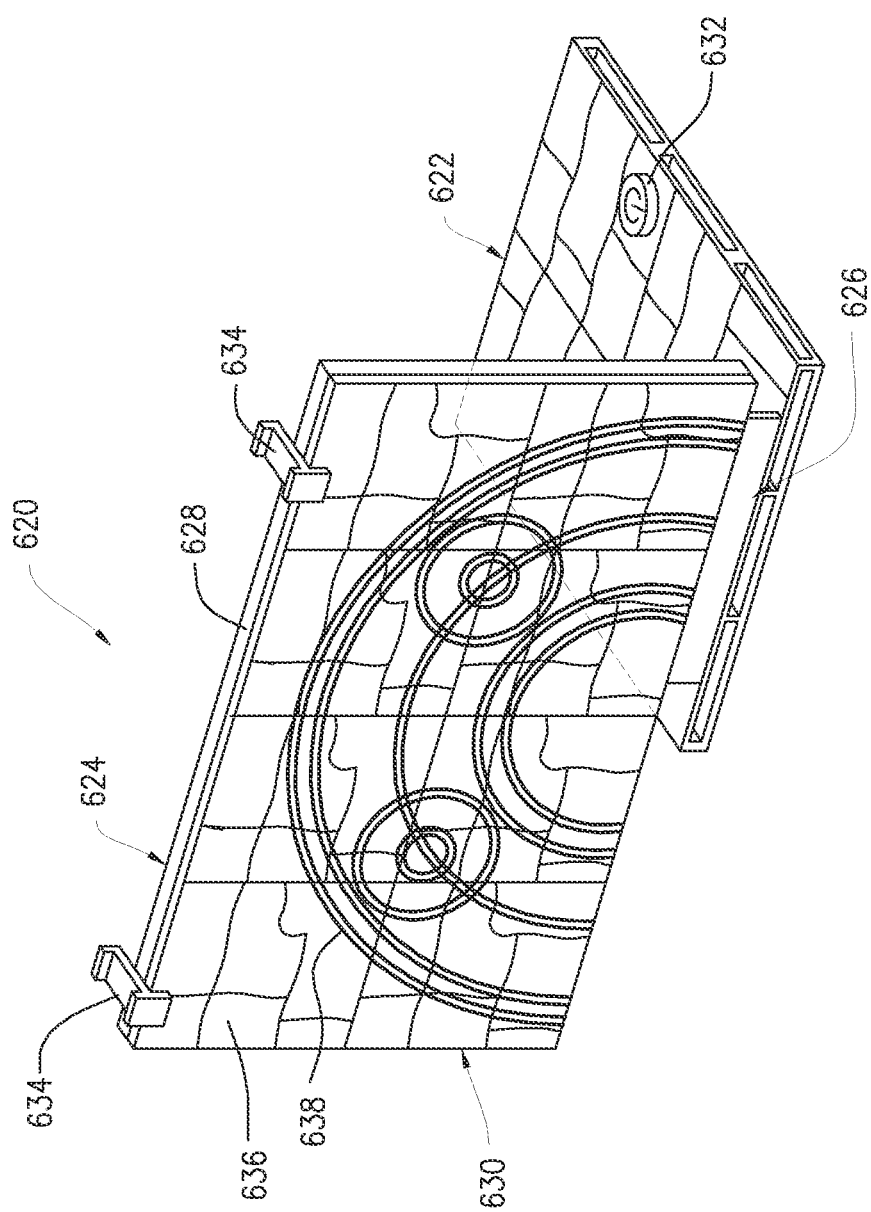
FIG. 18 is a perspective view of an illuminated internal boundary according to some aspects of the present disclosure.

FIG. 18 is a perspective view of an illuminated internal boundary 620 including a base tile portion 622 and a vertical wall 624. As shown, the vertical wall 624 can be coupled to an edge of the base tile 622 and extend upward at a generally perpendicular angle thereto, such that the vertical wall 624 can be positioned between the base tile 622 and an adjacent tile (e.g., tiles 102, 104, or 106). Similar to interior boundary 120, the illuminated internal boundary 620 can include a recessed section 626 at the bottom of the vertical wall 624, allowing for a base 148 of a game figure 108 (see FIG. 4) to extend therein and preventing the base 148 of the game figure from extending onto one or more adjacent grid squares 150.

The vertical wall 624 of the of the illuminated internal boundary 620 can include a backlight 628 and a light permeable skin 630. The backlight can be formed from a light-transmissive and/or scattering material and can include a light source (e.g., LED edge-lighting) that projects light in one or more directions (e.g., perpendicular to each vertical side of the backlight 628). Additionally, the light source of the backlight 628 can be coupled to an external power source, or a power source (e.g., a battery) can be positioned within the base tile 622. Furthermore, the base tile 622 can include a button 632, or the like for controlling operation of the backlight 628. For example, similar to the illuminated tile unit 506, the backlight 628 can be configured with a plurality of programs, such as for varying the colors and patterns of the light produced by the light source.

As shown in FIG. 18, the light permeable skin 630 can be positioned directly adjacent to, and cover, the backlight 628, such that the backlight is not visible when viewed from a direction normal thereto. The light permeable skin 630 can be removably attached to the backlight 628 (e.g., via clips 634 or the like) and a light permeable skin 630 can be positioned on either side of the backlight 628. The light permeable skin 630 can be substantially similar in form and function to the light permeable decorative skin 508, and thus, can include an opaque skin area 636 and a light permeable skin area 638, allowing light from the backlight 628 to pass therethrough in a predetermined pattern. According to other aspects of the present disclosure, the illuminated internal boundary 620 can be configured to have a generally similar form to internal boundary 120. Specifically, the vertical wall 624 if the illuminated internal boundary 620 can include a power source for powering the backlight 628 and a button 632, or the like, for controlling operation thereof, and therefore does not need to be coupled to the base tile 622.

Figure 19:
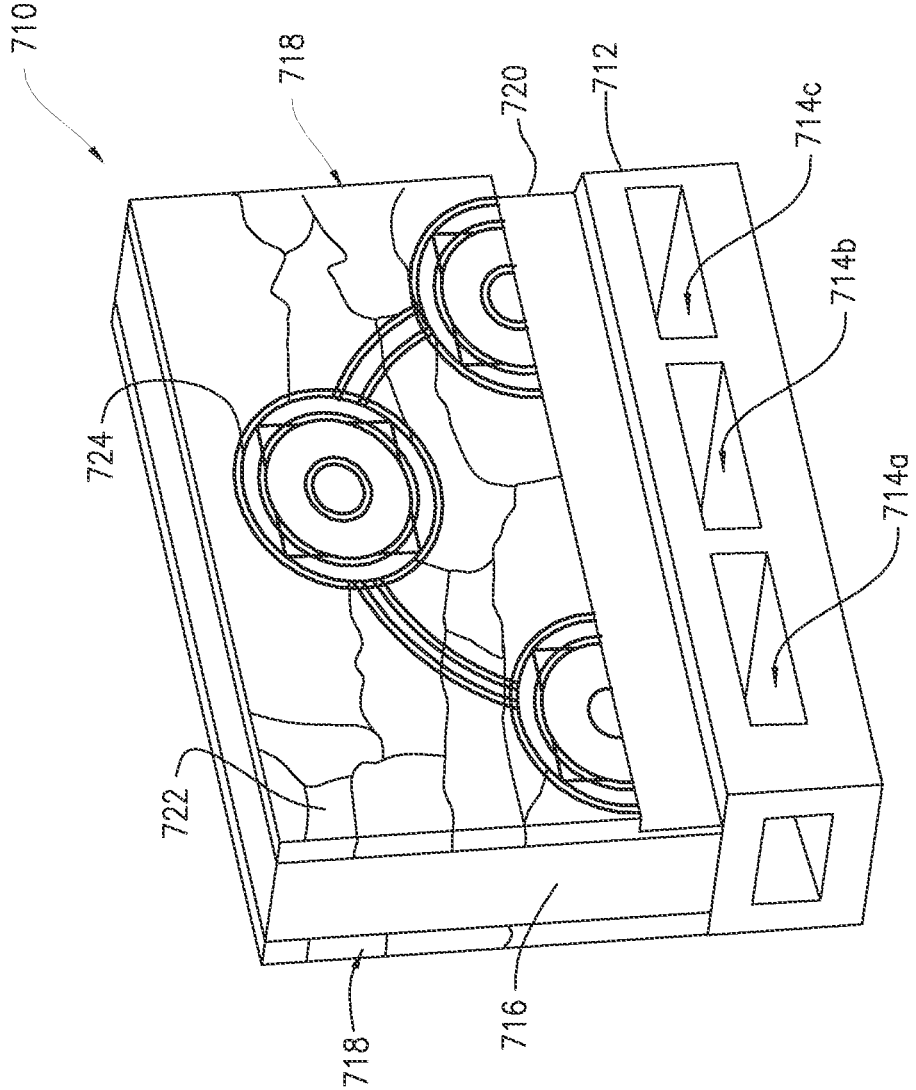
FIG. 19 is a perspective view of an illuminated external boundary according to some aspects of the present disclosure.

FIG. 19 is a perspective view of an illuminated external boundary 710 of the tile game system 100 of the present disclosure. Illuminated external boundary 710 can be substantially similar in form as the external boundary 110 and substantially similar in function as the illuminated internal boundary 620, except for the distinctions noted herein. As shown, the illuminated external boundary 710 can include a base 712 with one or more apertures 714 (e.g., apertures 714a-c) configured to accept a locking clip 126 for attachment to one or more adjacent tiles (e.g., tiles 102, 104, 106, or any illuminated tile or segment disclosed herein), a vertical backlight 716 extending generally perpendicular from the base 712, and one or more light permeable skins 718 removably attached to one, or both, sides of the backlight 716. The light permeable skin 718 can be substantially similar in form and function to the light permeable decorative skin 508, and thus, can include an opaque skin area 722 and a light permeable skin area 724, allowing light from the backlight 716 to pass therethrough in a predetermined pattern. Similar to exterior boundary 110, illuminated external boundary 710 can include a recessed section 720, allowing for a base 148 of a game figure 108 (see FIG. 4) to extend therein and preventing the base 148 of the game figure 108 from extending onto one or more adjacent grid squares 150. Like the illuminated internal boundary 620, the illuminated external boundary can be coupled to an external power source, or include a power source therein (e.g., a battery), for providing power to the backlight and can include a button or switch for controlling operation thereof.

Figure 20:
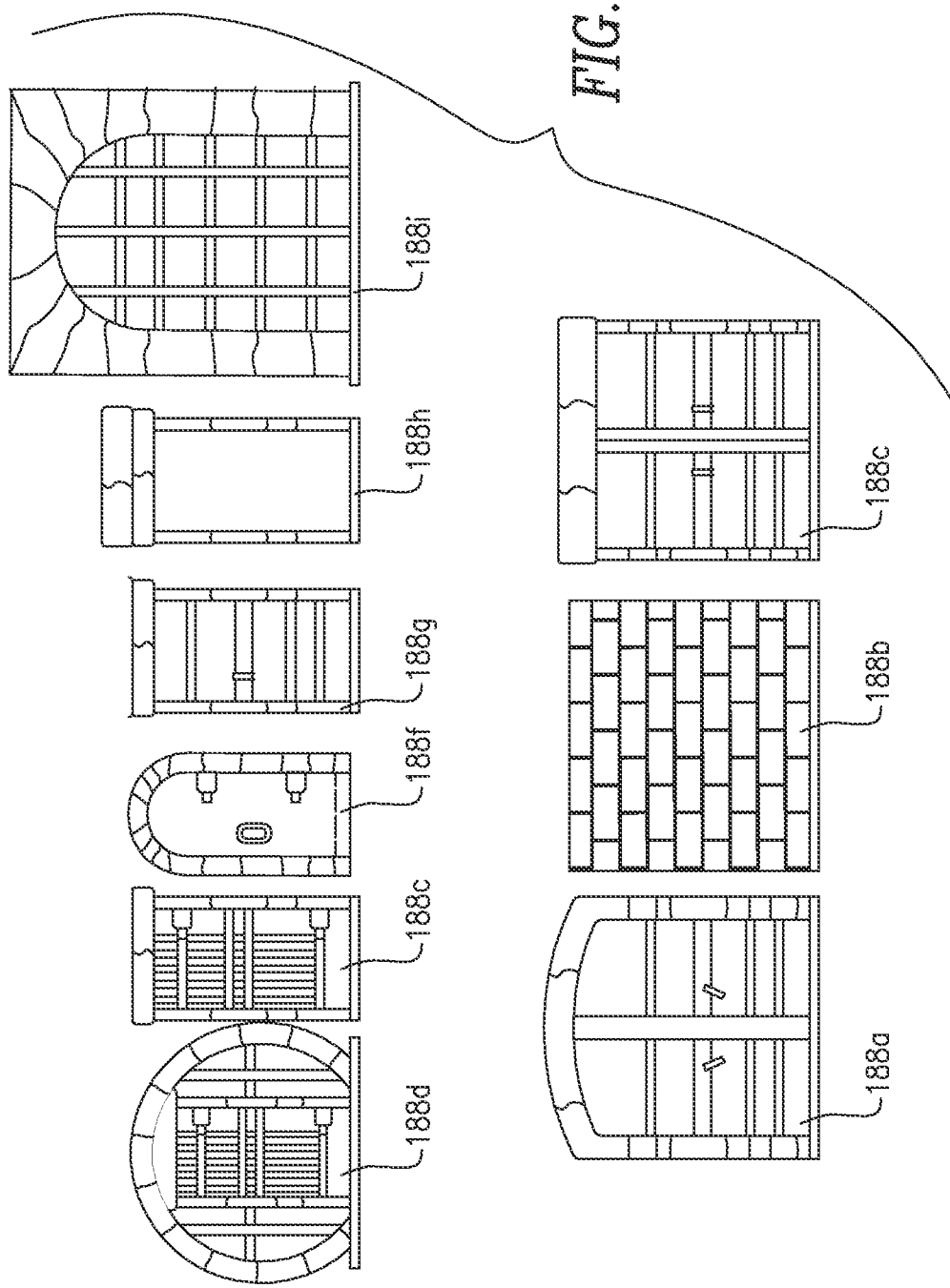
FIG. 20 illustrates a plurality of game components according to some aspects of the present disclosure.
Figure 21:
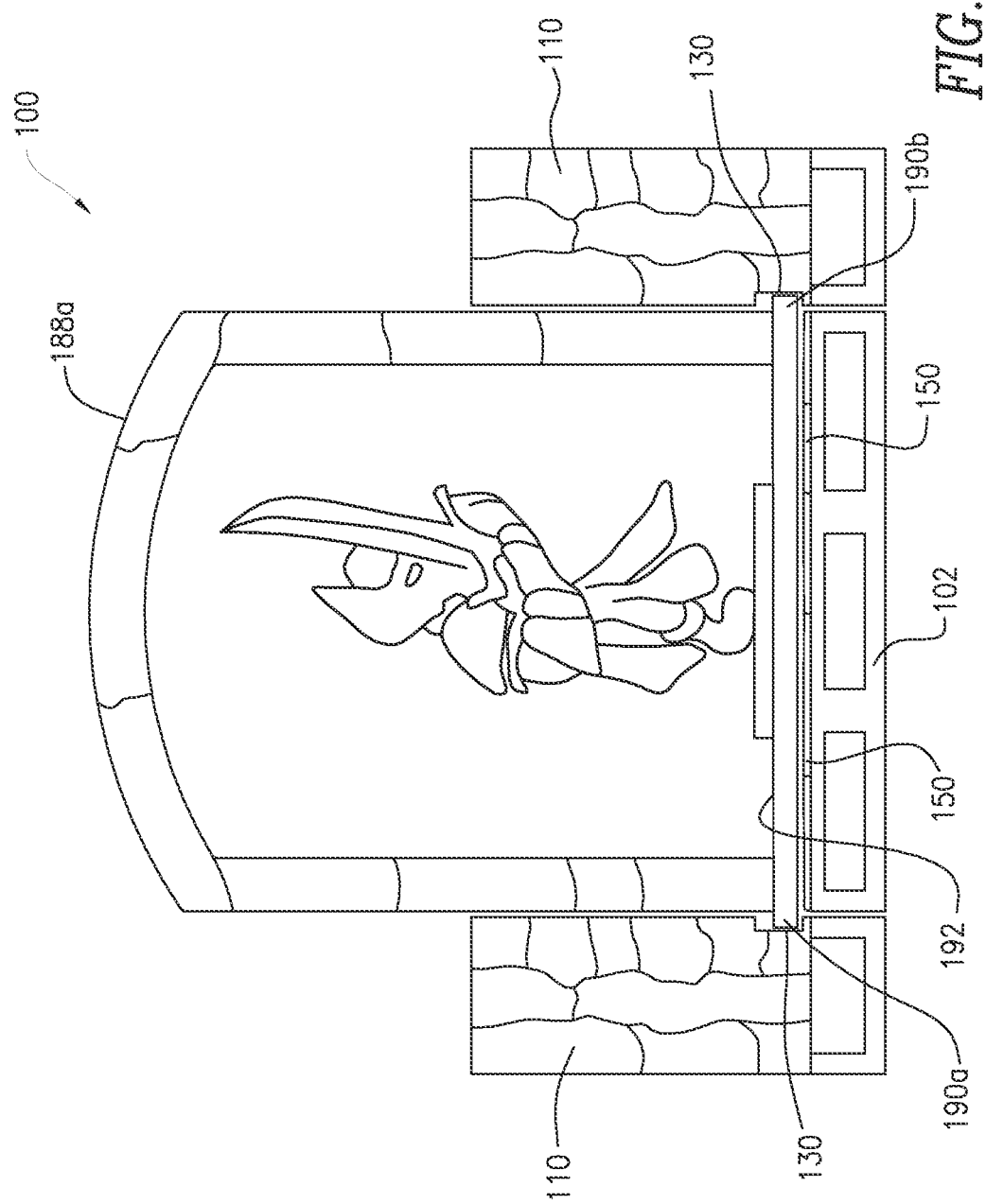
FIG. 21 illustrates a game component of FIG. 20 positioned within the tile game system of the present disclosure.

FIG. 20 shows a plurality of game components 188a-i of the tile game system 100 according to some aspects of the present disclosure and FIG. 21 shows the game component 188a positioned within the tile game system 100 of the present disclosure. As shown, each of the game components 188a-i can be configured to be positioned on top surfaces of the modular base tiles (e.g., tiles 102, 104, and 106) of the system 100. Furthermore, each of the game components 188a-i can be configured to have a with that is substantially equal to one or more grid squares 150 of the modular base tiles. For example, as shown in FIG. 21, game component 188a has a width that is approximately equal to the width of the modular game tile 102 (e.g., the width of two grid squares 150), with outermost edges 190a and 190b of a base 192 of the game component 188a being received within the recessed sections 130 of the external boundaries 110. The game components can also have a with less than, or greater than, that of modular base tile 102. For example, as shown in FIG. 20, each of game components 188e-h have a width that is half of the modular base tile 102 (e.g., the width of a single grid square 150). According to some aspects of the present disclosure, the game components 188a-i can also be magnetically attracted to the modular game tiles by way of magnets disposed therein. For example, the base 192 of the game component 188a can included a ferrous material, and the modular game tile 102 can have one or more magnets disposed therein (see, e.g., FIG. 5), thereby magnetically attracting, and securing, the game component 188a to the modular base tile 102.

Figure 22:
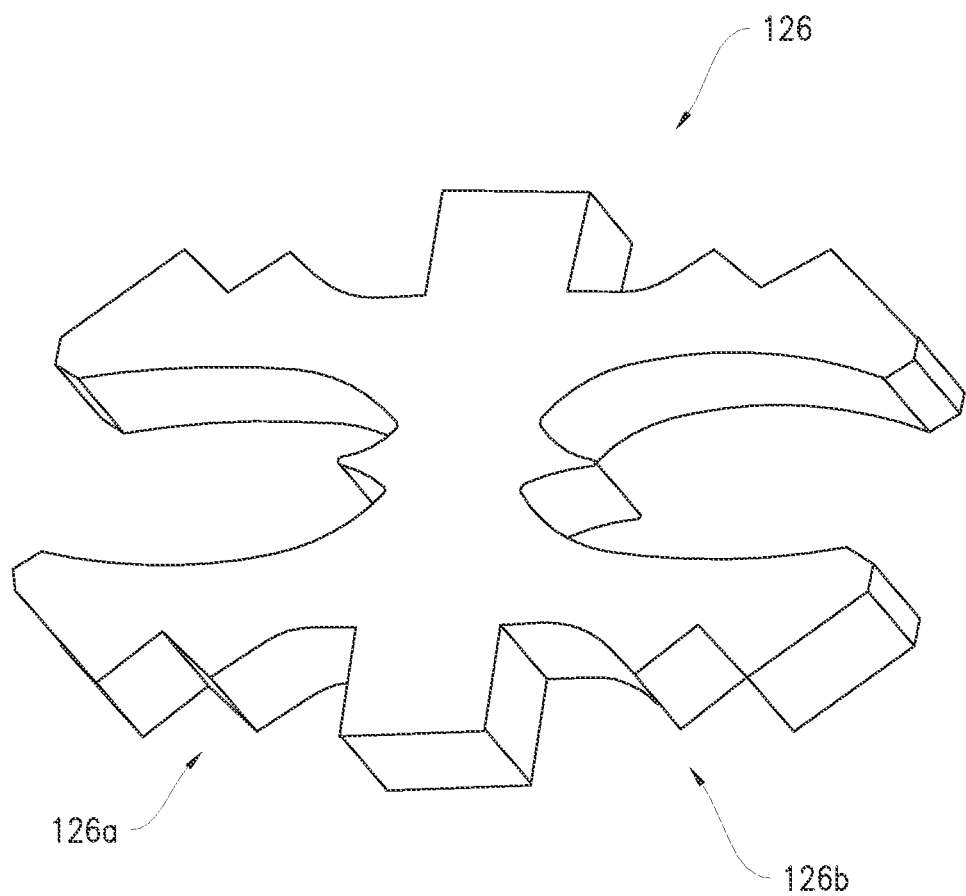
FIG. 22 is a perspective view of a locking clip according to the present disclosure.
Figure 23:
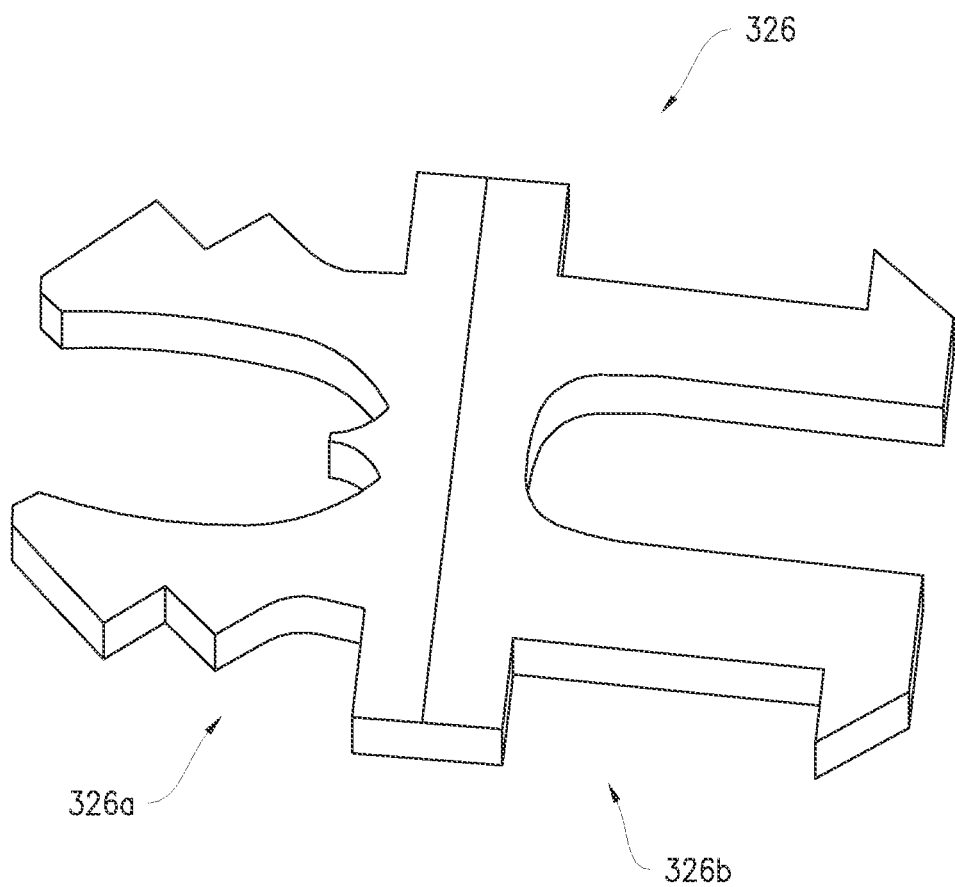
FIG. 23 is a perspective view of another locking clip according to the present disclosure.

FIGS. 22 and 23 illustrate locking clips for use with the tile game system 100 of the present disclosure. More specifically, FIG. 22 is a perspective view of the locking clip 126 having a first half 126a configured to engage a first game component disclosed herein and a second half 126b configured to engage a second game component disclosed herein. FIG. 23 is perspective view of a locking clip 326 having a first half 326a configured to engage a first game component disclosed herein and a second half 326b configured to engage a second component that is different from the first game component. For example, first halves 126a and 326a and second half 126b can be similar and can be configured to engage the modular tiles (e.g., tiles 102, 104, 106, etc.), boundaries (e.g., boundaries 110, 710, etc.), and other components of the present disclosure. Conversely, the second half 326b shown in FIG. 23 can be configured to engage different components having different locking mechanisms. Furthermore, the second half 326b can encompass a plurality of different configurations and game component attachment systems, in addition to the double pronged structure shown in FIG. 23. As such, locking clip 326 can include the first half 326a and any one of a plurality of second halves 326b specifically configured to be coupled to a specific game component. Accordingly, locking clip 326 can be configured to couple the game components of the present disclosure to other systems having distinct components and locking systems. Further still, the second half 326b of locking clip 326 can comprise a game component. Thus, according to some aspects of the present disclosure, the first half 326a of locking clip 326 can be coupled (e.g., permanently or removably) to a game component, such that a game component having the first half 326a of locking clip 326 can be coupled to, and used in connection with, the game components disclosed herein.

Figure 24:
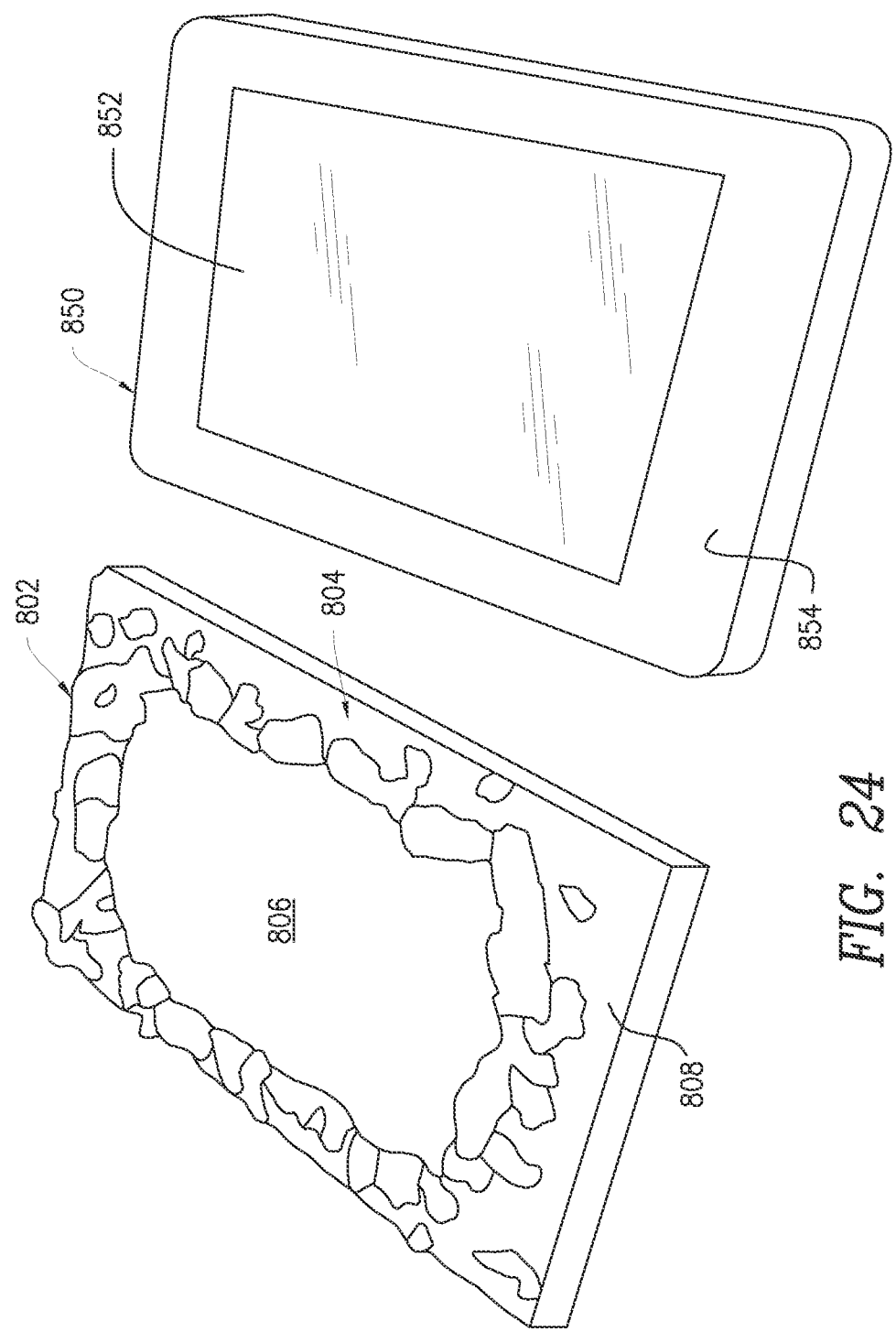
FIG. 24 is a top perspective view of a video framing system according to the present disclosure.
Figure 25:
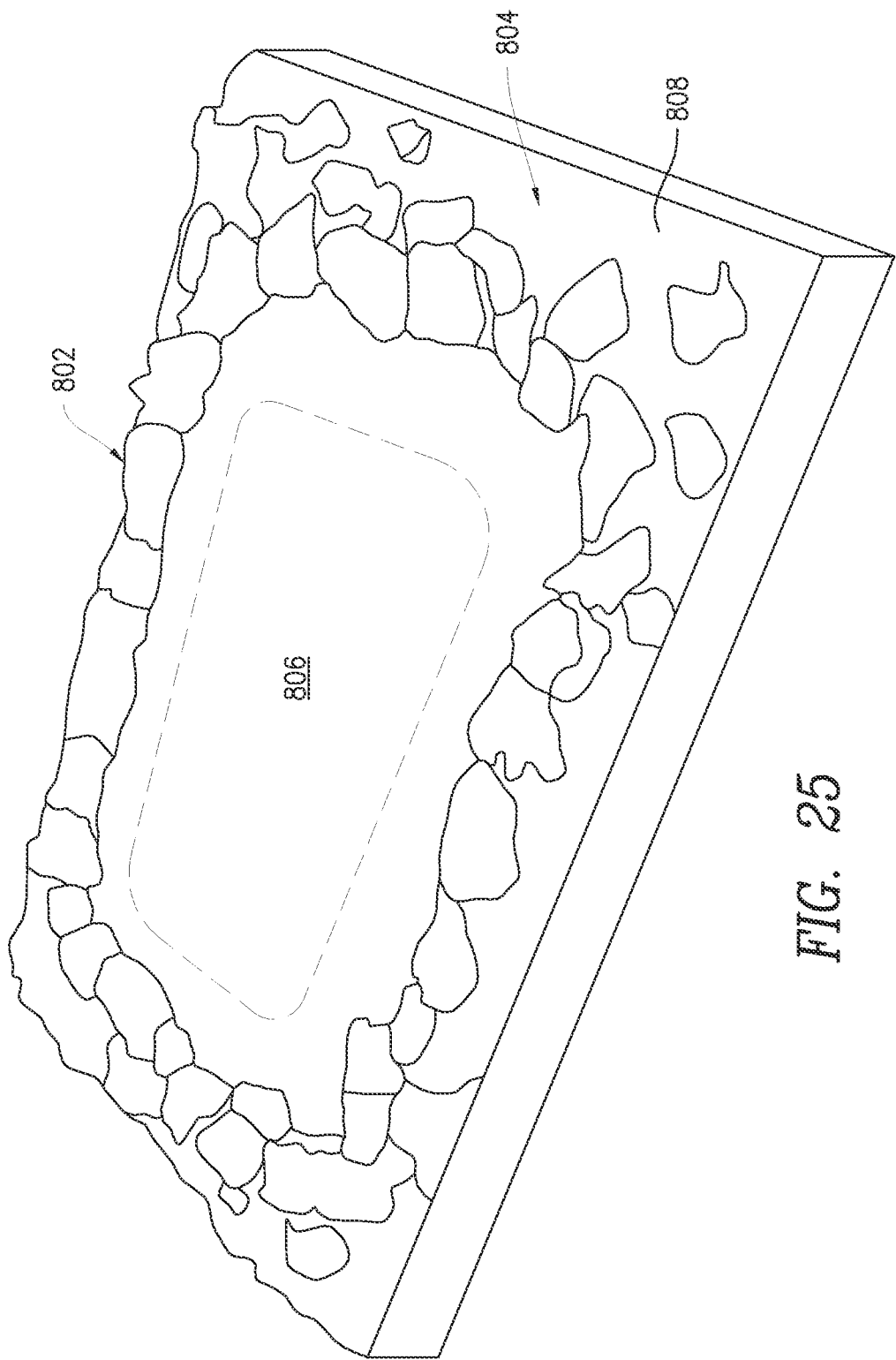
FIG. 25 is another top perspective view of a frame of the video framing system of FIG. 24.
Figure 26:
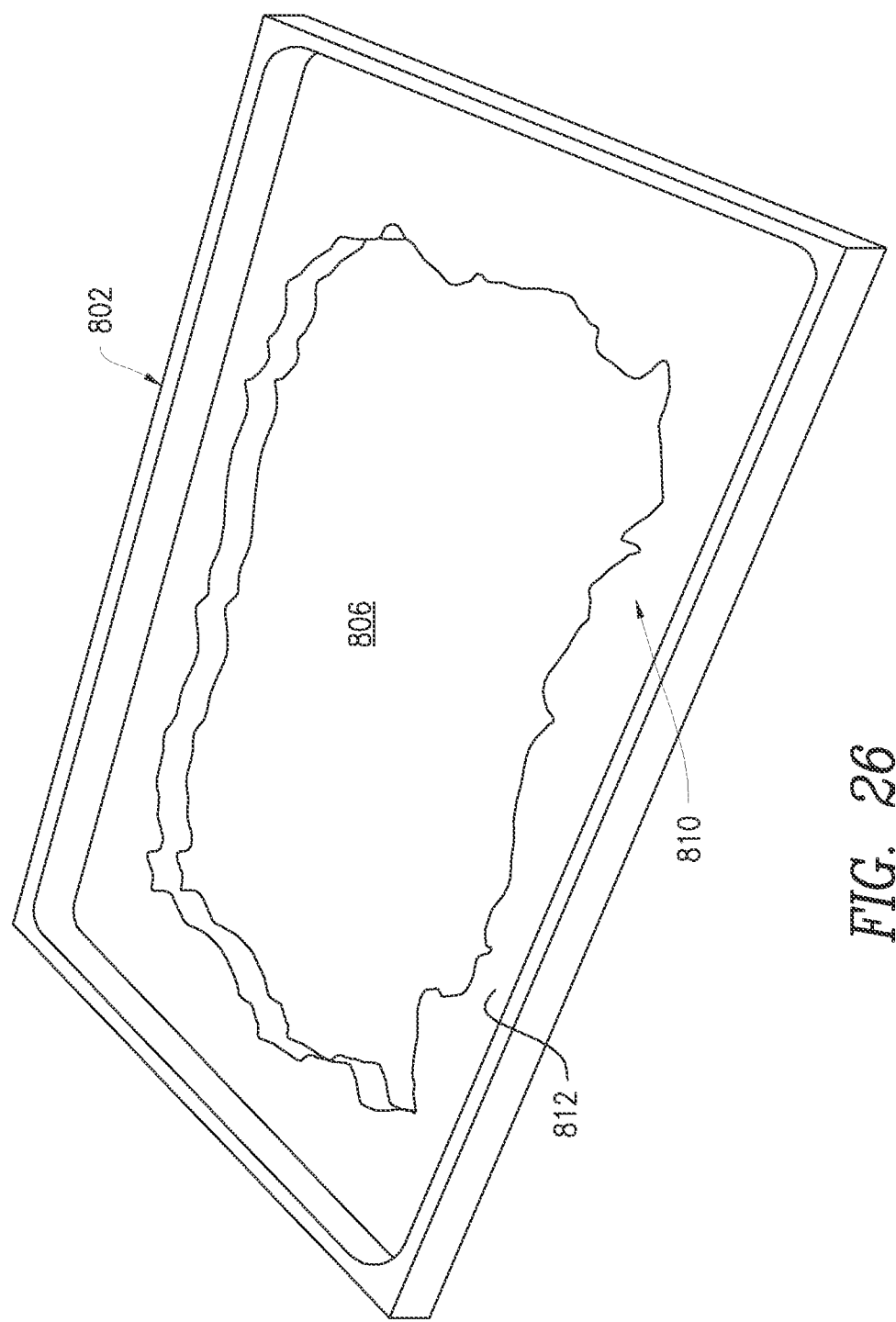
FIG. 26 is a bottom perspective view of the frame of the video framing system of FIG. 24.
Figure 27:
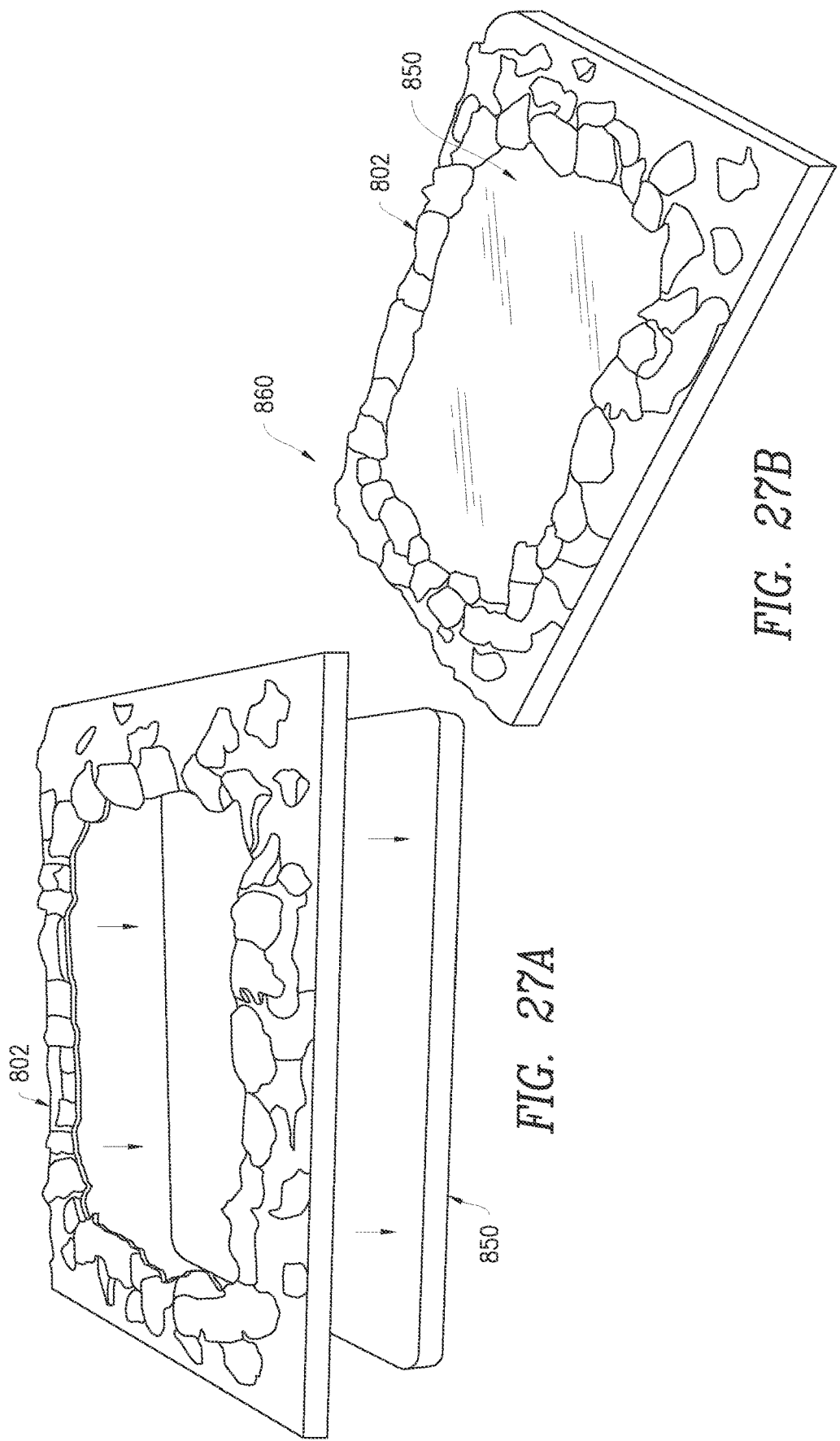
FIGS. 27A and 27B show components of the video framing system, illustrating a connections therebetween.

FIG. 24 illustrates a tile-based video framing mechanism 802 (hereinafter, frame 802) for integrating a video screen device 850 into the playable grid-space of the continually contiguous square-grid tile system 100 of the present disclosure. As shown in FIG. 25, the frame 802 is configured such that a peripheral area 804 has an opening 806 for viewing a display screen 852 of the video screen device 850. The peripheral area 804 also has a terrain side 808 and, as shown in FIG. 26, a concave nesting side 810, such that when the frame 802 is placed upon the video screen device 850, an interior surface 812 of the concave nesting side 810 can abut a display periphery 854 of the display screen 852 of the video screen device 850. FIG. 27A is and exploded view showing the frame 802 being positioned on the video screen device 850 and FIG. 27B shows the frame 802 fully engaged with the video screen device 850, together forming a combined frame and video screen device unit (hereinafter, frame screen unit 860).

Figure 28:
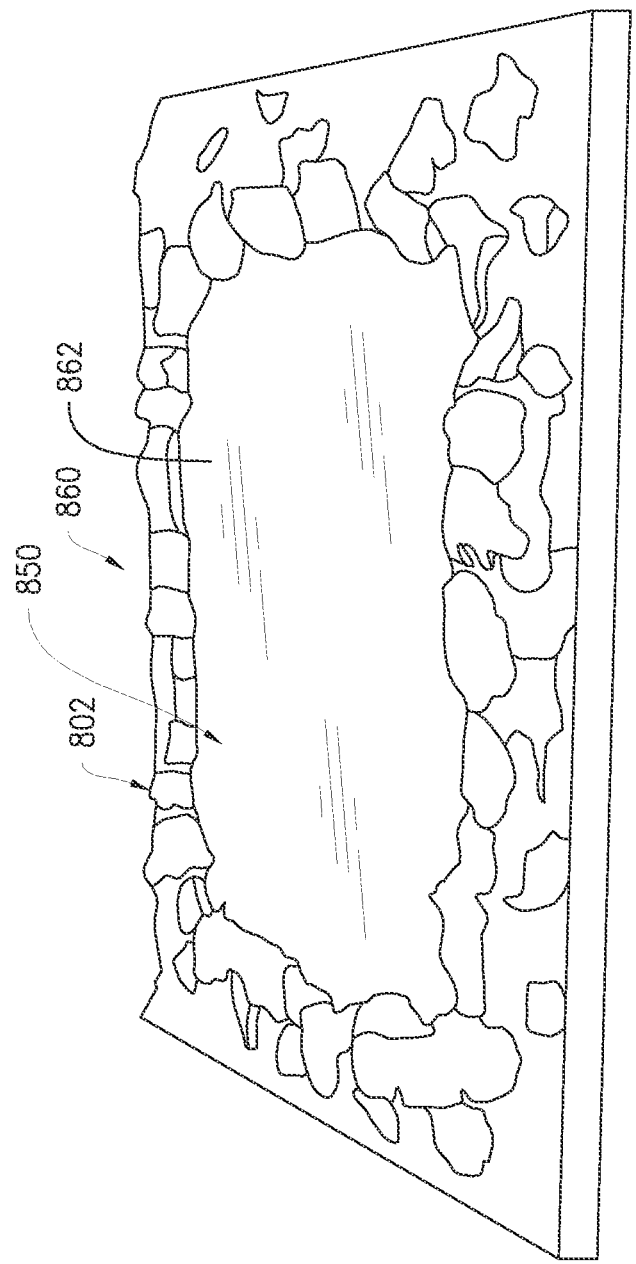
FIG. 28 is perspective view of the video framing system of FIG. 24, with video content displayed thereon.

Furthermore, as depicted in FIG. 28, the video screen device 850 can display contextual video content 862, which can be viewed through the opening 806. Specifically, the video screen device 850 can be configured to display the contextual video content 862, including one or more graphical representations of various in-game terrains and other gameplay elements. Furthermore, the contextual video content 862 can include both dynamic content (e.g., a moving video), static content (e.g., a "paused" video, static image, or other static graphical rendering), or a combination thereof presented on the display screen 852 of the video screen device 850. According to some embodiments of the present disclosure, the video screen device 850 can also be provided with an audio system (e.g., one or more internal or external speakers, including wired or wireless connectivity thereto) that can generate audible content. The audible content can be contextual and synchronized with the contextual video content 862 (e.g., a "flowing water" sound can be played if a river is displayed on the video screen device), can be triggered by active gameplay elements (e.g., a "fire" sound can be played if the video screen device displays flowing lava and a game piece is positioned thereon, or a "cracking ice" sound can be played if the video screen device displays a frozen lake and a game piece is positioned thereon), or can be independently selected by a user (e.g., chosen from a list of musical compositions designed to enhance the immersion of the players in the gameplay environment). The peripheral area 804 can also be configured to represent one or more in-game terrains and other gameplay elements. For example, as shown, the peripheral area 804 can emulate a rocky volcanic terrain and the contextual video content 862 may represent moving or bubbling lava. According to another example, the peripheral area 804 can emulate a botanical shore line and the contextual video content 862 may represent flowing river water. It should be understood that the peripheral area 804 and the contextual video content 862 can be configured to represent any combination of in-game terrains and/or environments without departing from the spirit and scope of the present disclosure.

The video screen device 850 can be any device with a flat viewing surface (e.g., screen) displaying a pixelated moving or static image. The video screen device 450 may include, but is not limited to, a memory card driven marketing tablet, a smart phone (such as an iphone, or the like), a tablet computer (such as an ipad, kindle, or the like), a separately purchasable component OEM screen (such as Raspberry Pi Screens, or the like), any of the previously mentioned exemplary devices reconfigured or customized such that the display screen 852 is still functional in an otherwise altered device, or any other device having a screen using LCD, LED, OLED, QLED, plasma or any other technology existing or yet to be invented, that is capable of displaying a pixelated moving image, static image, graphical representation, or the like.

Figure 29:
FIG. 29 is a perspective view of the video framing system of FIG. 24 in connection with the tile game system of the present disclosure.
Figure 30:
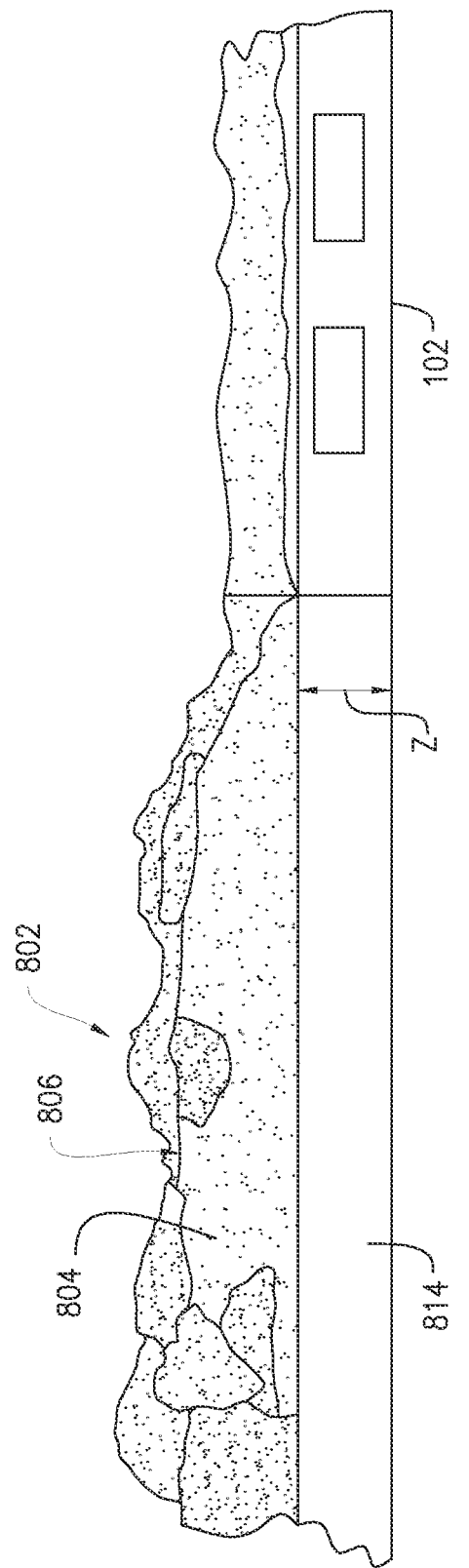
FIG. 30 is a side view of the video framing system of FIG. 24 in connection with the tile game system of the present disclosure.

As illustrated in FIG. 29, the rectangular periphery has a length dimension "X" and a width dimension "Y", which are whole number multiples of the base grid unit length (e.g., a grid square 150, shown in FIG. 4). In the embodiment shown in FIG. 29, the frame 802 is 7×4 base grid unit lengths. Additionally, as illustrated in FIG. 30, the peripheral area 804 can be characterized by a gradation of sculpt extending from the opening 806 to side walls 814 of the frame 802. For example, the peripheral area 804 of the frame 802 can have a maximum height about the opening 806 and the peripheral area 804 can have a minimum height dimension "Z" where the peripheral area 804 meets the side walls 814 of the frame 802. As shown, the height dimension Z of the side walls 814 is generally equal to the height of the modular base tiles 102 described herein. At the point of elevation Z, the side walls 814 of the frame 802 can be configured as a vertical plane perpendicular to the resting horizon of frame 802, such that an adjacent modular base tile 102 can sit unobstructed creating a continuous threshold from the frame 802 to the adjacent modular base tile 102.

Figure 31:
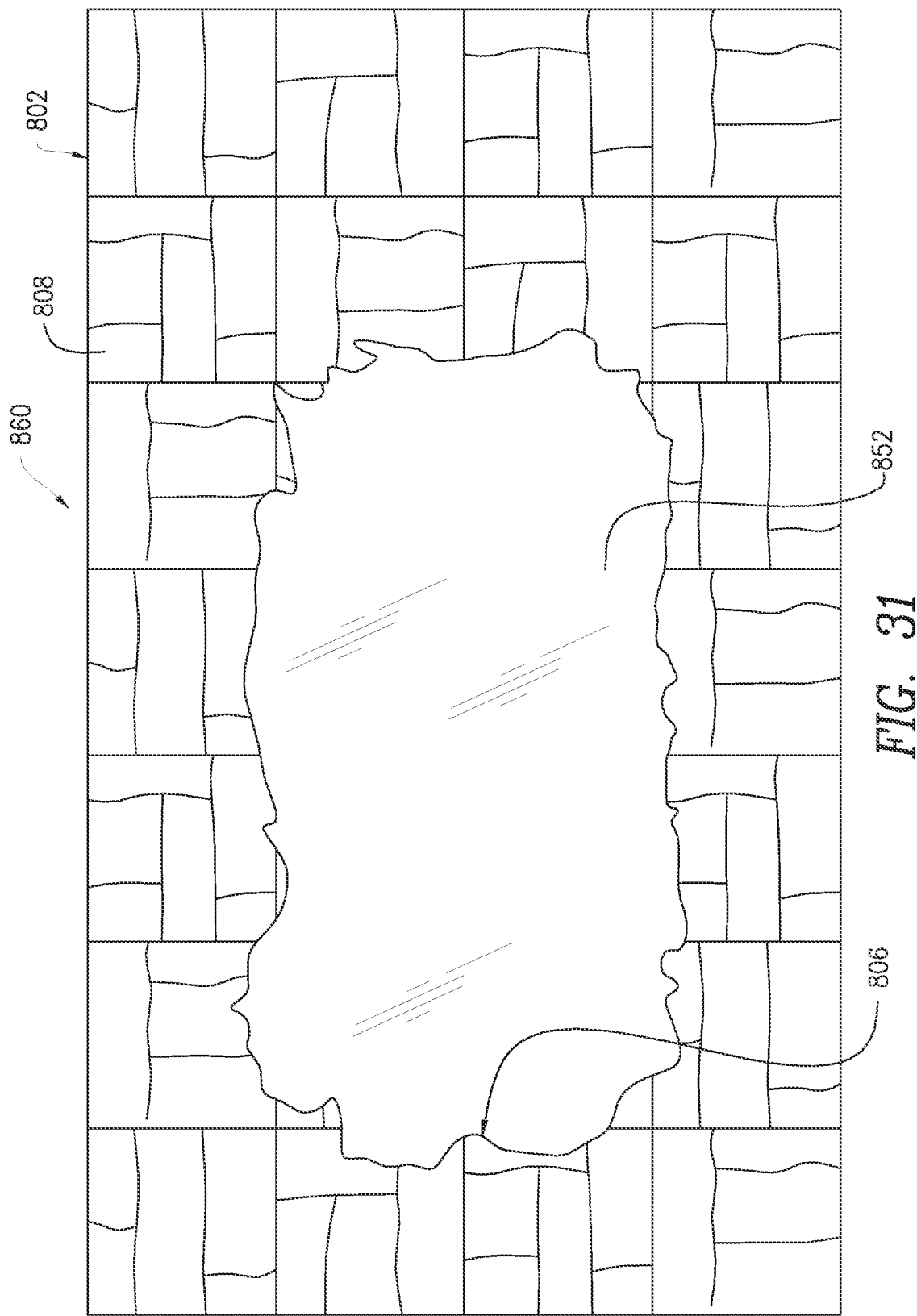
FIG. 31 is a top view of another video framing system according to the present disclosure.

FIG. 31 presents another embodiment of the frame screen unit 860, where the terrain side 808 of the frame 802 is configured such that the manifesting surface area of the peripheral area 804 closely approximates the surface area of a whole unit base grid space (e.g., formed from one or more whole 1×1 grid units). Furthermore, the exposed surface area of the display screen 852, visible through the opening 806, can also closely approximate a whole unit base grid space (e.g., formed from one or more whole 1×1 grid units). In this close approximation to grid unit spaces, figures can be played using the same table rules bounding figures playing on the modular base tiles described herein.

Figure 32:
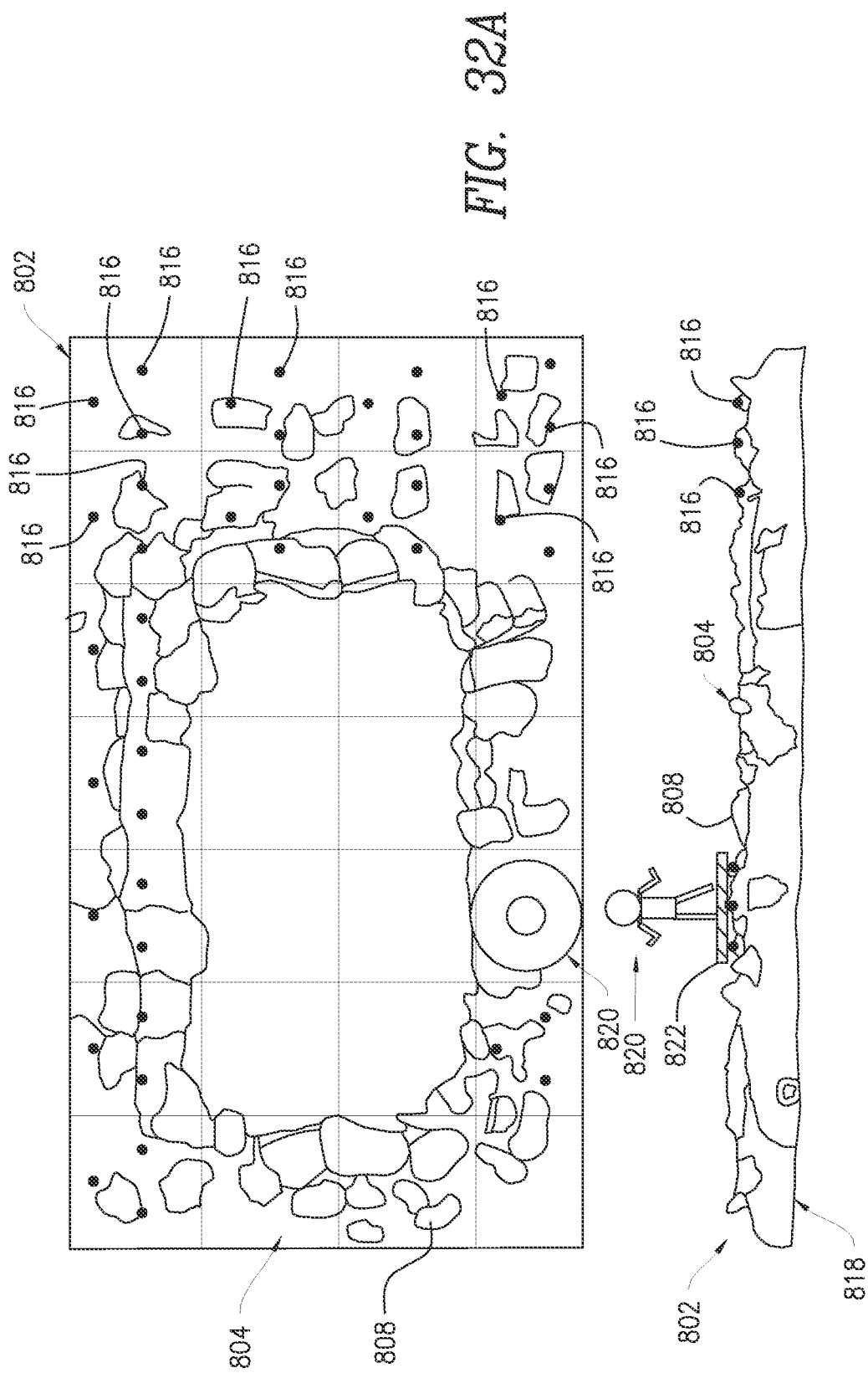
FIGS. 32A and 32B illustrate another video framing system according to the present disclosure, including a plurality of protrusions configured to position a game figure thereon.

FIGS. 32A and 32B show another embodiment of the frame 802 of the present disclosure having a plurality of protruding design elements 816 positioned on the terrain side 808 of the frame 802. Specifically, FIG. 32A is a top view of the frame 802 having the protruding design elements 816 and FIG. 32B is a side elevational view of the frame 802 with the protruding design elements 816. As shown in FIGS. 32A and 32B, the protruding design elements 816 can be configured as rock terrain, or any other terrain, having a minimum of three points of equal elevation (e.g., three protruding design elements having equal height relative to a bottom side 818 of the frame 802) within an approximated grid unit square of the terrain side 808. In this configuration, a base 822 of an RPG FIG. 820 has the ability to sit upright and stabilized on an apparently un-uniform and irregular foundation of the peripheral area 804. According to some embodiments, the three points of equal elevation can be equidistant from each other.

Figure 33:
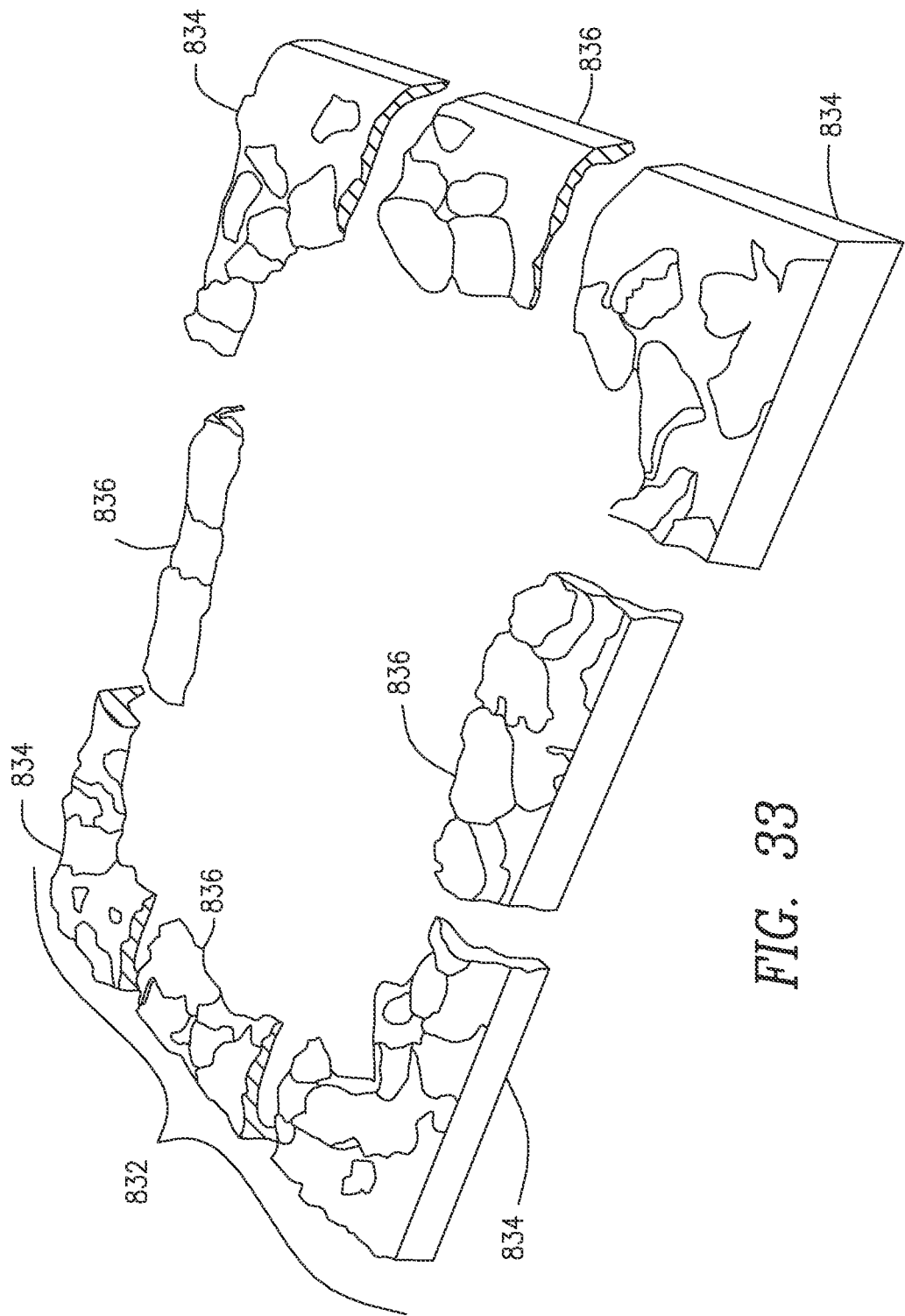
FIG. 33 is an exploded view of another video framing system according to the present disclosure.

FIG. 33 is an exploded view of another tile-based video framing mechanism (hereinafter, frame 832) of the present disclosure. As shown, the frame 832 is presented as a multi-piece reconfigurable frame structure including permanent corner pieces 834 that can interconnect with a multiplicity of variable length side pieces 836 to form a dynamic frame mechanism with a variable frame length dimension "X" and a variable frame width dimension "Y." As discussed in connection with frame 802, it should be noted that the length and width dimensions of frame 832 adhere to measurements that are a whole number multiple of a base grid unit length (e.g., multiples of a 1×1 grid unit). In this configuration, video screen devices (e.g., video screen device 450, not shown) of varying sizes and shapes can be utilized with a single frame 832, obviating the need to purchase a non-reconfigurable static frame sized for each specific video screen device 450.

Figure 34:
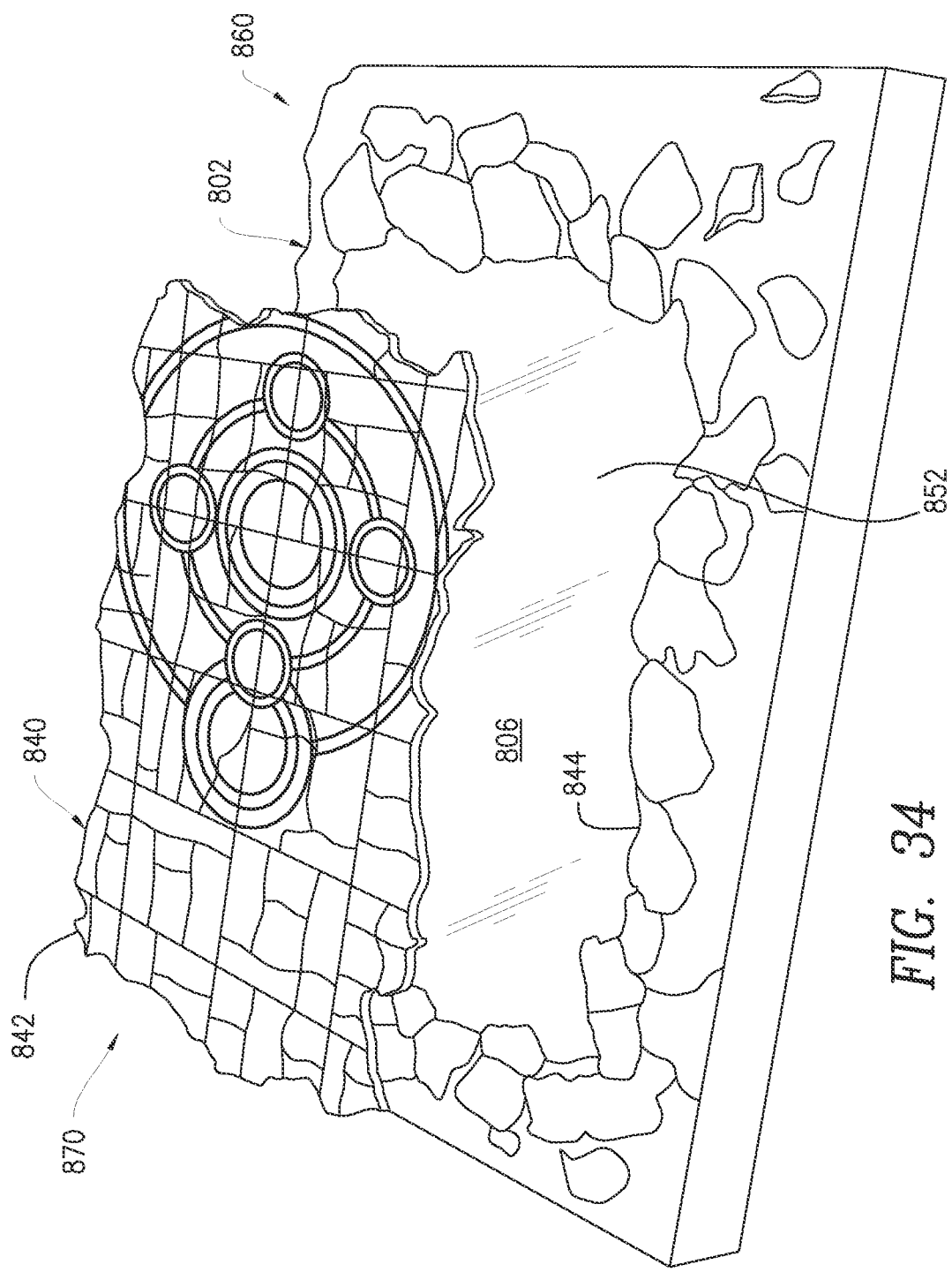
FIG. 34 is an exploded view illustrating a light permeable skin positioned on the video framing system of FIG. 24.
Figure 35:
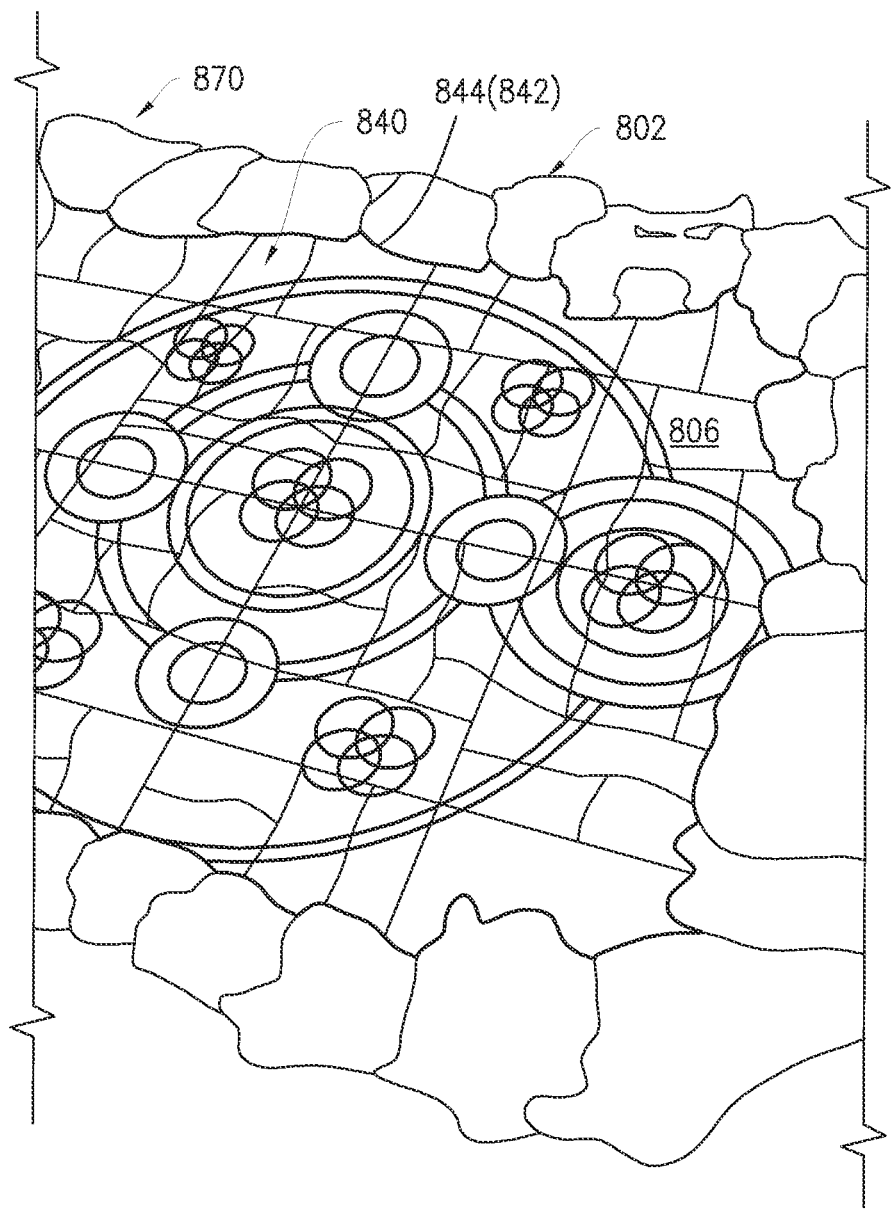
FIG. 35 is a perspective view of the light permeable skin positioned on the video framing system of FIG. 24, illustrating operation thereof.

FIG. 34 depicts a dynamic light illuminated tile system 870, including a replaceable light-permeable decorative skin 840 (also referred to herein as skin 840) and the frame screen unit 860. In this configuration, the skin 840 can have a skin perimeter 842, such that the skin perimeter 842 is congruent with (e.g., corresponds and/or mates with) a perimeter 844 of the video display opening 806 of the frame 802. FIG. 35 is a perspective view of the illuminated tile system 870 showing the skin 840 positioned within the opening 806 of the frame 802. As shown, the replaceable light permeable decorative skin 840 sits atop the display screen 852 of the video screen device 850 (not shown) and within the video display opening 806 of the frame 802. Furthermore, while the perimeter 844 of the video display opening 806 shown in FIG. 35 is configured to be representative of a lava flow out-cropping, the video display opening 806 and/or its perimeter 844 can be configured to be representative of any other in-game environment and/or structure, such as, for example, of a geological, organic, geometric, or architectural nature, with the attendant congruence of the skin perimeter 842. While the illuminating decorative tile system 870 of the present disclosure can include a similar light-permeable decorative skin that is reliant on non-pixelated light (e.g., uniform and/or static light produced by an LED array or other light source, as shown and described in connection with FIGS. 44A-47) in practical application, FIG. 35 shows how the dynamic light illuminated tile system 870 can utilize pixelated light (e.g., non-uniform and dynamic light transmitted from video screen devices 850), creating highly controllable multi-colored light effects. Because the pixelated light produced by a video screen device 850 is highly controllable, the visual effects produced by the pixelated light passing through the light-permeable decorative skin 840 are equally controllable. For example, the pixelated light can be controlled to illuminate only a specific portion of the light-permeable skin 840, can illuminate one portion of the skin 840 in a first color and another portion of the skin 840 in another color (see, e.g., FIG. 35 showing a color gradient (from right to left)), can control the brightness of the visual effect in various areas of the skin 840, or a combination thereof.

Figure 36:
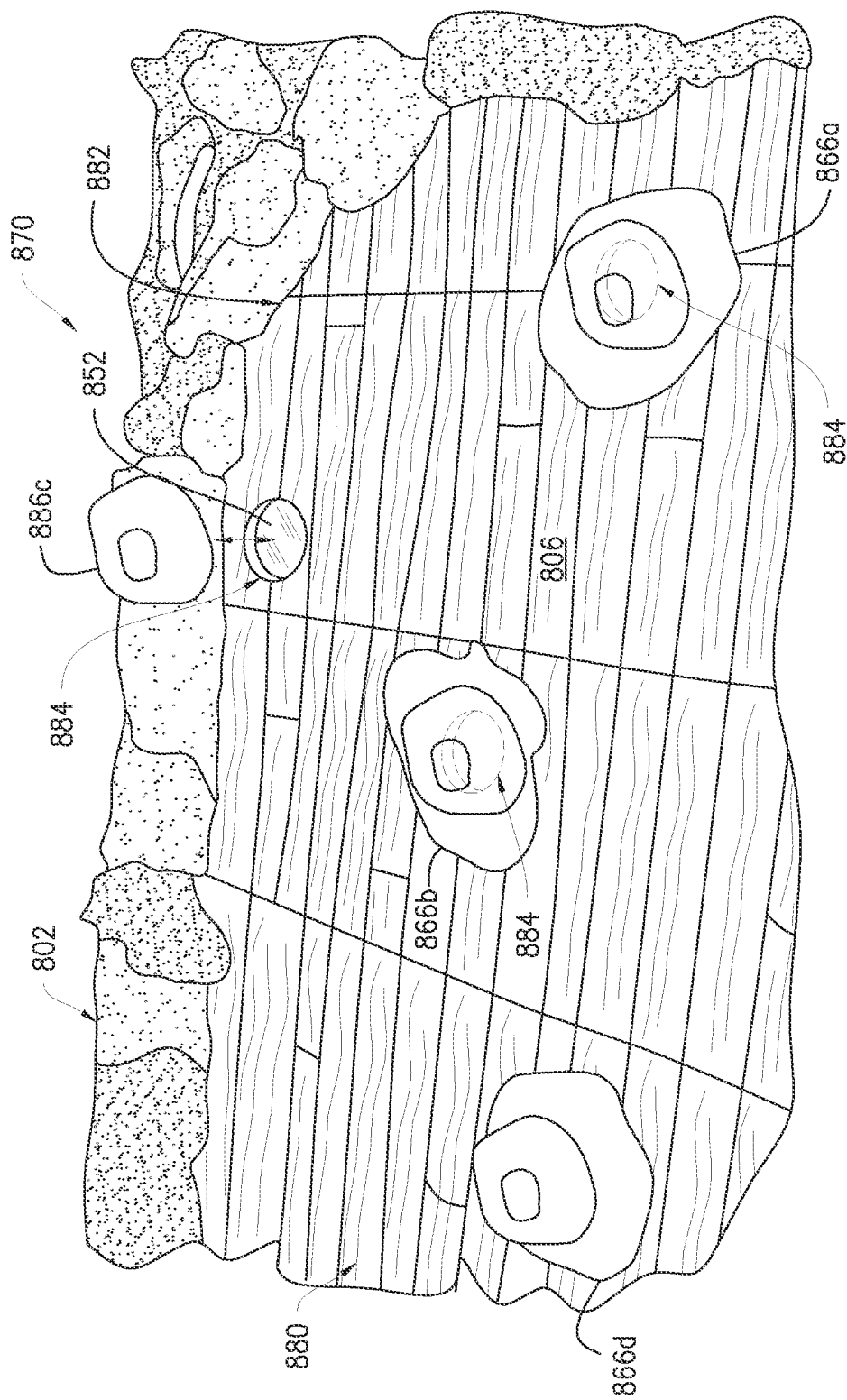
FIG. 36 is a perspective view of another light permeable skin according to the present disclosure, including receptacles for receiving light permeable pegs.
Figure 37:
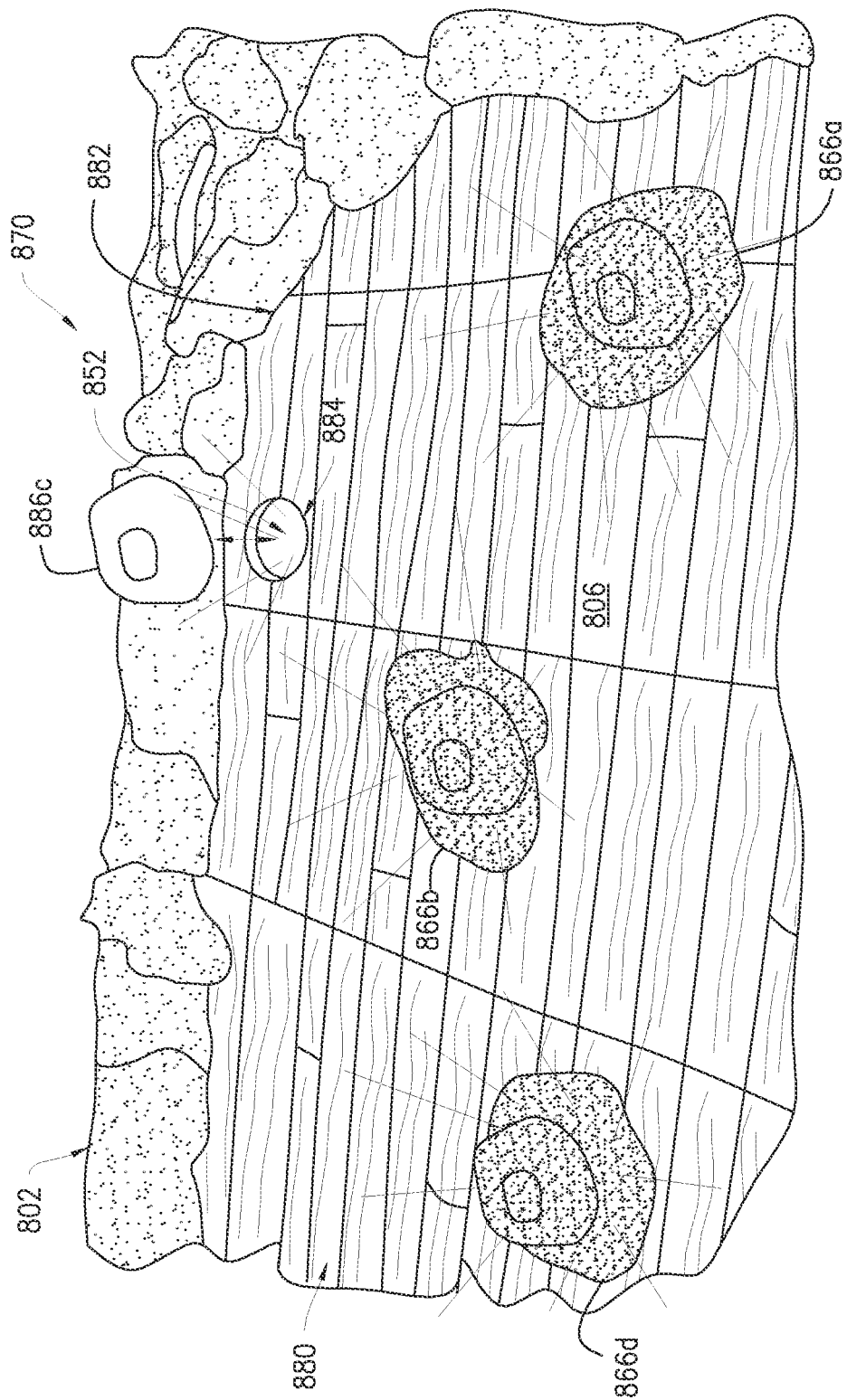
FIG. 37 is a perspective view of the light permeable skin and pegs of FIG. 36, illustration operation thereof.

FIGS. 36 and 37 are diagrams illustrating operation of the dynamic light illuminated tile system 870 and further provided with a replaceable light non-permeable decorative skin 880 (also referred to herein as skin 880). Specifically, FIG. 36 shows the dynamic light illuminated tile system 870 in an inactive state and FIG. 37 shows the dynamic light illuminated tile system 870 in an illuminated state. As shown, the replaceable light non-permeable decorative skin 880 is provided with a skin perimeter 882 configured such that the skin 880 can be positioned within the video display opening 806 of the frame 802. Within skin 880 are peg receptor apertures 884 formed such that all skin material within peg receptor apertures 884 is removed, and light transmission through peg receptor apertures 884 from one side of skin 880 to the other side of skin 880 occurs unhindered. The peg receptor apertures 884 can be any shape, but are optimally configured to allow for the greatest transmission of light from the display screen 852 through the peg receptor apertures 884. Furthermore, the skin 880 is provided with light transmittable pegs 886a-d (together, light transmittable pegs 886), which disperse and scatter light from the display screen 852 to create peg illumination of the light transmittable pegs 886. While the light transmittable pegs 886 shown in FIGS. 36 and 37 are depicted as light transmittable "globular" forms, they may also be represented in any form and size—whether organic, geological, animal, man-made, spiritual, or architectural including but not limited to crystals, totem poles, statues, fire, energy, clouds, apparitions, etc. without departing from the spirit and scope of the present disclosure. The light transmittable pegs 886 can also be decorated with paint such that only specific areas of the light transmittable pegs 886 are illuminated.

Additionally, as the display screen 852 can emit controllable light from the video screen device 850, emitted light can be synchronized in space and temporally with the pre-determined peg receptor apertures 884 of skin 880. In so doing, the light transmittable pegs 886 can be selectively illuminated at a specific time with a specific color based upon a pre-determined algorithm, program, routine, or the like. For example, as shown in FIG. 37, a first light transmittable peg 886a (at right) can be illuminated in a first (e.g., green) color, a second light transmittable peg 886b (at center) can be illuminated in a second (e.g., red) color, a third light transmittable peg 886c (at top) can be illuminated in a third (e.g., white/grey) color, and a fourth light transmittable peg 886d (at left) can be left unilluminated, or can be illuminated in any other color producible by the video screen device 850. The light transmittable pegs 886 can also illuminate in real time controlled by a user, such as a Director, Dungeon Master, or General Game Manager based on continually changing game parameters.

Figure 38:
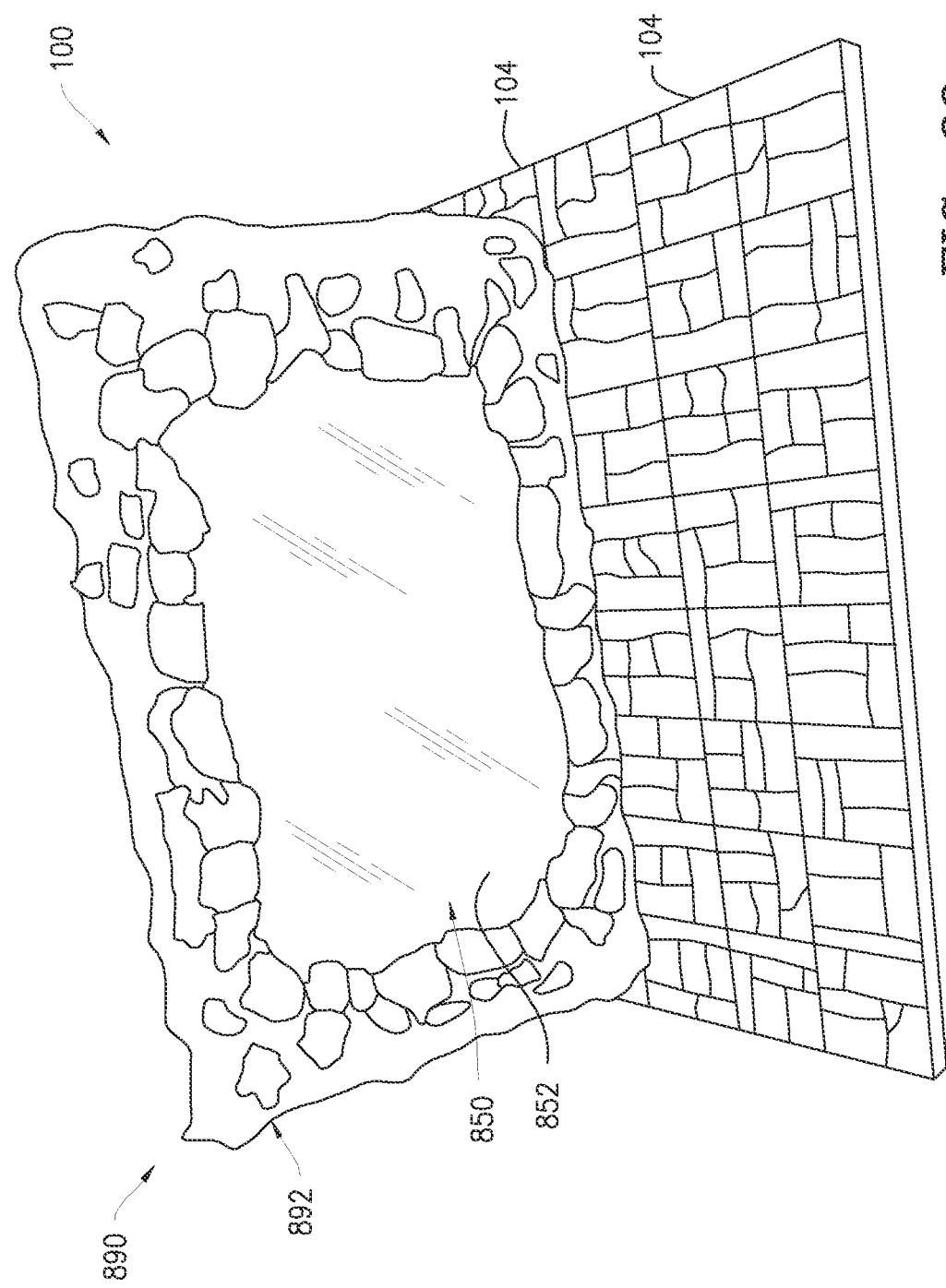
FIG. 38 is a perspective view of another video framing system according to the present disclosure, positioned vertically on the game tile system of the present disclosure.

FIG. 38 illustrates another embodiment of the game tile system 100 of the present disclosure, including a vertically positionable frame screen unit 890 with a tile-based video framing mechanism 892, configured to accept the video screen device 850, such that the display screen 852 is perpendicular, or at another angle, to the modular base tiles 104. In this configuration, the frame 892 can be either pre-attached to (e.g., permanently coupled to) the modular base tiles 104 and positioned within the continually contiguous square grid of system 100 (e.g., see base tile 104 shown in FIG. 1), can be removably positioned between the modular base tiles 104 via a rigid attachment section (see, e.g., attachment sections 132 described in connection with FIG. 2) secured to the frame 892, or attached by some other means that maintains a secure and stable perpendicular orientation. When positioned in the perpendicular orientation shown in FIG. 38, the frame screen unit 890 may represent, among many other things—portals, doors, and other fantasy or science fiction gates ways as well as naturally occurring formations such as waterfalls.

Figure 39:
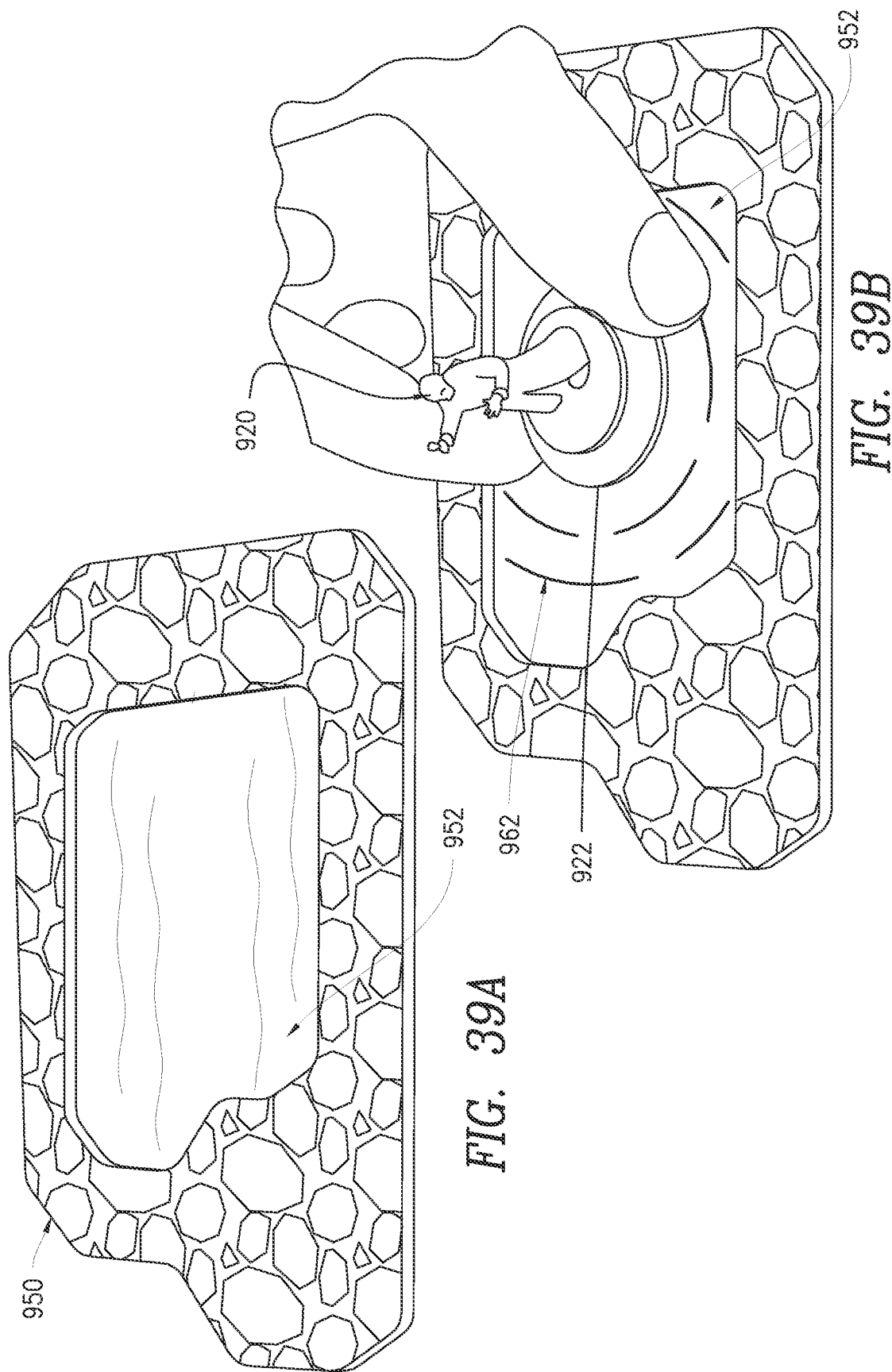
FIGS. 39A and 39B are perspective views showing images on another video framing system, and placement of a figure on the video framing system to trigger content according to the present disclosure.

FIGS. 39A and 39B, show another embodiment of the present disclosure, including a frame screen unit 960 with a video screen device 950 having a capacitive touch screen 952, such as a tablet computer, smartphone, or other mobile computing. Specifically, FIG. 39A shows the frame screen unit 960 in a resting state of operation and FIG. 39B shows the frame screen unit in a triggered state. With reference to FIG. 39B, a triggering FIG. 920 is provided with a capacitive pad (not shown), or other capacitive element, integrated into a figure base 922. While the embodiment illustrated in FIGS. 39A and 39B show a pre-combined FIG. 920 and base 922, other embodiments can include a separate clip-on base accessory (not shown) containing an appropriate capacitive pad, or other capacitive element configured to trigger the capacitive touch screen 952 of the video screen device 950. As shown in FIG. 39B, when the capacitive pad of the base 922 touches capacitive touch screen 952, an appropriate interactive video content 962, or other graphical depiction, can be activated. For example, as shown in FIG. 39A, the video screen device 950 can generate a first graphical depiction (e.g., a calm water pond) and, as shown in FIG. 39B, the video screen device 950 can generate a second graphical depiction with the interactive video content 962 (e.g., ripples on the water pond) when the capacitive pad of the base 922 touches capacitive touch screen 952 of the video screen device 950.

Figure 40:
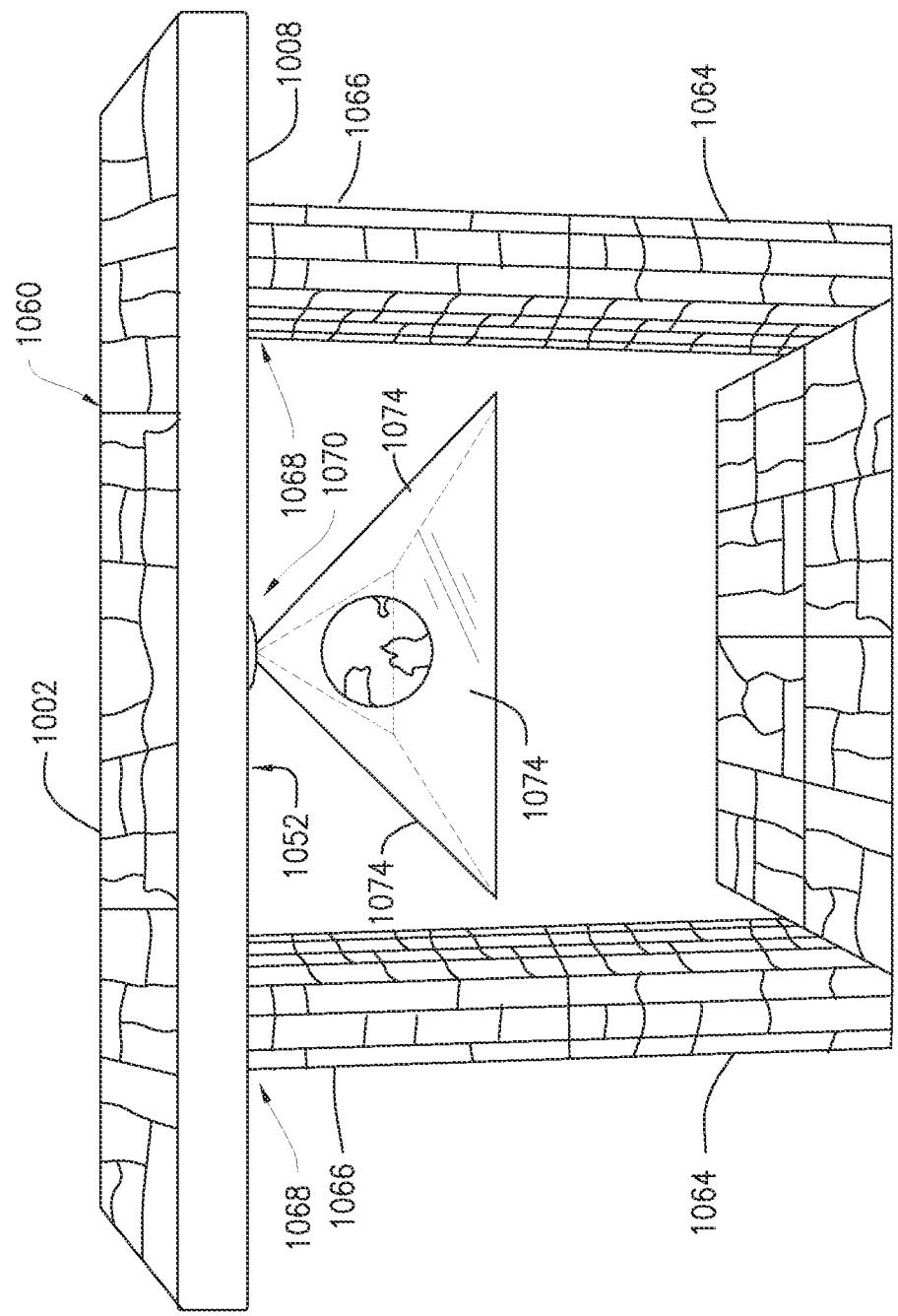
FIG. 40 illustrates a holographic video framing system according to the present disclosure.

FIG. 40 shows another frame screen unit 1060 of the present disclosure. Specifically, FIG. 40 illustrates the frame screen unit 1060 inverted such that a display screen 1052 is facing downwards and is supported by columns 1064, where the columns 1064 can be integrated in the continually contiguous square grid tile system by either pre-attachment to modular base tiles (e.g., modular base tiles 102) sitting in the continually contiguous square grid tile system, can be attached via a rigid attachment section (e.g., attachment section 132) on the columns 1064, or can be attached by some other means that maintains a secure and stable upright orientation of the columns 1064. Furthermore, the columns 1064 can have columns tops 1066 which securely attach to a column attaching area 1068 on a terrain side 1008 of frame 1002. Additionally, attached to a central area 1070 of display screen 1052—either directly contacting the flat screen, or by proximity via a clear screen covering part of the frame 1002 can be a reflection device such as a "pyramidal holographic" reflection device 1072 (hereinafter, reflection device 1072). A suction cup can be used to attach the reflection device to the screen. This reflection device 1072 redirects pixelated light (e.g., images) from the display screen to the reflection device such as four video sections on the display screen 1052 to four sides 1074 of reflection device 1072 to create the illusion of a floating holographic image. It will be understood by those of ordinary skill in the art that the reflection device 1072 can have a pyramidal configuration, as shown in FIG. 40, or any other configuration suitable for redirecting content from the display screen 1052, such that the content can be viewed by a user.

Figure 41A:
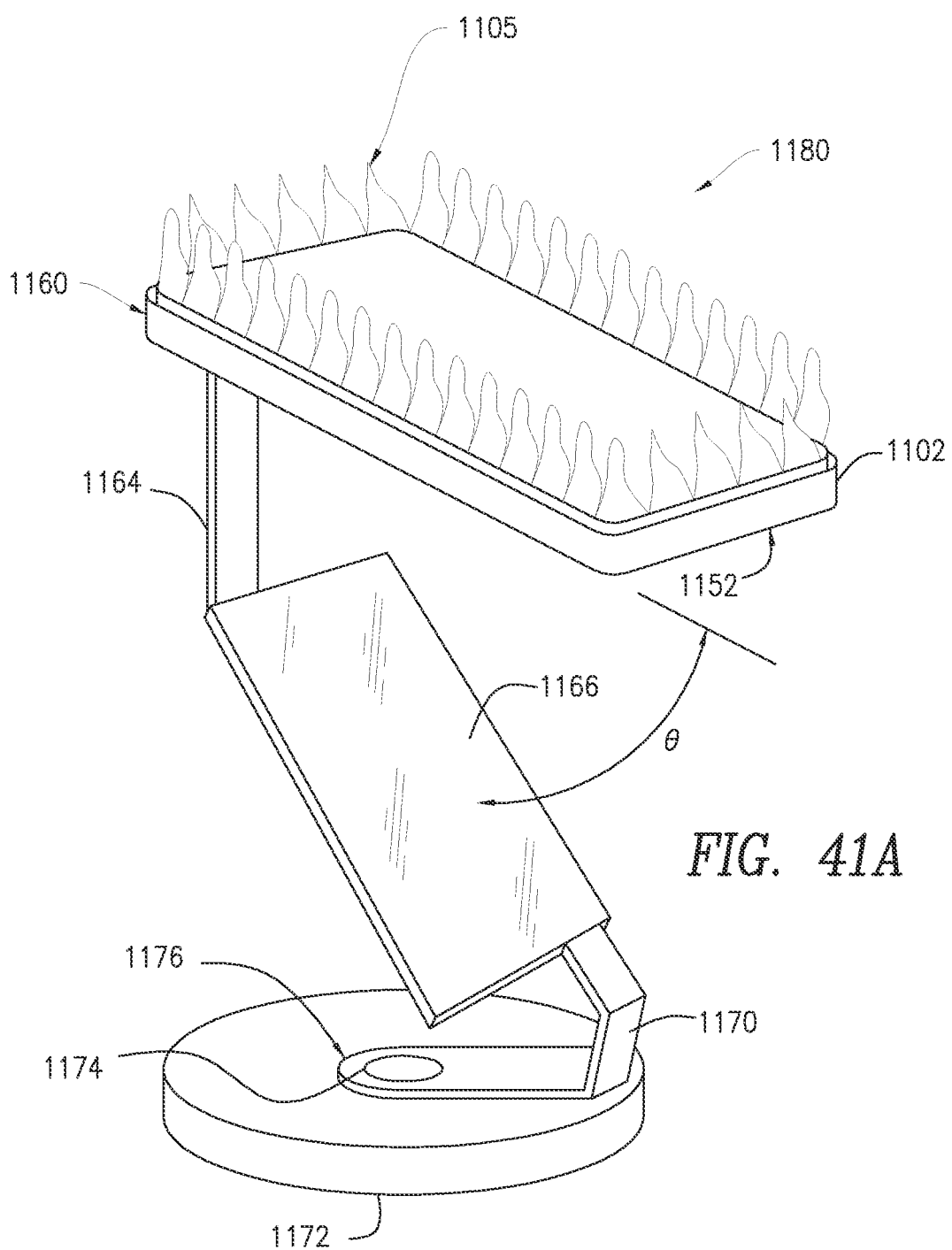
FIGS. 41A and 41B illustrate another holographic video framing system according to the present disclosure.
Figure 41B:
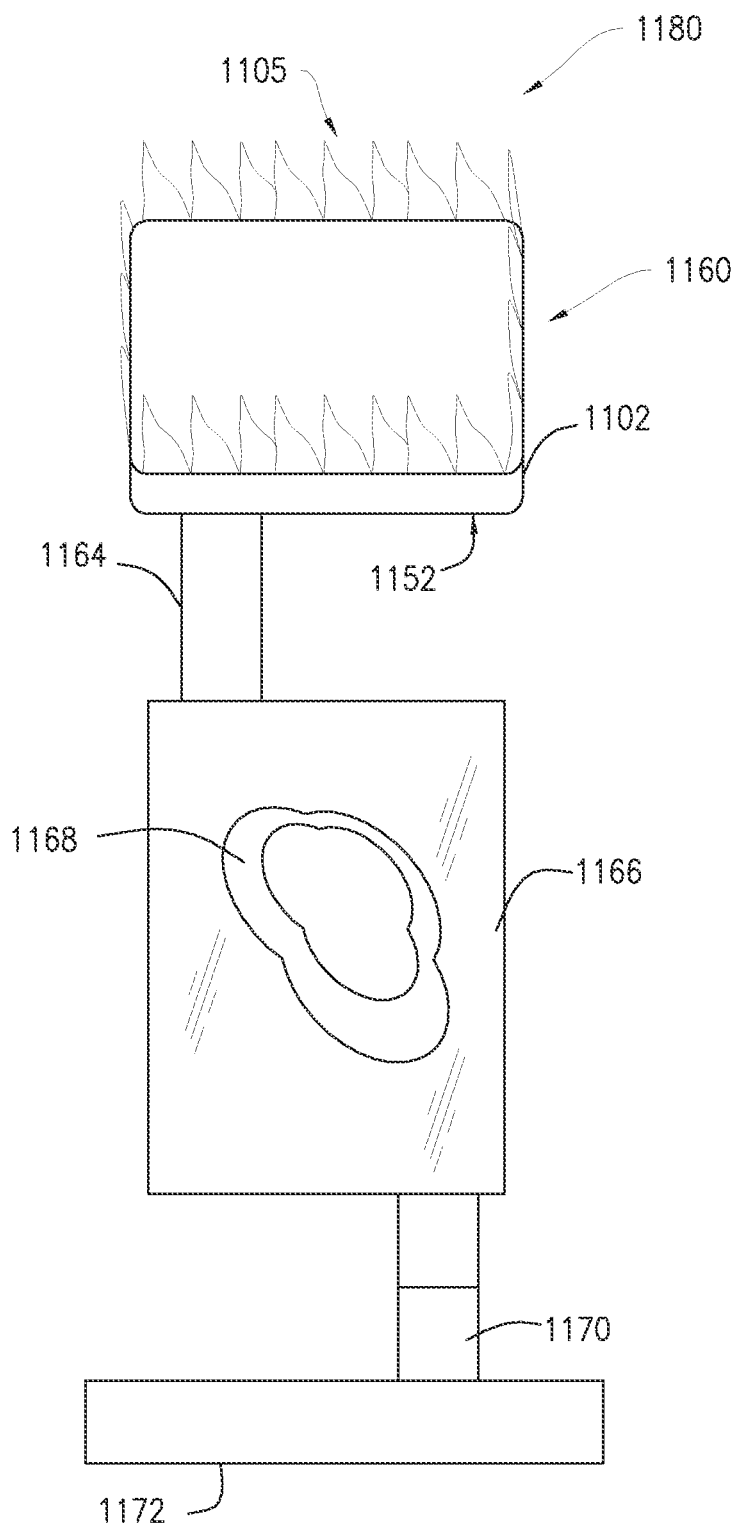

FIG. 41A is a perspective view and FIG. 41B is a front elevational view of another frame screen unit 1160 according to the present disclosure. More specifically, in the embodiment of FIGS. 41A and 41B, a different orientation of a tile-based video framing mechanism 1102 (hereinafter, frame 1102) is shown and the frame screen unit 1160 includes a mechanism for projecting a virtual or "holographic" image onto the continually contiguous square grid tile system of the present disclosure. The mechanism can include the frame screen unit 1160 attached via a rigid supporting arm 1164 to a reflecting surface 1166 such that the angle of the plane of reflecting surface 1166 relative to the plane of a display screen 1152 of the frame screen unit 1160 (relative angle CO allows for the reflection of contextual video content 1168. A frame 1102 of the frame screen unit 1160 can include one or more surface features 1105, which are formed to represent various contextual game elements, environments, terrains, and the like, and function to occlude the frame 1102 from view by a user, in order to enhance gameplay immersion. For example, as shown in FIG. 41A, the surface features 1105 are formed to convey a "fire" effect. However, it should be understood that the surface features 1105 can be formed to represent water, rocks, clouds, or any other contextual game elements, environments, terrains, or the like, which function to occlude the frame 1102 from view by a user. Additionally, a rigid anchoring arm 1170 can be attached to the reflecting surface 1166 and either a base 1172 or a modular base tile (not shown). According to some embodiments, the rigid supporting arm 1164, reflecting surface 1166, rigid anchoring arm 1170, and BASE 1172 can be formed from a transparent material (e.g., plastic, glass, and the like). The entire reflecting assembly 1180, including the rigid anchoring arm 1170, reflecting surface 1166, rigid supporting arm 1164, and frame screen unit 1160, can be configured to rotate via an axel mechanism 1174 by 360 degrees around the base center point 1176 of the BASE 1172 or modular base tile. In this rotating configuration of the reflecting assembly 1180, all players around the continually contiguous square grid tile system have visual access to the reflected contextual video content 1168 from their respective positions around the game table when the base 1172 is immovable relative to the surrounding tile system.

Figure 42:
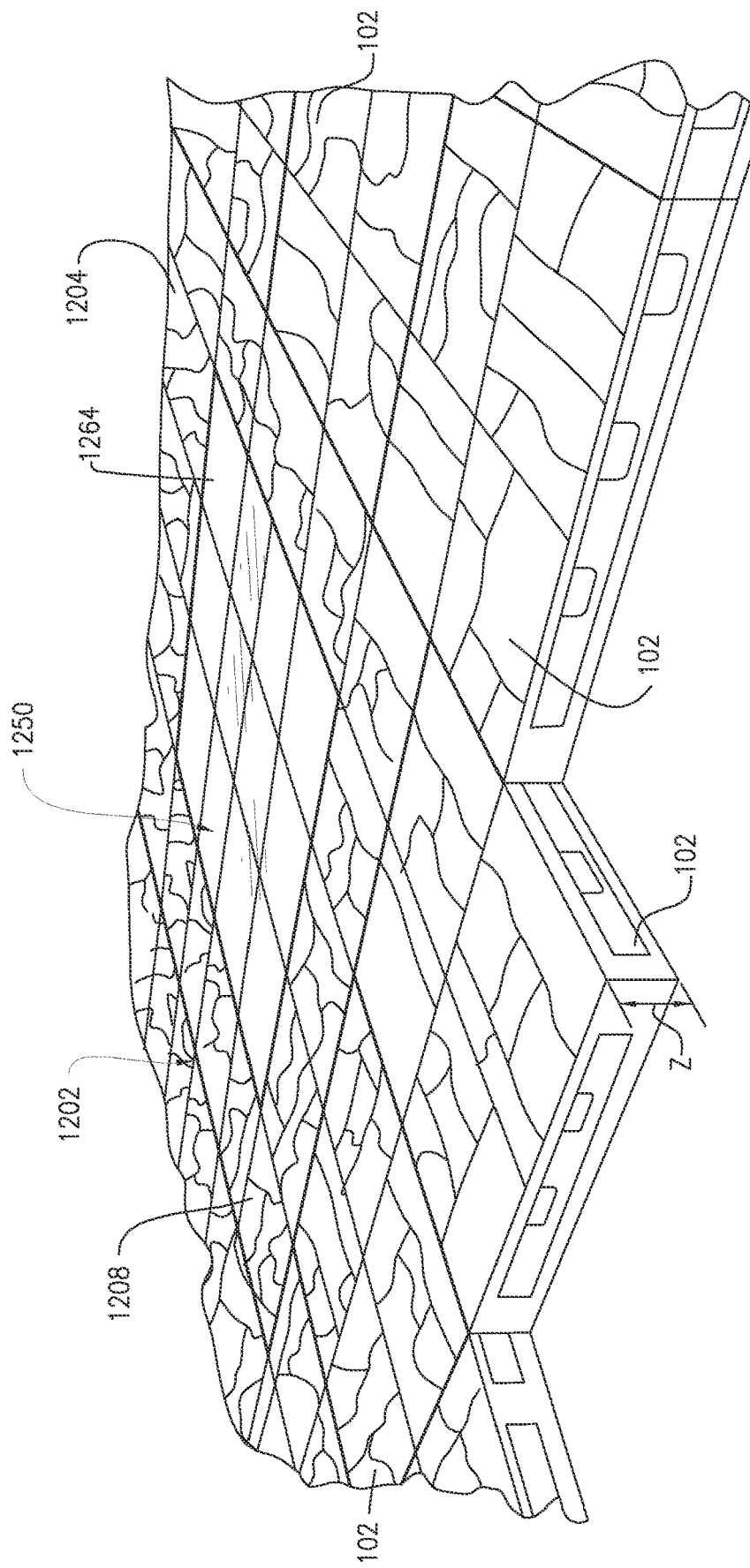
FIG. 42 is a perspective view of another video framing system of the present disclosure, including a clear overlay.
Figure 43A:
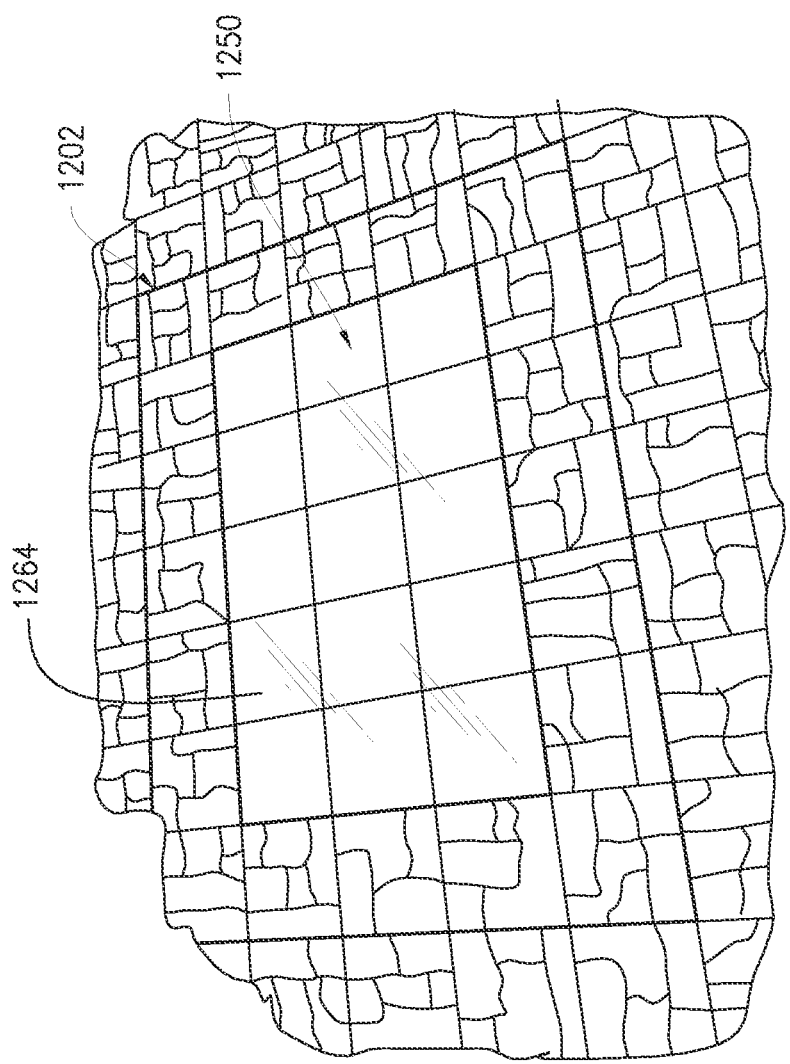
FIGS. 43A, 43B and 43C illustrate images on the video framing system that are viewable through the clear overlay of FIG. 42.
Figure 43B:
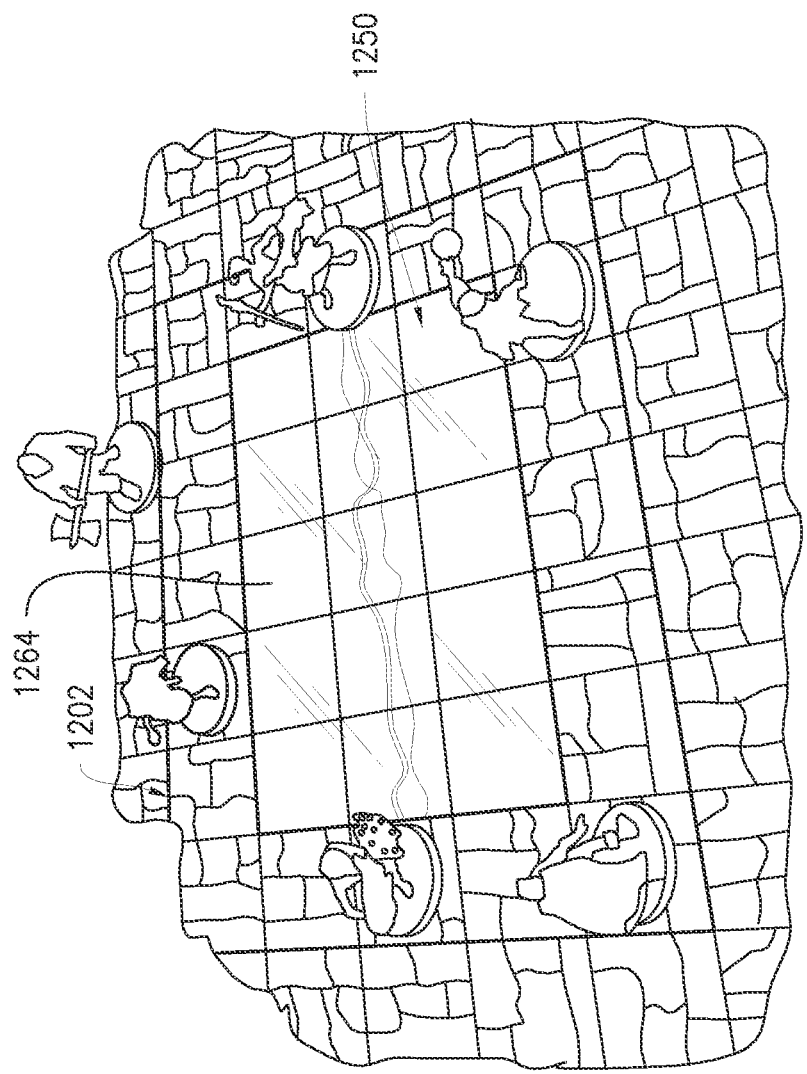
Figure 43C:
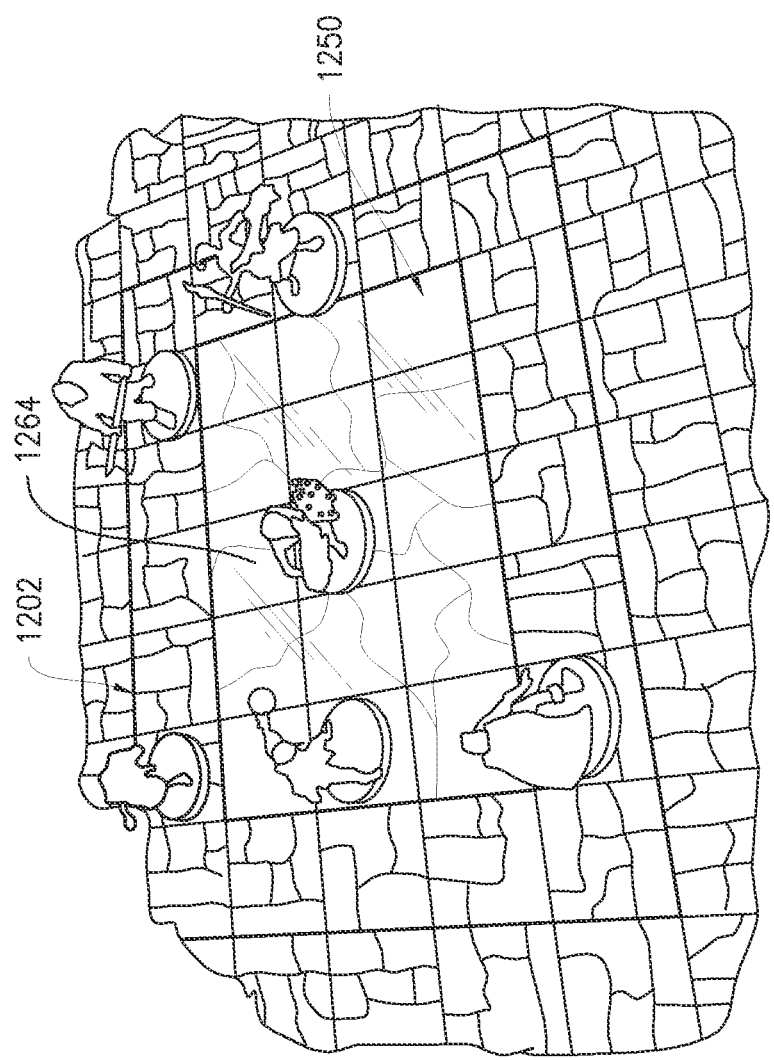

FIG. 42 shows an embodiment of a frame 1202 where a rectangular periphery 1204 can be configured such that a terrain side 1208 thereof mirrors the textures of surrounding modular base tiles 102 at a height "Z" equal to the height of the modular base tiles 102. In this frame 1202 variation—a use case encompassed by previously discussed tile-based video framing mechanisms of the present disclosure—larger (e.g., figure) bases can be employed on top of the threshold between the rectangular periphery 1204 and the surrounding modular base tiles 102. Furthermore, FIGS. 42-43C depict a clear rigid overlay 1264 on top of the display screen 1252 of a video screen device 1250, ensuring the equal elevation (height) among the modular base tiles 102, the frame 1202, and the overlay 1264. However, according to some embodiments of the present disclosure, the clear rigid overlay 1264 can be substituted with a replaceable light non-permeable decorative skin (e.g., skin 880 discussed in connection with FIGS. 36 and 37) and the attendant light transmittable pegs (e.g., pegs 886 discussed in connection with FIGS. 36 and 37) described herein.

Figure 45:
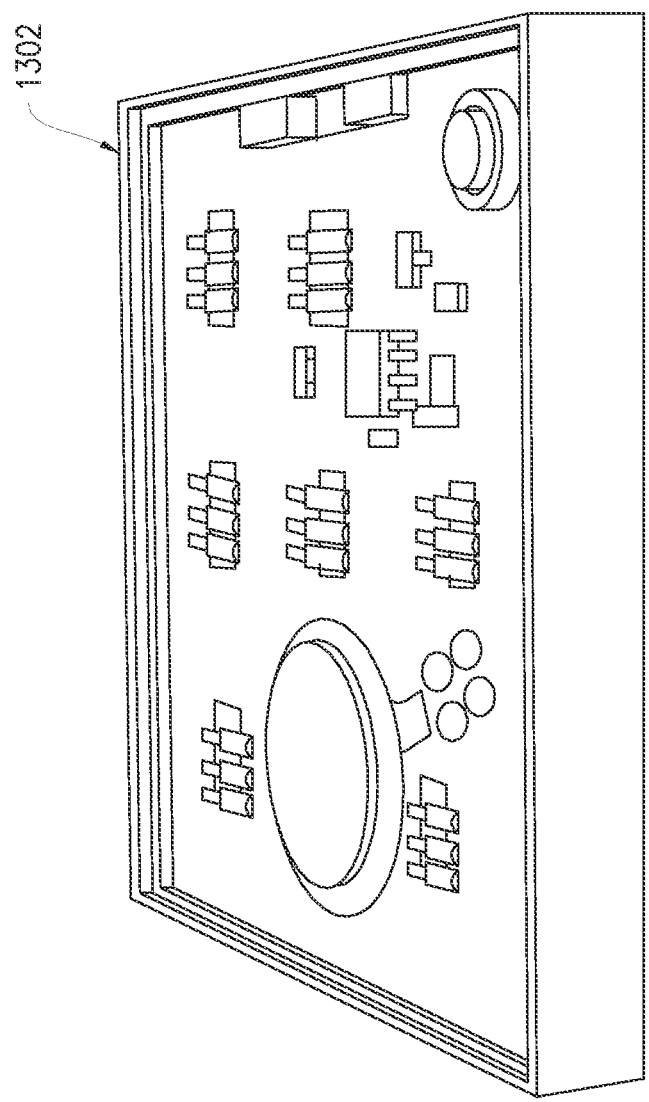
FIG. 45 is a perspective view illustrating internal components of the repurposable illuminated tile system of FIGS. 44A and 44B.

FIGS. 44A-45 illustrate an exemplary embodiment of a repurposable illuminating decorative tile system 1300 such that a single repurposable illuminating tile unit 1302 (see FIG. 45) can light an illuminable decorative modular base tile 1304 (see FIG. 44A), an illuminable decorative full-size exterior wall 1306 (see FIG. 44B), or some other illuminable component of the continually contiguous square grid tile system 100 of the present disclosure.

Figure 46B:
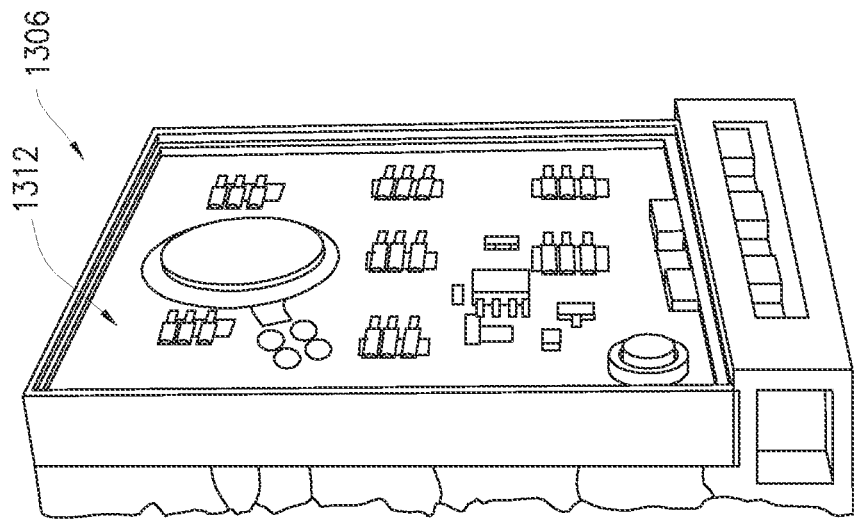
FIGS. 46A, 46B and 46C illustrate components of an exemplary configuration of the repurposable illuminated tile system of FIGS. 44A and 44B.
Figure 46A:
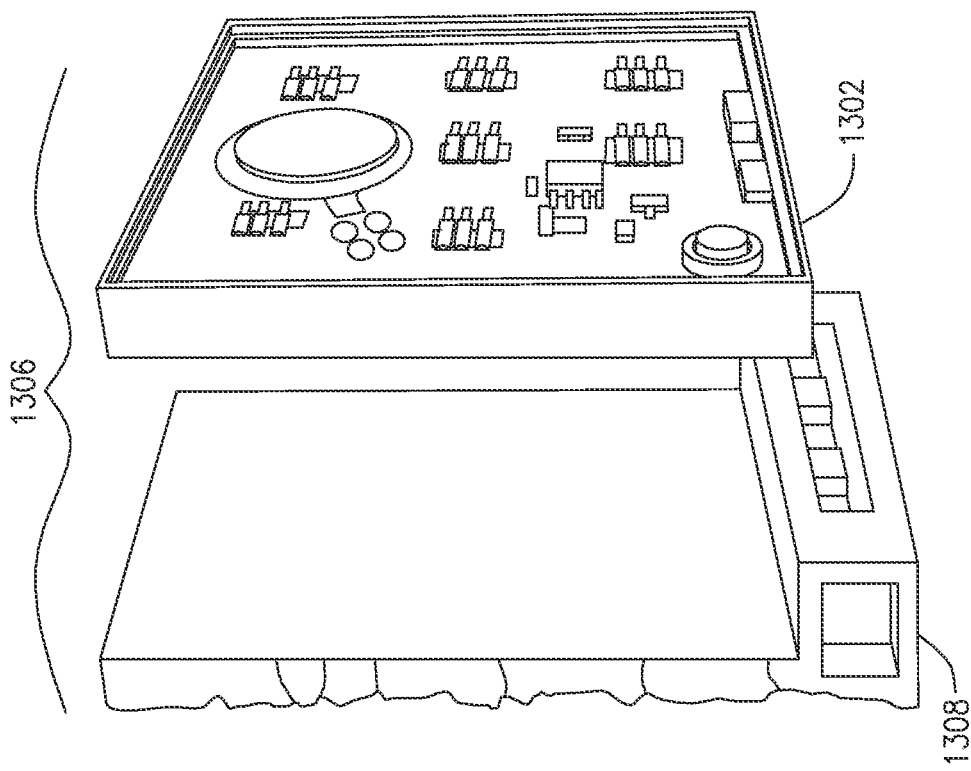
Figure 46C:
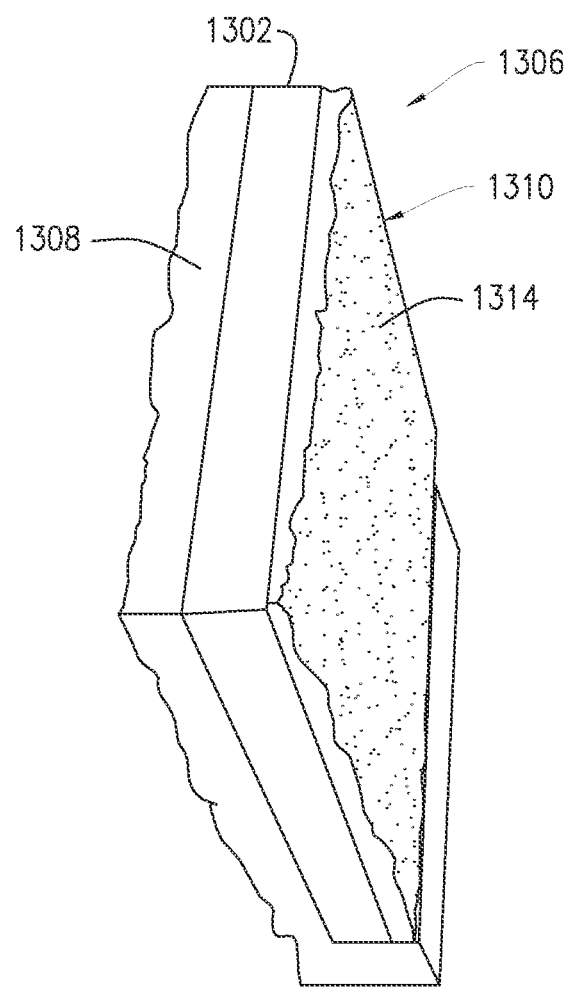

FIG. 46A is an exploded view of the illuminable decorative full-size exterior wall assembly 1306, FIG. 46B is a side perspective view of the illuminable decorative full-size exterior wall assembly 1306, and FIG. 46C is a top perspective view of the illuminable decorative full-size exterior wall assembly 1306. As shown, the repurposable glow tile 1302 can be nested in a full-size exterior wall glow tile seat 1308 to create a wall-seated glow tile. Nested in front of the wall-seated glow tile can be a replaceable light permeable decorative skin 1310. Furthermore, the light permeable decorative skin 1310 can be situated adjacent to an illuminating face 1312 such that the operations of light transmission are subject to the characteristics of the material of which light permeable decorative skin 1310 is composed.

In the embodiment of FIG. 46A-C the repurposable illumination tile unit 1302 can be configured such that a 2×2 grid-square unit has an illuminating function—whether by LED, incandescent, electroluminescent or some other light transmitting means, known or unknown, whereby light is projected away. Furthermore, the repurposable illumination tile unit 1302 can include a pressure-activated light function whereby light operations of on, off, and light settings—such as, but not limited to, color, brightness, and effects (fade, blink, pulse, etc.), can be accessed by pressure applied to the illuminating face 1312 of the repurposable glow tile 1302 towards the glow tile 1302 opposing side. A button, switch, or other interface can also be used to control and/or alter the illumination of the repurposable illumination tile unit 1302.

Furthermore, as discussed in connection with the light permeable decorative skin 508, the light permeable decorative skin 1310 can be configured with a decorative side 1314 including an opaque skin area that prevents the transmission of light, a light permeable skin area that enables the transmission of light, and/or a translucent skin area that allows for the transmission of light subject to the characteristics of the material of which light permeable decorative skin 1310 is composed.

Figure 47:
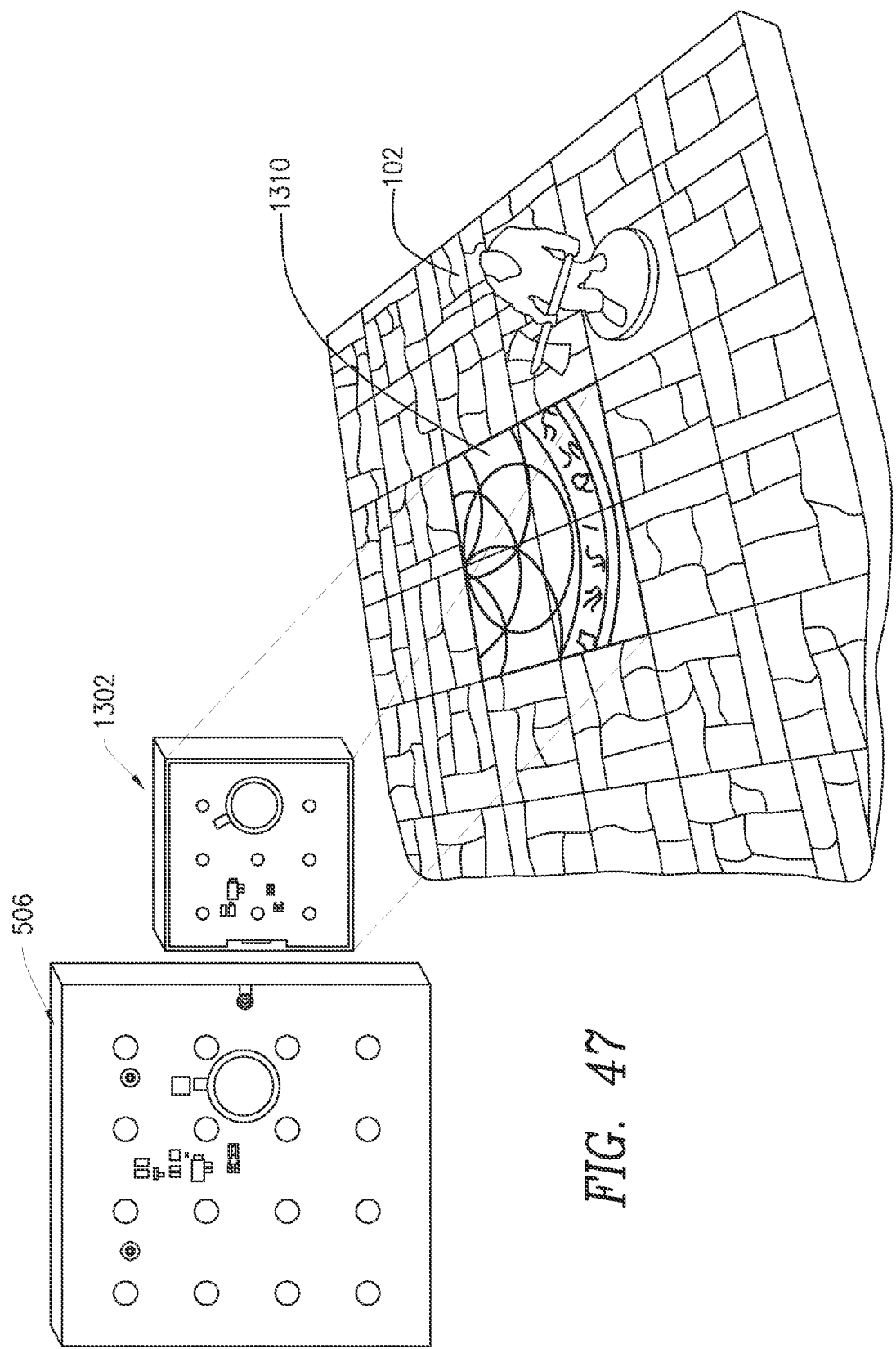
FIG. 47 illustrates another exemplary configuration of the repurposable illuminated tile system of FIGS. 44A and 44B.

FIG. 47 shows a relationship of size between the 2×2 repurposable glow tile 1302 and the 4×4 practical illuminated tile 506. Other than a difference in square length, the depth of both glow tiles 1302, 506 can be approximately the same, governed by the relationship of the depth of both the replaceable light permeable decorative skin 1310 and the glow tile unit 1302 such that the depth of the modular base tile 102 less the depth of the orientable illumination tile unit 1302 approximately equals the depth of the light permeable decorative skin 1310. For example, if the depth of the modular base tile 102 is 8 mm and the illumination tile unit 1303 is 6 mm, then light permeable decorative skin 1310 can be 2 mm. Conversely, if the light permeable decorative skin 1310 is 6 mm, then the illumination tile unit 1302 can be approximately 2 mm.

The light permeable decorative skin 1310, whilst still maintaining the above defined light transmitting characteristics of the decorative side 1314, the decorative side 1314 can be voluminous exhibiting physical protrusions upward emulating natural terrain formations such as rocks, boulders, lava flows, water flows, pools, vegetation, etc. and built terrain formations such as ruins, architecture, and other non-naturally occurring voluminous formations.

While an exemplary embodiment of the repurposable illuminating tile system 1300 is shown as a 2×2 grid-square unit with a 2×2 size, the repurposable illumination tile 1302, and the 2×2 size light permeable decorative skin 1310, other shapes and sizes such as a 1×1, 3×3, 4×4, 5×5, etc., or any irregularly shaped tile including, but not limited to, a 2×3, 2×4, "V" or "L" shaped 3×1, etc. can be provided, having the characteristics of the repurposable illumination tile 1302 and the light permeable decorative skin 1310 disclosed herein.

Figure 48:
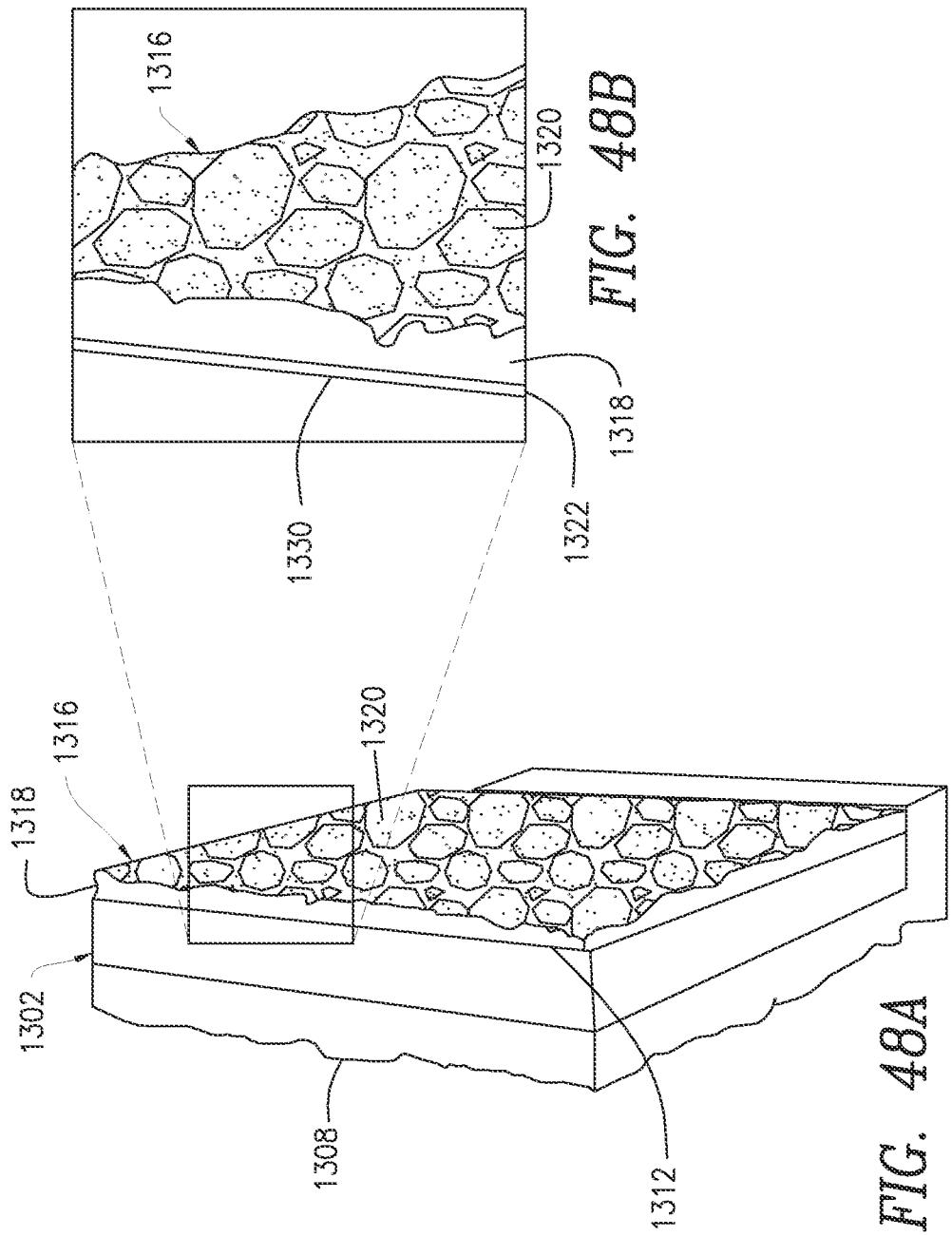
FIG. 48A is a perspective view of the light permeable skin of the repurposable illuminated tile system of FIG. 46.
FIG. 48B is a partial cross-sectional view of the light permeable skin of FIG. 48A.

FIGS. 48A and 48B illustrate an embodiment of the present disclosure with a 2×2 hidden image tile skin 1316 that can be integrated into the framework of the repurposable illumination tile system 1300, executed as an exterior wall. The hidden image tile skin 1316 shown in FIG. 48 is a subset of the light permeable decorative skin 1310, discussed in connection with FIGS. 16 and 17. The hidden image tile skin 1316 can include: 1) a clear light permeable body 1318, such as a clear polymer including, but not limited, to ABS, PP, STYRENE, etc.; 2) a play viewable, decorative top side 1320; and 3) a play obscured, decorative bottom side 1322.

Figure 49:
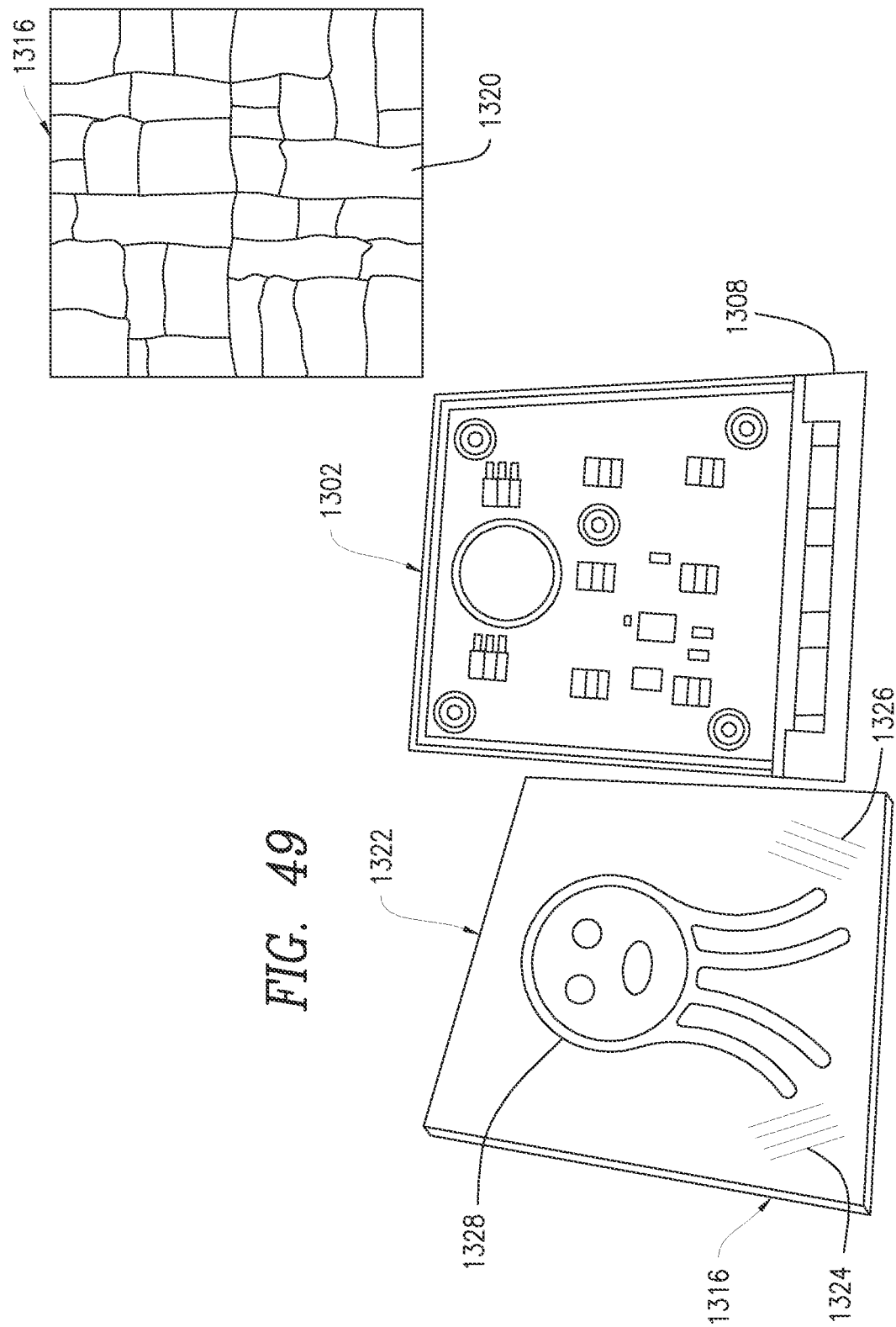
FIG. 49 illustrates another light permeable skin of the repurposable illuminated tile system of FIG. 46, including a light impermeable image disposed on an interior side thereof.

FIG. 49 illustrates a play viewable, decorative top side 1320 painted such that it can be indistinguishable (e.g., having similar surface features and appearance) from the decorative side of the modular base tiles 102 upon visual inspection. It also illustrates a play obscured, decorative bottom side 1322 having a light impermeable coating 1324 applied thereto, in order to create a "negative" image 1326 with a "positive" image 1328 being formed from the exposed material of the clear light permeable body 1318.

Figure 50B:
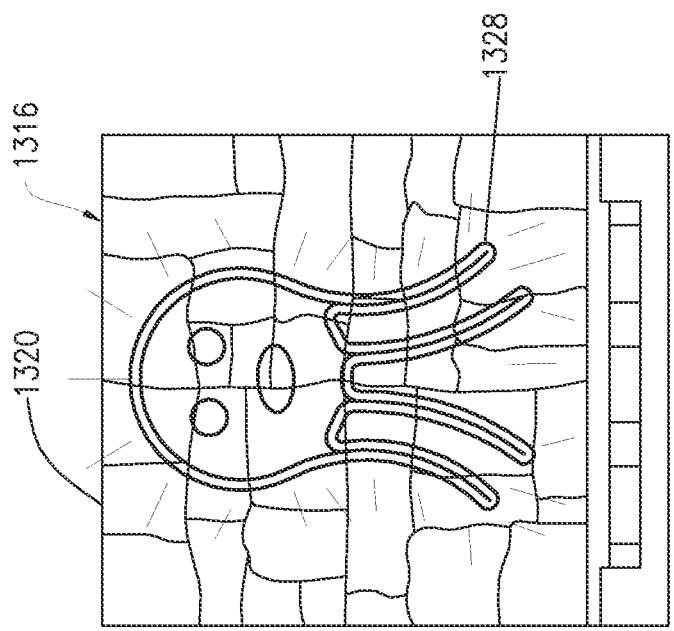
FIGS. 50A and 50B illustrate an image on the light permeable skin of FIG. 49 that is viewable when the illuminated tile system is active.
Figure 50A:
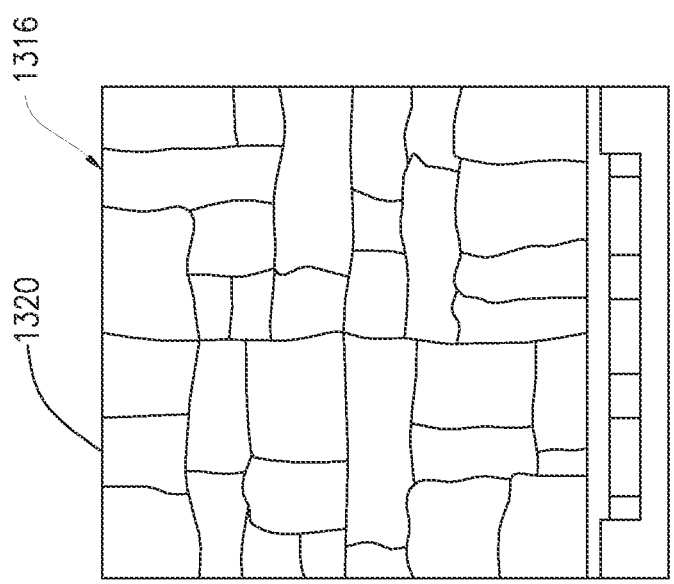

FIG. 50A shows the repurposable illumination tile 1302 in a deactivated state and FIG. 50B shows the repurposable illumination tile 1302 in an activated state. As shown, the 2×2 hidden image tile skin 1316 is situated such that the player obscured, decorative bottom side 1322 is adjacent to the illuminating face 1312 of the repurposable illumination tile 1302 (see, e.g., FIG. 48). In this configuration, when the repurposable illumination tile 1302 is off, and no light is emitted, the play viewable decorative top side 1320 continues to remain generally indistinguishable from the surrounding modular base tiles 102, exterior boundaries, or any other homogeneous repeating component of the tile system of the present disclosure. However, when the repurposable illumination tile 1302 is on, and light is emitted, the player obscured, decorative bottom side 1322 allows for the transmission of light only through areas of the clear light permeable body 1318 not coated with paint. As light refracts through the clear light permeable body 1318 it ultimately exits the clear light permeable body 1318 on the play viewable decorative top side 1320 such that the "positive" image illumination 1328 appears on the play viewable decorative top side 1320.

It should also be noted the light impermeable coating 1324 applied to create the "negative" image 1326 of the player obscured, decorative bottom side 1322 of the clear light permeable body 1318, if executed as a dark tinted light absorbent coating, as shown in FIG. 49, can be recoated with a reflective coating 1330 (see FIG. 48B) such that two congruent paint coats can cooperate to create the "negative" image 1326. In this configuration, the dark-tinted light absorbent coating prevents transmission of light as dictated by the "negative" image 1326, and the reflective coating 1330 (which can be, but is not limited to, a white coat of paint) improves light reflection and dispersion between the player obscured, decorative bottom side 1322 surface and the illuminating mechanism of tile 1302, thereby increasing the luminescence of the "positive" image 1328 illumination.

Figure 51C:
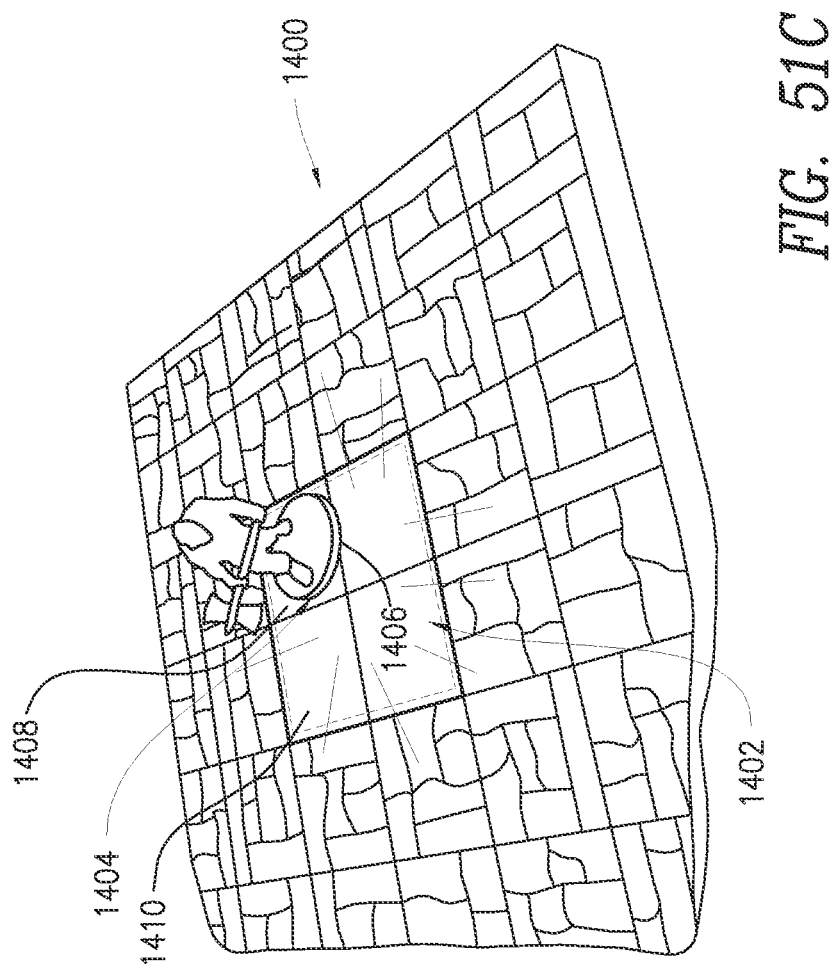

FIGS. 51A-C present an exemplary configuration for a magnetically-activated repurposable illumination tile system 1400 ("magnetic glow tile system 1400"), such that its exterior form can emulate that of the previously described repurposable illumination tile 1304. However, whereas the repurposable illumination tile 1304 can include a pressure-activated light function, a magnet glow tile 1402 of the magnetic glow tile system 1400 can be illuminated when exposed to a magnetic force within a specified proximity.

For example, also illustrated by FIGS. 51A-C is a triggering FIG. 1404 configured such that a rare-earth or other appropriate magnet is integrated in to a figure base 1406. While the embodiment illustrated shows direct incorporation into a pre-combined FIG. 1404 and BASE 1406, other embodiments can include a separate clip on base accessory containing the appropriate magnet.

According to one exemplary operation process, as long as the triggering FIG. 1404 remains outside of a triggering boundary 1408, magnetic glow tile 1402 can remain in a light-off state. However, upon the triggering FIG. 1404 crossing the triggering boundary 1408 and entering a trigger area 1410, the magnetic glow tile 1402 can immediately enter a light-on state.

According to some embodiments of the present disclosure, the magnetic glow light system 1400 can be used in connection with the hidden image tile skins 1316 to display and/or convey immediate and visually impactful game information based upon a player's immediate figure positioning choice. As an example, the hidden image tile skins 1316 can be configured as a "traps," such as a trap door, hidden snake pit, booby trap, etc. According to some embodiments, this game information is only displayed upon a player positioning a figure on the magnetic glow light tile 1402.

Figure 52:
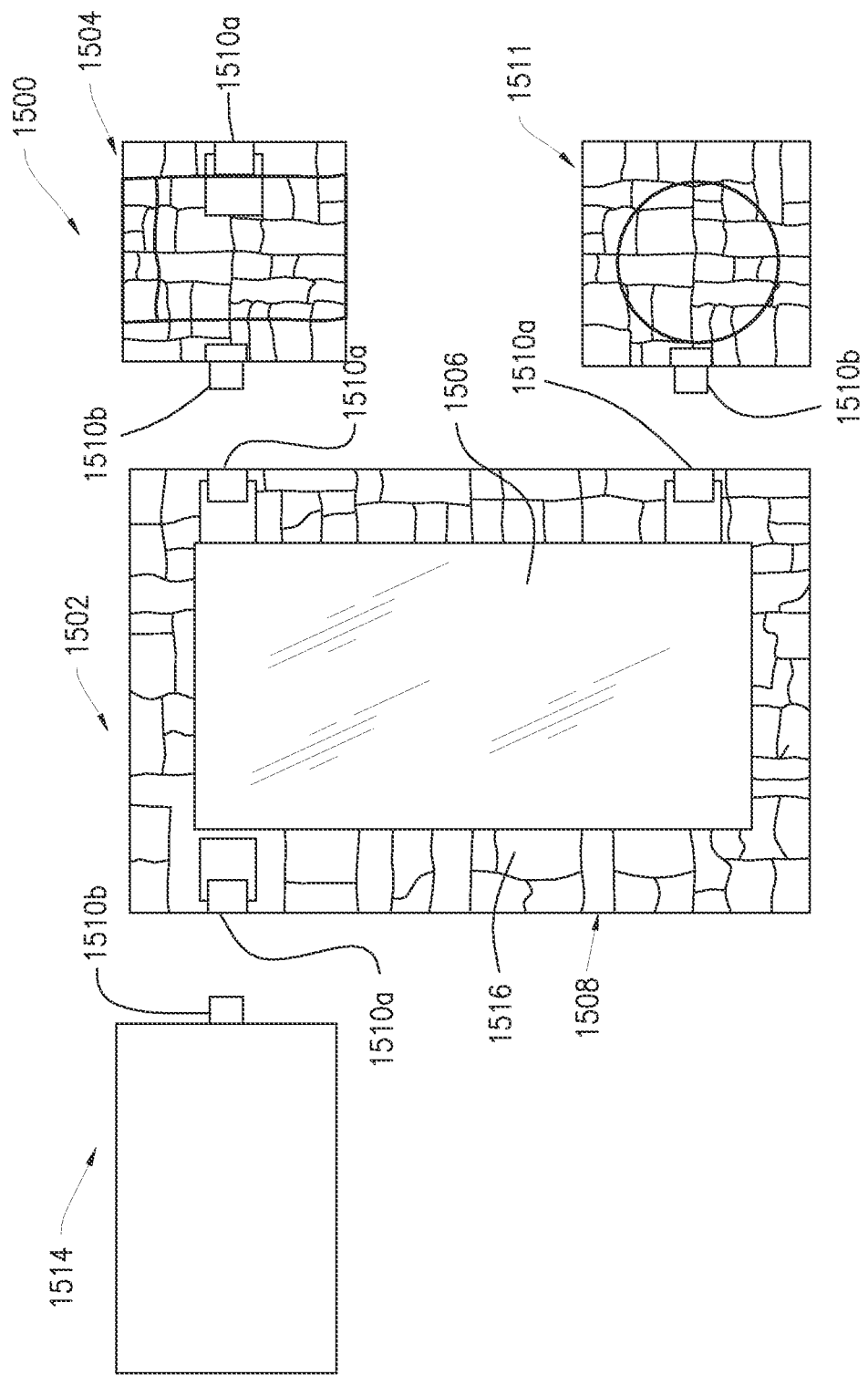
FIG. 52 is a diagram illustrating a tile video system according to the present disclosure.

FIG. 52 is a diagram illustrating a tile video system 1500 according to some embodiments of the present disclosure. As shown, the tile video system 1500 can include a screen unit 1502 and a power unit 1504. The screen unit 1502 can be similar to the frame screen unit discussed herein, can include a video screen 1506 and a frame 1508, and can receive power from one or more power (e.g., battery) units 1504 via one or more connectors 1510 (e.g., including female connector 1510a and male connector 1510b). As such, the screen unit 1502 becomes functional (e.g., powered) when coupled to a power unit 1504 via a connector 1510. The connectors 1510 can utilize non-standard or standard connection protocols and hardware (e.g., USB, thunderbolt, lightning, etc.) and thus, can transfer both power and data between components of the game tile system of the present disclosure. For example, as shown in FIG. 52, the screen unit 1502 can be provided with one or more female USB-A type connectors 1510a and power unit 1504 can include one or more male USB-A type connectors 1510b for connection thereto. According to some embodiments, the screen unit 1502 can include one or more connectors 1510 on a top surface 1516 thereof. As such, one or more power units 1504, or other modular units described herein, can be connected to the connectors 1510 on the top surface 1516 of the screen unit 1502 and supported in a vertical orientation, forming in-game boundaries in the gameplay area.

The power unit 1504 can be a modular component that is sized and shaped to be integrated within the game tile system of the present disclosure and can also be configured to provide power to one or more electronic game tile system components. For example, as shown in FIG. 52, the power unit 1504 can have a similar size and shape as a modular base tile, discussed herein, so the power unit 1504 can be integrated into the gameplay area of the tile game system of the present disclosure. According to some embodiments, the power unit 1504 can also be configured as other three dimensional shapes (e.g., a boulder, a mountain, a statue, etc.) that can be placed on the game board and/or occupy a space configured to accept a modular base tile. The power unit 1504 can be connected individually to another electronic component, or can be connected in series (e.g., daisy chained) to provide a longer use period. For example, the power unit 1504 can include one male connector 1510b, for connection to the female connector 1510a of the screen unit 1502, and can include a female connector 1510a for connection to one or more additional power units 1504.

The tile video system 1500 can also include one or more additional modular components that can be integrated into the gameplay area of the tile game system of the present disclosure. For example, as shown in FIG. 52, the video system 1500 can include a modular speaker unit 1511 and a modular flow tile 1514. The speaker unit 1511 can include one or more connectors 1510, such as male connector 1510b, and can be coupled to the screen unit 1502 via a female connector 1510a. Furthermore, the frame screen unit 1502 can include a plurality of connectors 1510 that can be used to power other items, such as flow tiles 1514, where the frame screen unit 1502 is the intermediary between the modular power unit 1504 and the flow tile 1514. However, the power unit 1504 can also be connected directly to a flow tile 1514, in order to provide power thereto. In addition to the modular electronic tile components shown in FIG. 52 (e.g., the frame screen unit 1502, the power unit 1504, the speaker unit 1511, and the flow tile 1514), the game tile system of the present disclosure can also include additional powered game play components, including, but not limited to, a mechanical vibration unit, a servo controlled movement unit, a motor and gear controlled movement (e.g., rotational or movement in any axis) unit, an actuator controlled movement unit, as well as lighting, sound, or any other physical visual effect units, such as smoke production, and any other visual effect requiring power.

Figure 53:
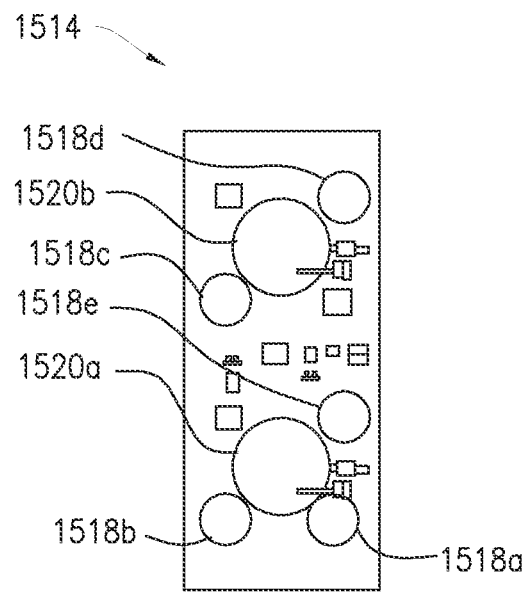
FIG. 53 is a diagram illustrating components of an illuminated flow tile of FIG. 52 according to the present disclosure.
Figure 54A:
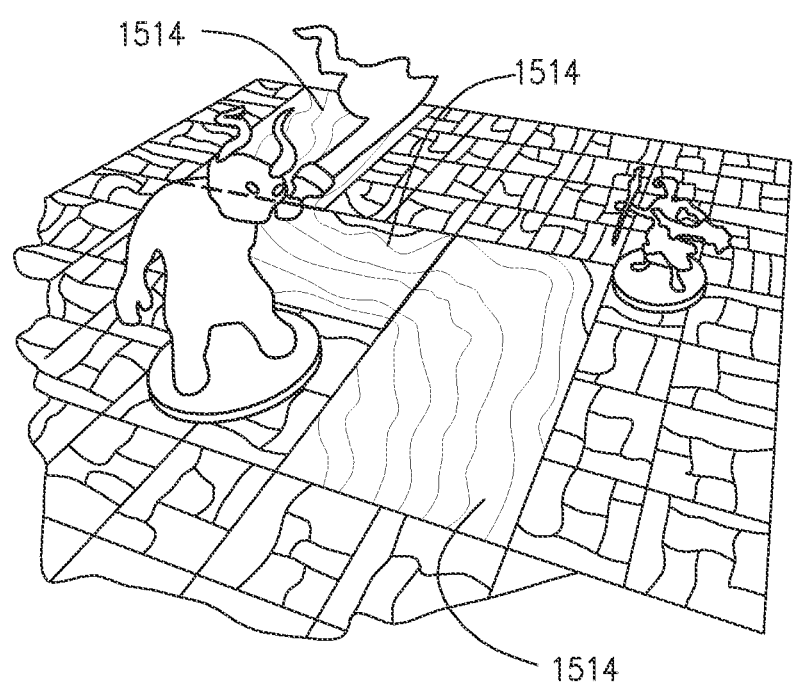
FIGS. 54A, 54B and 54C are diagrams illustrating exemplary configurations of the illuminated flow tile of FIG. 53.
Figure 54B:
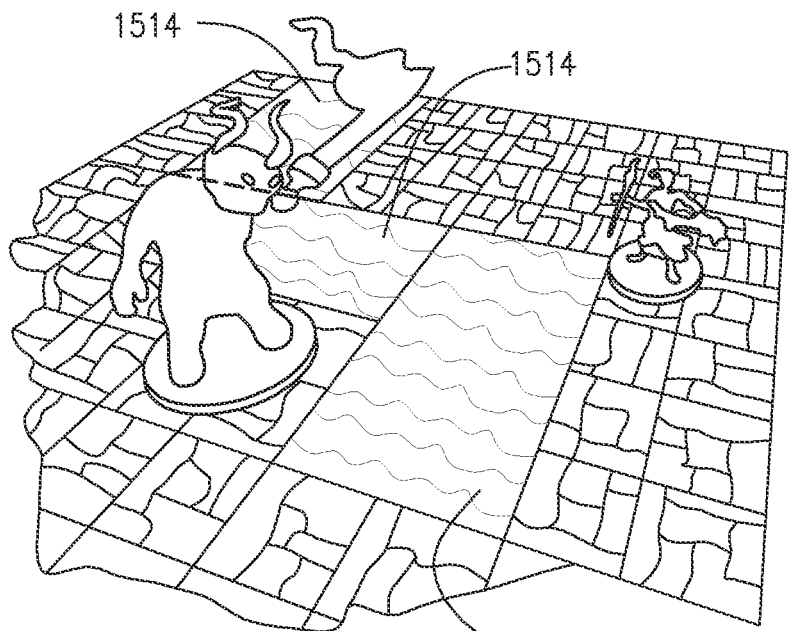
Figure 54C:
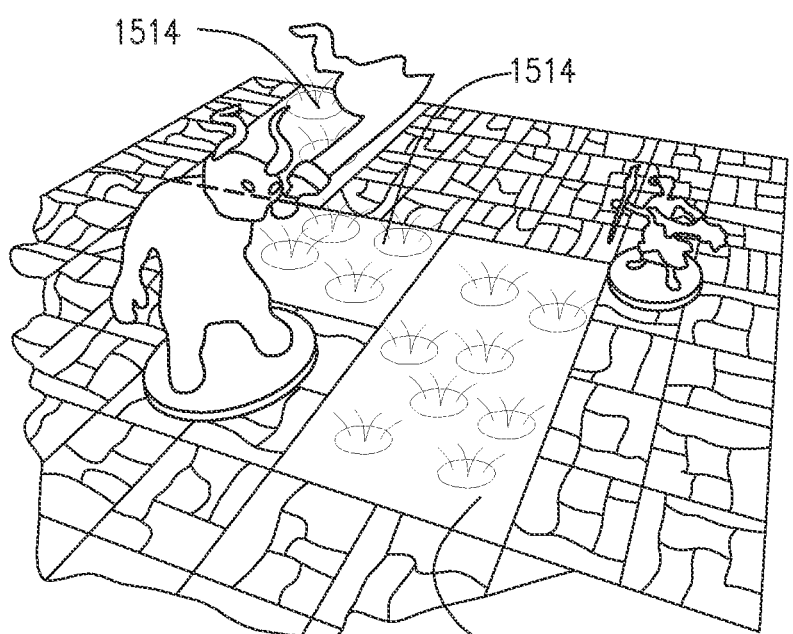

FIG. 53 is a diagram illustrating internal components of the flow tile 1514 and FIGS. 54A-C are diagrams illustrating operation thereof. As shown in FIG. 53, the flow tile 1514 can include a one or more LEDs 1518a-e (together, LEDs 1518), or other light sources, that can be controlled to produce a plurality of in-game lighting effects and can be powered by an internal power source (e.g., one or more batteries 1520a and 1520b, as shown in FIG. 53) or an external power source (e.g., power unit 1504 via connector 1510, as shown in FIG. 52). The on/off status of the LEDs 1518 can be controlled to create the illusion of movement. For example, in the case of a lava effect, the LEDs 1518 can be controlled to "flicker" and move along a row, to create the illusion that the lava is flowing. As shown in FIGS. 54A-C, the flow tiles 1514 can have a housing formed from a transparent or semi-transparent material that can diffuse the light output from the LEDs 1518 and protect the internal components of the flow tile 1514. The flow tiles 1514 can be configured to have a similar shape as one or more of the modular base tiles disclosed herein, such that the flow tiles 1514 can be integrated into the gameplay area of the game tile system of the present disclosure, and two or more flow tiles 1514 can be connected together, or placed adjacent to one another, to create larger and modular lighting effects.

Accordingly, the flow tiles 1514 can include a plurality of connectors 1510, such power and communications can be exchanged therebetween, when arranged in various configurations. The color of the LEDs 1518 can be controlled to simulate a particular in-game effect. For example, as shown in FIG. 54A, the LEDs 1518 can be controlled to output various shades of red, orange, and yellow light to create a lava effect, as shown in FIG. 54B, the LEDs 1518 can be controlled to output various shades of blue and turquoise light to create a water effect, and as shown in FIG. 54C, the LEDs 1518 can be controlled to output various shades of green, yellow, and orange light to create an acid effect. It should be understood by those of ordinary skill in the art that the LEDs 1518 can be controlled to output any color of light in the color spectrum.

Figure 55A:
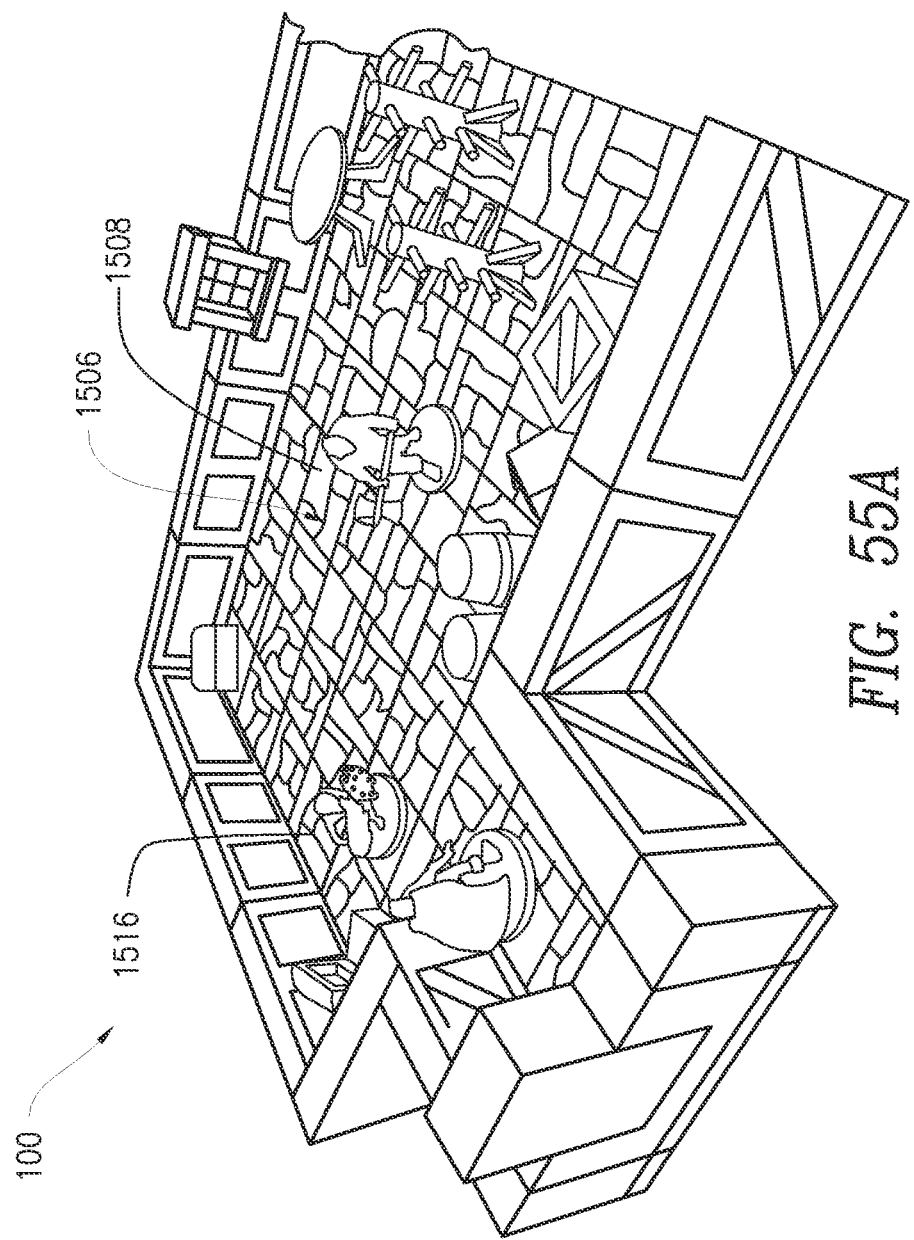
FIG. 55A is a perspective view of components of the tile game system of the present disclosure arranged in an exemplary configuration and including an illuminated tile unit in a deactivated state.
Figure 55B:
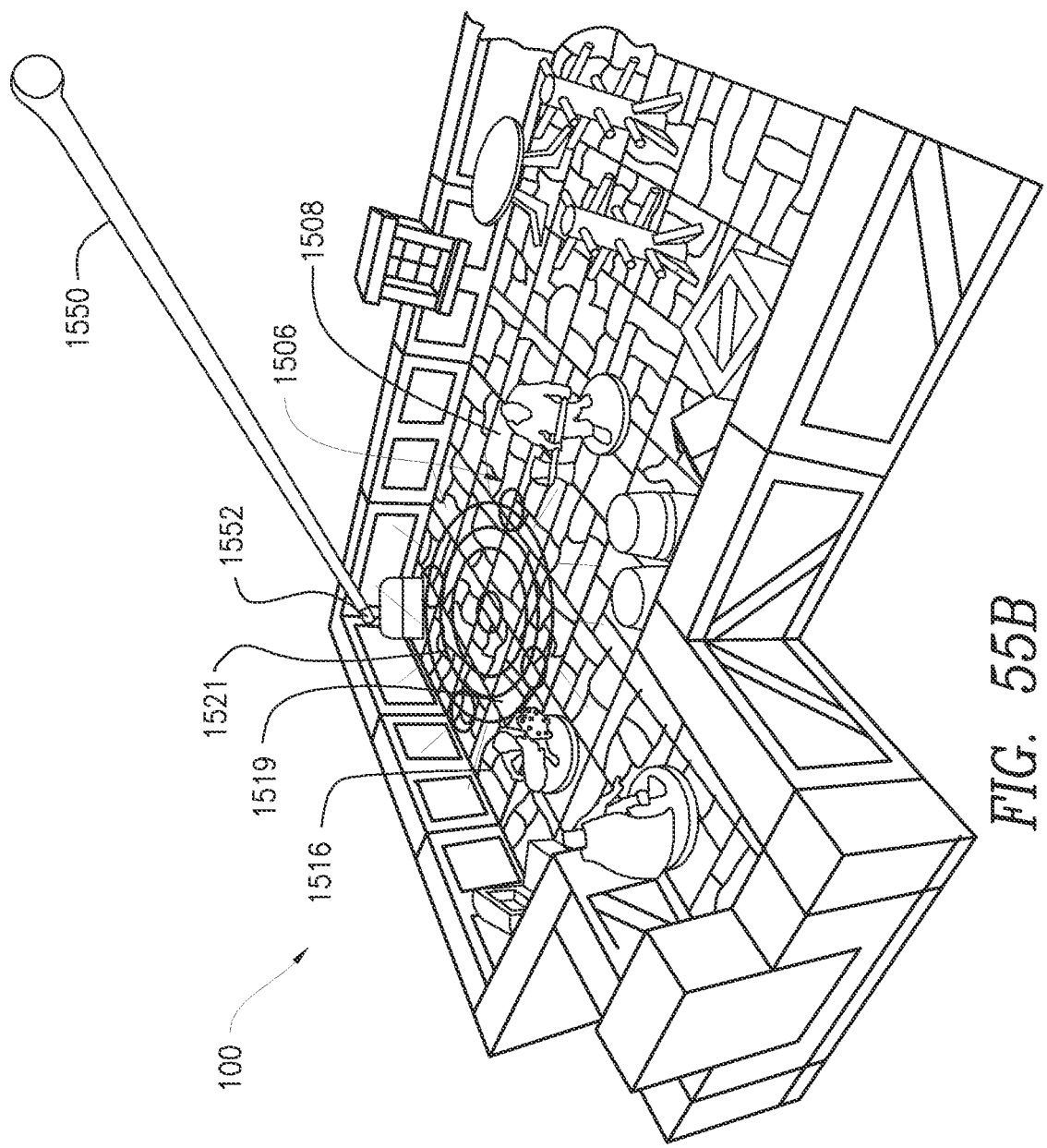
FIG. 55B is a perspective view illustrating the illuminated tile unit of FIG. 55A in an activated state.
Figure 57B:
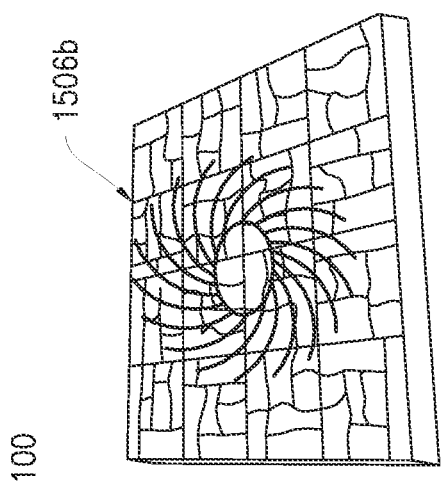
FIGS. 57A, 57B, 57C, 57D and 57E are perspective views of illuminated tile units according to the present disclosure.
Figure 57A:
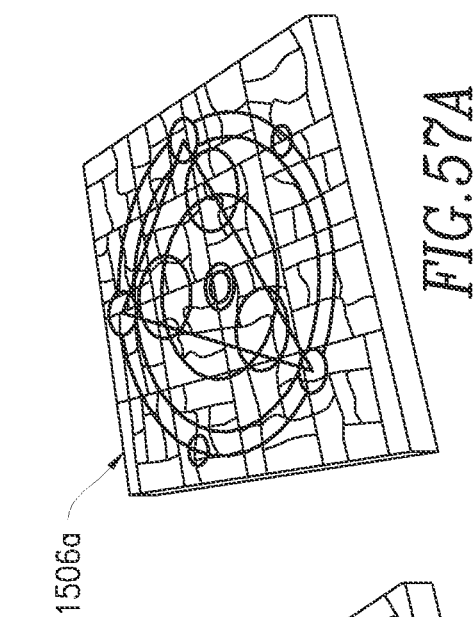
Figure 57C:
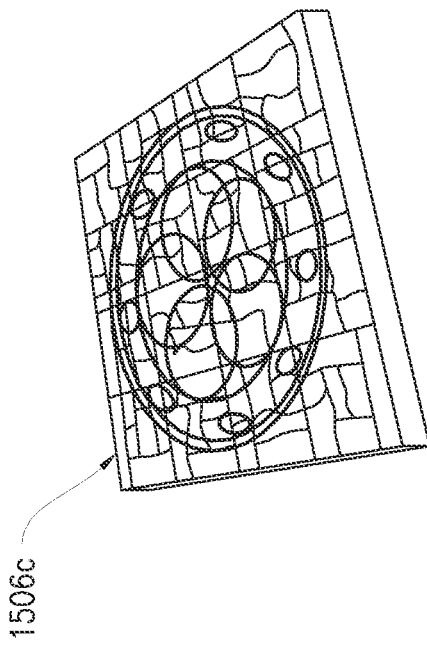
Figure 57E:
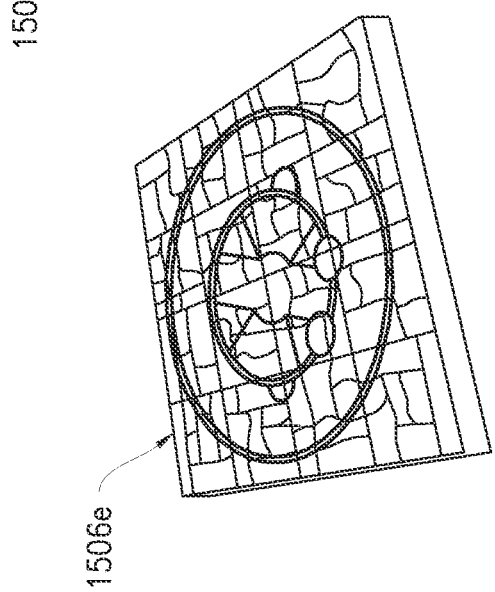
Figure 57D:
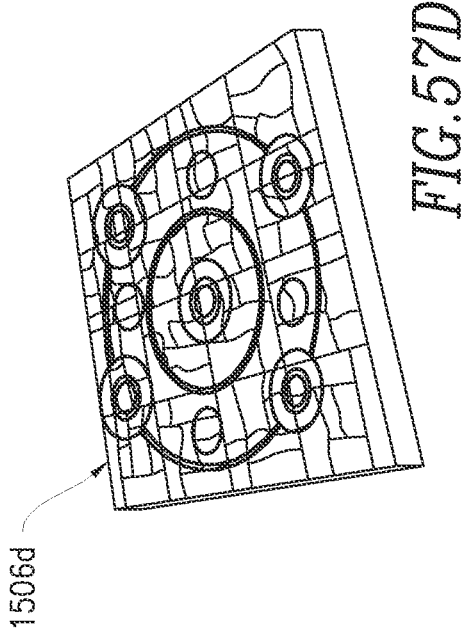

FIGS. 55A and 55B are perspective views of components of the tile game system 100 arranged in an exemplary configuration and illustrating operation of another illuminated tile unit 1506 according to the present disclosure. More specifically, FIG. 55A shows the illuminated tile unit 1506 in a deactivated state and FIG. 55B shows the illuminated tile unit 1506 in an activated state. A control device 1550, for altering operation of the illuminated tile unit 1506, is also shown.

Similar to the illuminated tile unit 506, described in connection with FIGS. 16 and 17, the illuminated tile unit 1506 can include a light permeable decorative skin 1508 positioned on a base 1510, similar to that shown in FIG. 16, having a light source 1512 therein. The light source 1512 could include one or more (e.g., an array of) LED chips, incandescent bulbs, electroluminescent material, or other light-emitting technology, and is configured direct light through (e.g., illuminate) the light permeable decorative skin 1508 positioned thereon. The light permeable decorative skin 1508 can be configured to be removable from the base 1510, or the light permeable decorative skin 1508 and base 1510 could be configured as an integral unit.

The light permeable decorative skin 1508 can be substantially similar to the light permeable skin 508, discussed in connection with FIG. 16. Accordingly, the light permeable decorative skin 1508 can include a decorative side 1516 including an opaque skin area 1519 that prevents the transmission of light and a light permeable skin area 1521 that permits the transmission of light. The light permeable decorative skin 1508 can include a translucent skin area that allows for the transmission of light subject to the characteristics of the material of which light permeable decorative skin 1508 is composed. The light permeable decorative skin 1508 can include physical features formed to represent a plurality of different surface textures and/or terrains. For example, as shown in FIGS. 55A and 55B, the light permeable decorative skin 1508 includes surface topography that emulates a stone floor. The light permeable decorative skin 1508 can also be formed to emulate natural terrain formations such as rocks, boulders, lava flows, water flows, pools, vegetation, etc. and built formations such as ruins, architecture, and other non-naturally occurring voluminous formations.

The illuminated tile unit 1506 can be coupled to an external power source (e.g., power source 522 described in connection with FIGS. 16 and 17) for powering the illuminated tile unit 1506 (e.g., providing power to an array of LED lights). Additionally, or alternatively, the illuminated tile unit 1506 can include an internal power source 1522 (e.g., one or more batteries) driving the light source 1512, making the illuminated tile 1506 a self-contained unit.

As shown in FIG. 55B, the tile game system 100 can include a control device 1550 configured to alter operation of the illuminated tile unit 1506. According to one non-limiting example, the illuminated tile unit 1506 can include a magnetically actuated switch 1515, such as a reed switch, a Hall-effect sensor, etc., and control circuitry 1524 coupled to the light source 1512 to control operation thereof and the control device 1550 can include a magnet 1552 or other means for generating a magnetic field. To encourage a user's immersion into the fantasized world depicted by elements of the tile game system 100, the control device 1550 can be designed to represent various objects germane to the world. For example, as shown in FIG. 55B, the control device 1550 can be formed to depict a wizard's staff and the magnet 1552 can be located at a distal end thereof. Accordingly, a user can initiate and/or control various lighting effects of the illuminated tile unit 1506, which appear to be magical and created with the wizard's staff. It should be understood that the control device 1550 can be formed to depict other in-game objects, such as, but not limited to, wands, rings, tokens, crystals, jewels, figures/characters, and the like without departing from the spirit and scope of the present disclosure.

A user can alter operation of the light source 1512 by moving the magnet 1552 of the control device 1550 into proximity with the switch, such as reed switch 1515, located within the illuminated tile unit 1506. Furthermore, a plurality of operations, behaviors, or routines, can be programmed into the control circuitry 1524 of the illuminated tile unit 1506 in order to illicit a particular action based on a control signal received from the reed switch 1515. As such, a user can cycle through pre-programmed operations with each subsequent magnetic activation of the switch 1515 by the control device 1550. For example, the control circuitry 1524 could be configured with a "momentary" switch behavior such that moving the magnet 1552 of the control device 1550 into proximity with the reed switch 1515 causes the light source 1512 to illuminate and removing the magnet 1552 from proximity with the reed switch 1515 causes the light source 1512 to deactivate. Alternatively, the control circuitry 1524 could be configured with a "latching" switch behavior such that moving the magnet 1552 of the control device 1550 into (and out of) proximity with the reed switch 1515 a first time causes the light source to illuminate and moving the magnet 1552 of the control device 1550 into proximity with the reed switch 1515 a second time causes the light source 1512 to deactivate. The control circuitry 1524 of the illuminated tile unit 1506 can also be configured to alter additional parameters (e.g., colors, patterns, etc.) of the light source based on a control signal received from the reed switch 1515. Accordingly, a user can cycle through, and select from, a plurality of colors and/or patterns produced by the light source by repeatedly moving the magnet 1552 of the control device 1550 into, and out of, proximity with the reed switch 1515. For example, the control circuitry could be configured such that subsequent signals from the switch 1515 cause the light source 1512 to behave as follows: 1) ON+BLUE LIGHT CONSTANT; 2) ON+BLUE LIGHT PULSE; 3) ON+RED LIGHT CONSTANT; 4) ON+RED LIGHT PULSE; AND 5) OFF. Other configurations of the control circuitry and electronic behavior can be employed.

According to some embodiments of the present disclosure, in to avoid operation cycling, the illuminated tile unit 1506 could be provided with a plurality of spatially distinct (e.g., separated) switches 1515, each corresponding to one or more specific operations. For example, a first switch 1515 located at the top right corner of the illuminated tile unit 1506 could activate ON+RED LIGHT PULSE, and a second switch 1515 located at the bottom left hand corner of the illuminated tile unit 1506 could activate ON+BLUE LIGHT CONSTANT. Additional features of the tile game system 100 of the present disclosure can be similarly controlled by way of one or more magnetic switches 1515. For example, a user can control sounds produced by a speaker, videos or images produced by a display device, or any other electronically controllable game features disclosed herein.

FIGS. 56A and 56B are perspective views of components of the tile game system 100 illustrating an exemplary operation of the illuminated tile unit 1506 according to the present disclosure. Specifically, FIG. 56 shows a control device 1550 positioned outside of an activation area, indicated by dashed lines 1556, and FIG. 56B shows the control device 1550 positioned partially within the activation area 1556. As shown, the control device 1550 can be configured as a game piece (e.g., a figure) having a base 1554 with a magnet 1552 positioned therein and the illuminated tile unit can 1506 can have an activation area 1556, which can be defined by placement of one or more switches 1515 in the base of the illuminated tile unit 1506. Accordingly, when the FIG. 1550 is moved into the activation area 1556, as shown in FIG. 56B, the magnet 1552 in the base 1554 actuates the switch 1515 in the illuminated tile unit 1506 and causes the one or more light sources 1512 to illuminate.

As shown in FIGS. 57A-57E, the tile game system 100 of the present disclosure can include a plurality if illuminated tile units 1506a-e having a plurality of light permeable decorative skins 1508a-e, with different types of illuminating patterns. Furthermore, a first light permeable decorative skin 1508 can be removed from a base 1510 of an illuminated tile unit 1506 and replaced with a second light permeable decorative skin 1508 having a different illuminating pattern, such that consumers have the ability to utilize a plurality of different replaceable light-permeable decorative skins 1508, without requiring replacement of the base 1510 of the illuminated tile unit 1506, and thereby enjoying the light-transmitting functionality, while limiting the consumer cost associated with the investing in a plurality of bases 1510 for each illuminated tile unit 1506 of the tile game system 100.

Figure 58:
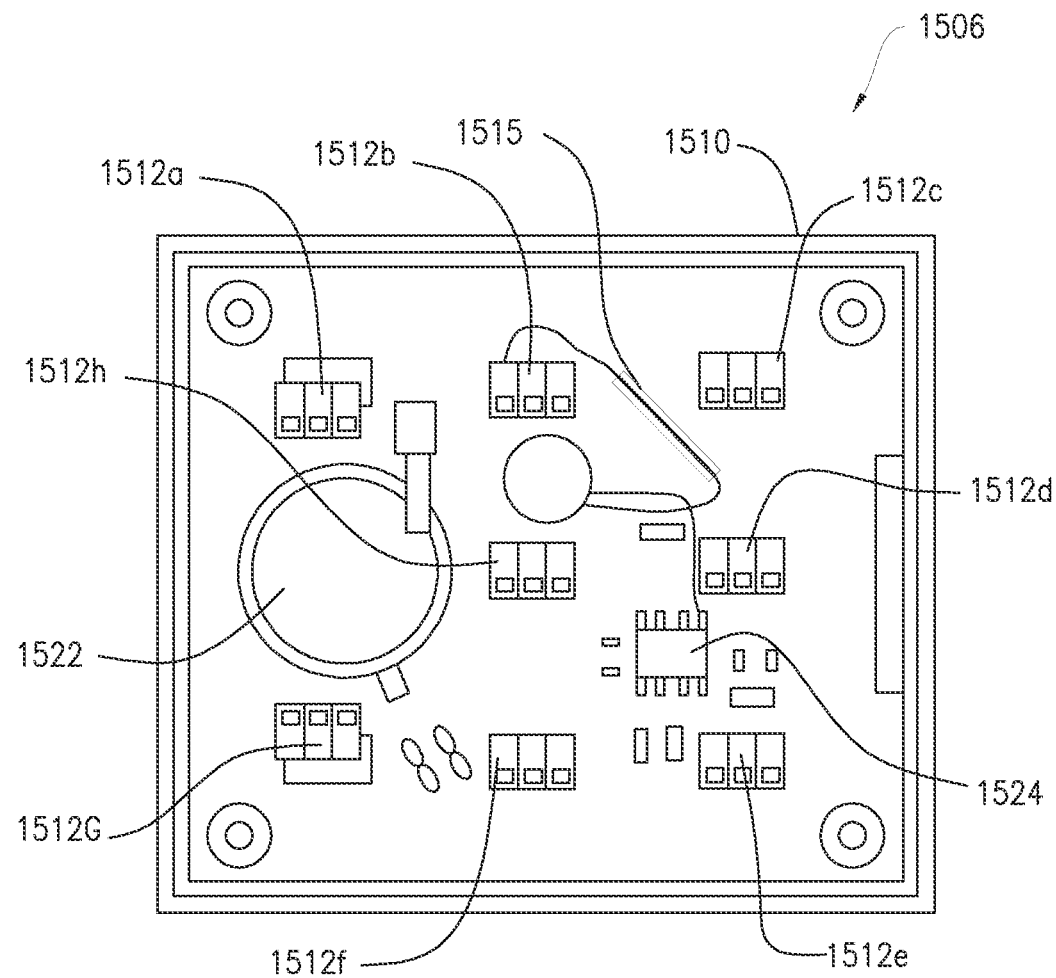
FIG. 58 is a top view of a base of an illuminated tile unit according to the present disclosure illustrating internal components thereof.

FIG. 58 is a diagram illustrating components of the base 1510 of the illuminated tile unit 1506 arranged in an exemplary configuration according to the present disclosure. As shown, the base 1510 includes a plurality of light sources 1512a-h (e.g., RGB LEDs), a switch 1515 (e.g., a reed switch, Hall-effect sensor), an internal power source 1522 (e.g., a battery), and control circuitry 1524 (e.g., an integrated circuit).

As discussed herein, the switch 1515 can be a magnetically actuated switch, such as a reed switch Hall-effect sensor, or can be another form of sensor allowing for contactless activation, such as a proximity sensor or RFID circuit. It should be understood that a reed switch is activated by the presence of a magnetic field, whereas a Hall-effect sensor can determine the magnitude and polarity of a magnetic field. While both types reed switches and Hall-effect sensors can function as a switch, unique characteristics of Hall-effect sensors can provide additional game play value. For example, since a Hall-effect sensor can recognize N and S polarity, this polarity can be used to identify sides of the control device 1550 (e.g., wand), or any physical totem used for activation of the switch 1515. As such, orientation makes a difference in game play. In one example, a first end of the control device 1550 can be used to activate one or more specific illuminated tile units 1506 and a second end of the control device 1550 can be used to activate one or more different illuminated tile units 1506.

According to another exemplary embodiment, because a Hall-effect sensor can determine the magnitude of a magnetic field, the distance between the control device 1550 tip and the sensor 1515 is determined and acts as an input metric to the control circuitry 1524, such that varying distance between the control device 1550 tip and the sensor 1515 functions as human interface control knob, or slider. Thus, as the magnetic field strengthens with movement of the control device 1550 tip towards the sensor 1515, intensity of LED light 1512, for example, could also increase to a level commensurate with required game play, for example, low illumination indicating fading powers of a character and strong illumination indicating heightened strength.

In some embodiments, a Hall-effect sensor 1515 can also be used determines orientation (e.g., rotation) relative to a changing magnetic field. For example, the Hall-effect sensor 1515 can be used in connection with the control circuitry 1524 to determine the rotation of a figure having a magnet in its base (see, e.g., control device 1550 described in connection with FIGS. 56A and 56B) relative to the illuminate tile unit 1506, or other game tile unit provided with a Hall-effect sensor, and the rotation of the figure can be used as an input to control other aspects of the game. For example, rotating the base of the figure could function as a control knob. Additionally, with respect to the control device 1550 (e.g., game figure) described in connection with FIGS. 56A and 56B, a figure with a sufficiently strong magnetic field positioned around the illuminated tile unit 1506 (e.g., outside of the activation field 1556), can dynamically affect the function of the illuminated tile unit 1506 based on the figure's distance and/or orientation relative thereto.

According to other aspects of the present disclosure, one or more of the illuminated tile units 1506a-e can be coupled together such that a plurality of units 1506 can be controlled by (e.g., slaved to) a single control unit 1524, or an external controller), whether by direct connection, RF, Bluetooth, Wi-Fi, IR, or other communication protocol that has the ability to synchronize light function change on the plurality of illuminated tile units 1506. For example, a plurality of illuminated tile units 1506 can be placed in adjacent positions and communicatively coupled to each other and a plurality of respective replaceable light-permeable decorative skin pieces 1508 can be configured with decorative side 1516 designs representative of a unified path of flow. This unified path of flow can be presented as naturally occurring flows, including but not limited to, lava flows, water flows, and in the world of fantasy, energy flows, fire flow, ice flows, electricity flows, stone path flows, crystal flows, organic matter flows, and the like. These flows can also be presented as non-natural occurring flows, including but not limited to, built pathways or architectures represented as stone, masonry, steel or other built items of a modern, futuristic, fantastic, or ancient styles. Accordingly, a user can control illumination for the entire path of flow by actuating a reed switch 1515 in one or more of the plurality of units 1506, using the control device 1550, as described herein.

As shown, The depth of the illuminated tile unit 1506, including both the light permeable decorative skin 1508 and base 1510, can be approximately equal to the depth of a modular base tile of the present disclosure (e.g., tiles 102, 104, or 106 shown in FIG. 1), such that the illuminated tile unit 1506 can be positioned adjacent to other tiles to form a (e.g., visually) continuous gameplay surface. For example, if the depth of modular base tile 102 is 8 mm and the base 1510 of the illuminated tile unit 1506 is 6 mm, then the light permeable decorative skin 508 can be 2 mm. Conversely, if the light permeable decorative skin 508 is 6 mm, then the base 1510 of the illuminated tile unit 1506 can be approximately 2 mm.

Likewise, the illuminated tile unit 1506 can be configured in a plurality of different sizes that are compatible with other modular base tiles of the present disclosure, such that the illuminated tile unit 1506 can be positioned adjacent to other tiles to form a continuous gameplay surface. For example, as shown in FIGS. 55A and 55B, the illuminated tile unit 1506 can be configured as a 4×4 grid-square unit. The illuminated tile unit 1506 can also be configured as square tiles having other dimensions (e.g., 1×1, 2×2, 3×3, 5×5, etc.), rectangular tiles (e.g., such as 1×2, 1×3, 2×3, 2×4, etc.), "V" or "L" shaped tiles, as well as other tile shapes and configurations, without departing from the spirit and scope of the present disclosure.

Figure 59B:
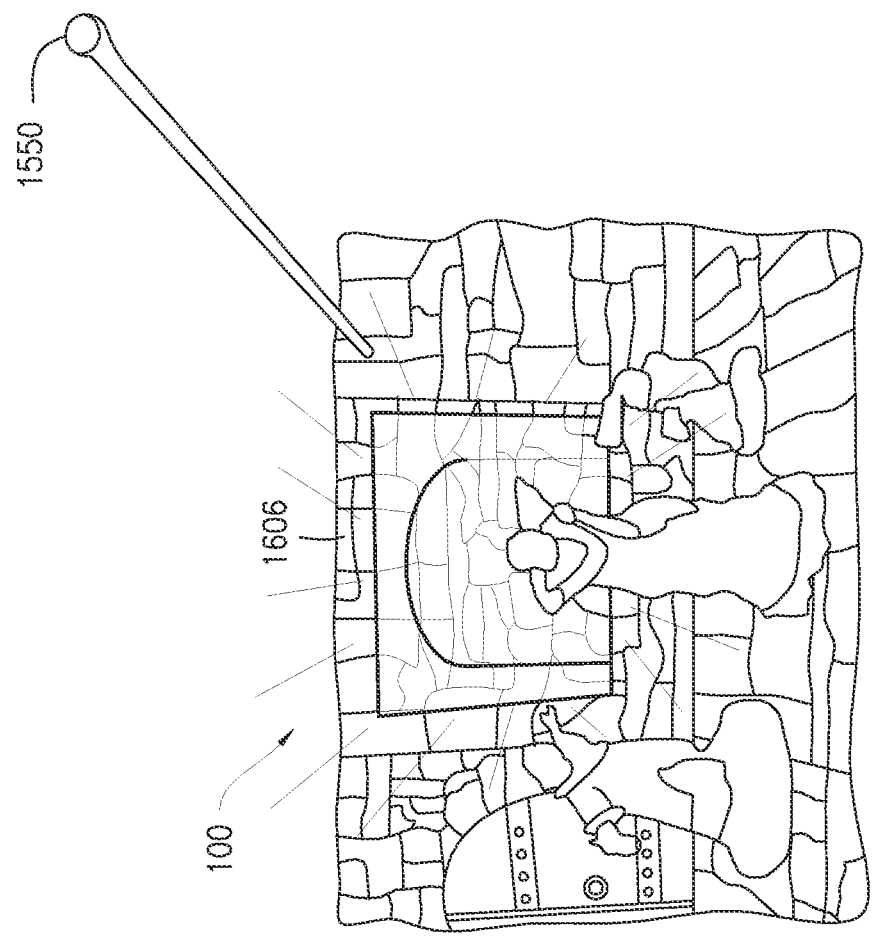
FIG. 59B is a perspective view illustrating the illuminated tile unit of FIG. 59A in an activated state.
Figure 59A:
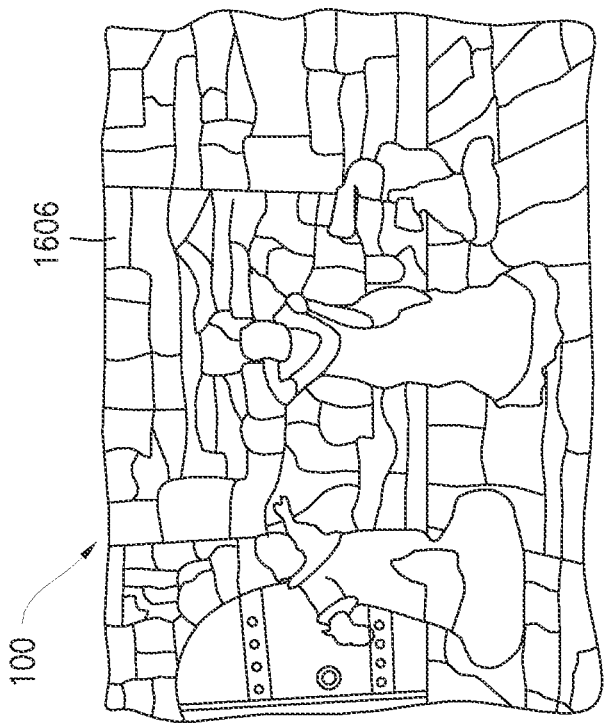
FIG. 59A is a perspective view of components of the tile game system of the present disclosure arranged in an exemplary configuration including an illuminated wall unit in a deactivated state.
Figure 60:
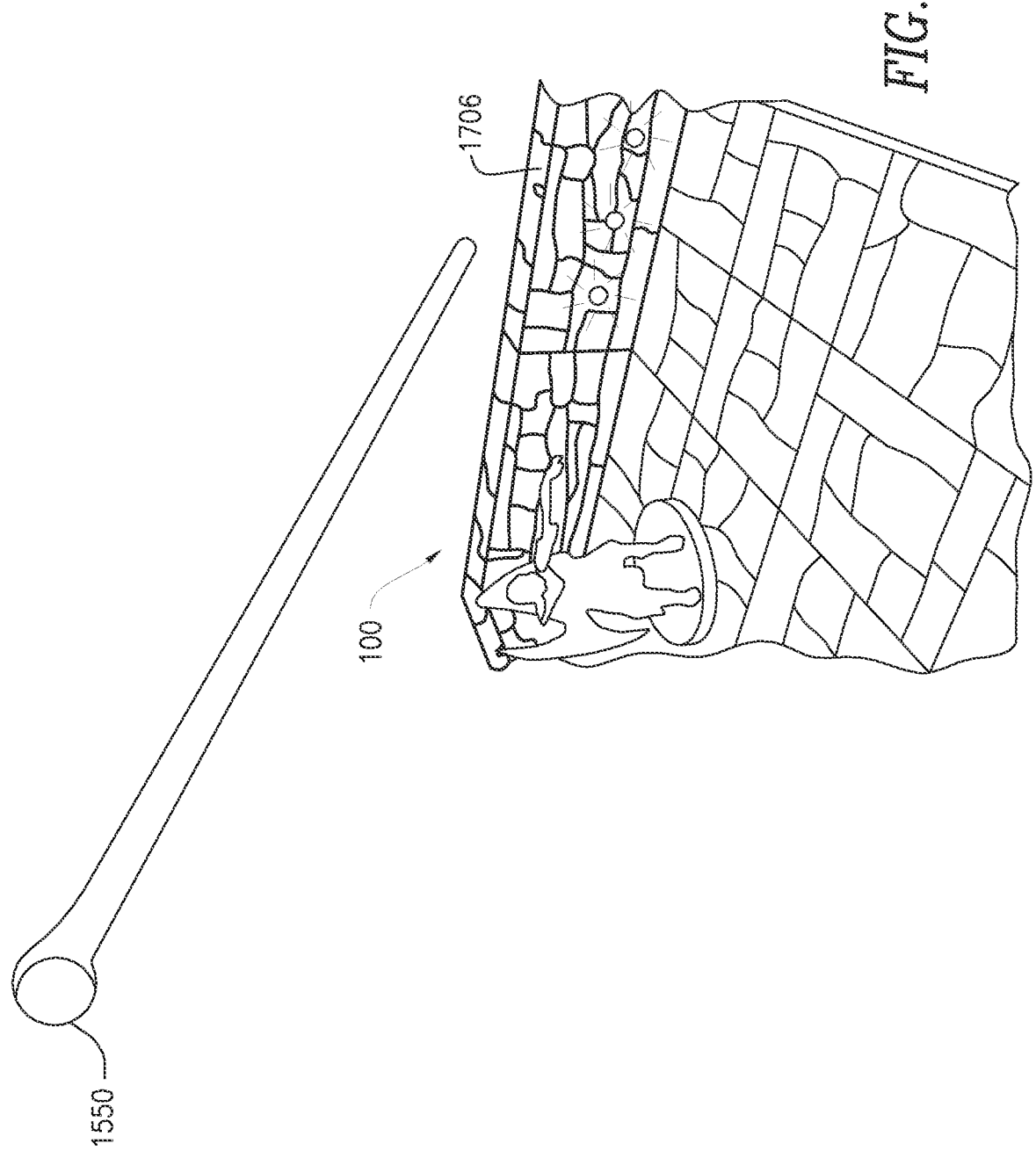
FIG. 60 is a perspective view of components of the tile game system of the present disclosure arranged in an exemplary configuration including an illuminated exterior boundary unit in an activated state.

FIGS. 59A-60 illustrate operation of additional magnetically activated illuminated components of the tile game system 100 according to the present disclosure. More specifically, FIG. 59A is a perspective view of components of the tile game system 100 arranged in an exemplary configuration, including a magnetically activated illuminated wall unit 1606 in a deactivated state and FIG. 59B is a perspective view showing the components of FIG. 59A, including the wall unit 1606 in an activated state. The illuminated wall unit 1606 can include a plurality of light sources that, when activated, depict an illuminated arch, and when the light sources are deactivated, the illuminated wall unit appears to be an ordinary rock wall. FIG. 60 is a perspective view of components of the tile game system 100 arranged in an exemplary configuration, including a magnetically activated illuminated exterior boundary unit 1706 in an activated state. The illuminated exterior boundary unit 1606 can include a plurality of light sources that, when activated, illuminate the boundary, and when the light sources are deactivated, the illuminated wall unit appears to be an ordinary rock wall.

It should be understood that the illuminated wall unit 1606 and the illuminated exterior boundary unit 1706 can function similar to the illuminated tile unit 1506, described in connection with FIGS. 55A-58, but can arranged in a vertical orientation, and can be activated by the control device 1550. Accordingly, illuminated wall unit 1606 and the illuminated exterior boundary unit 1706 can each include a plurality of light sources (e.g., RGB LEDs), a switch (e.g., a reed switch), an internal (e.g., a battery) or external power source, and control circuitry (e.g., an integrated circuit). Additionally, the illuminated wall unit 1606 and the illuminated exterior boundary unit 1706 can each include a base portion enclosing the foregoing components and a light permeable decorative skin, allowing illumination therethrough, or base and light-permeable skin could be formed as an integral unit. It should also be understood that the illuminated wall unit 1606 and the illuminated exterior boundary unit 1706 can be configured to be activated from an interior face (e.g., faces visible in FIGS. 59A-60), an exterior face (e.g., faces opposite those visible in FIG. 59A-60), or both. The illuminated wall unit 1606 and the illuminated exterior boundary unit 1706 can also include one or more of the connection mechanisms described herein for engaging the illuminated wall unit 1606 and the illuminated exterior boundary unit 1706 with one or more additional components of the tile game system 100.

FIGS. 61A-61D are top views of components of the tile game system 100 arranged in an exemplary "Canyon Run" configuration and illustrating operation of a plurality of illuminated tile units 1506a-c according to the present disclosure. A plurality of 2×2 game tiles, including illuminated tile units 1506a-c and one or more additional game tile units disclosed herein, can be joined together to form a large play area, such as the 4×12 play area shown. The elongated nature of the play area creates, what is often called in game nomenclature, a "Canyon Run" (hereinafter canyon 1800). It should be understood that while the canyon 1800 shown in FIGS. 61A-61D is formed from individual 2×2 game tiles, the canyon 1800 could also be formed from 4×4 game tiles, a single 4×12 game tile, or other sizes of game tiles without departing from the spirit and scope of the present disclosure. It should also be understood that the canyon run configuration shown in FIGS. 61A-61D is for illustrative purposes and, as such, can include additional, or fewer, illuminated tile units 1506.

Figures 61A, 61B, 61C, 61D:
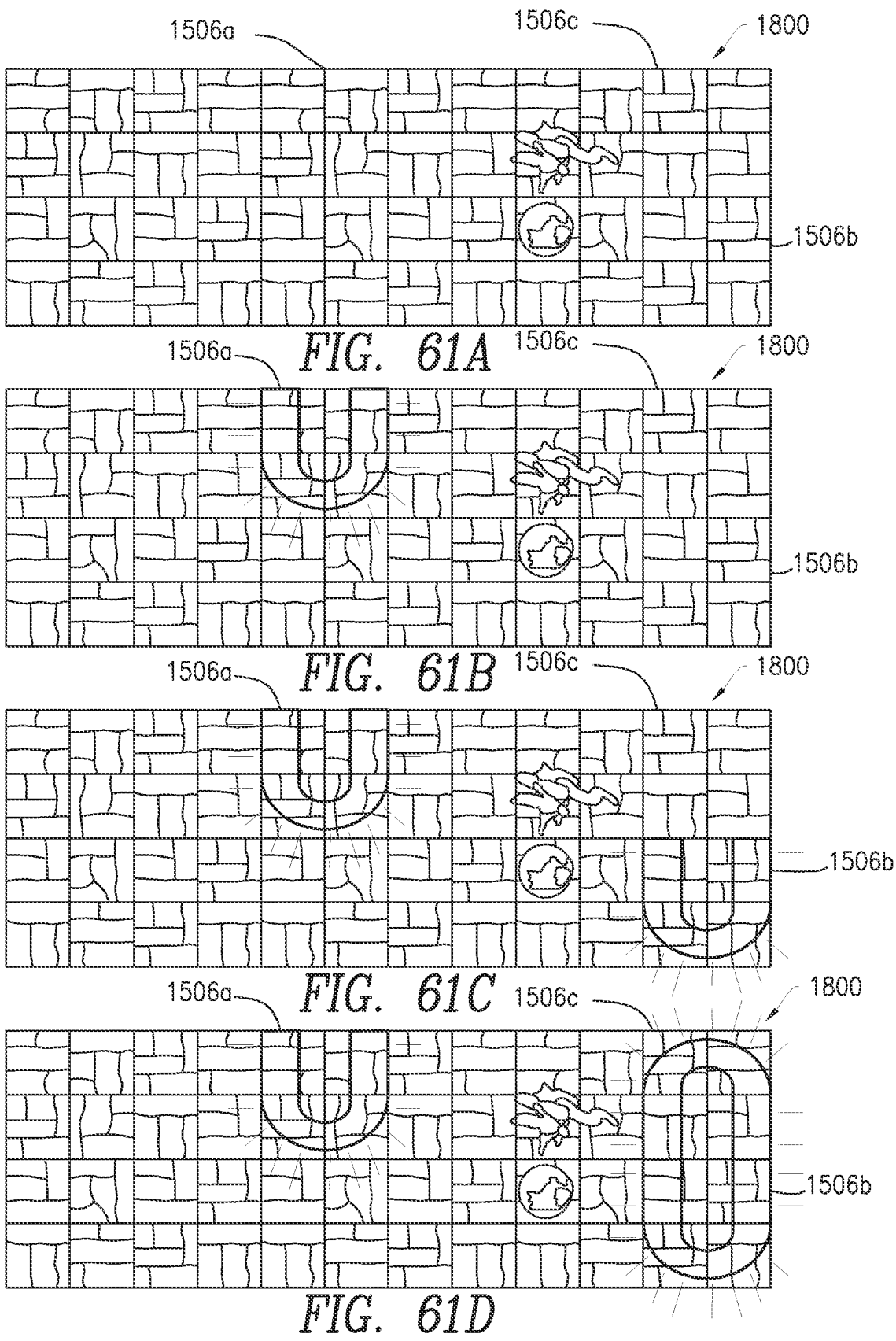
FIGS. 61A, 61B, 61C and 61D are top views of components of the tile game system of the present disclosure arranged in an exemplary configuration including a plurality of illuminated tile units.

A plurality magnetic sensors 1515 (not shown) are positioned throughout the game play area of the canyon 1800. For example, the sensors 1515 can be positioned within particular 1×1 grid areas of game tiles, the sensors 1515 can be centrally positioned within 2×2 tiles (see, e.g., FIGS. 56A and 56B), and/or multiple sensors could be positioned in a 2×2 game tile, each corresponding to particular 1×1 grid area thereof. Accordingly, a user, player, dungeon master, game director, etc., can create dynamic, immersive storytelling as he/she/they illuminate sections of the canyon 1800 to create unexpected obstacles for players to traverse. As the story develops, these obstacles can be removed, or increased, using the control device 1550 (not shown) to actuate the sensors 1515, as described herein. For example, at the beginning of gameplay none of the illuminated tile units 1506a-c are activated, as shown in FIG. 61A. A user can then use the control device 1550 to activate illuminated tile unit 1506a, as shown in FIG. 61B, can subsequently activate illuminated tile unit 1506b, as shown in FIG. 61C, and can subsequently activate illuminated tile unit 1506c, as shown in FIG. 61D.

Figure 62:
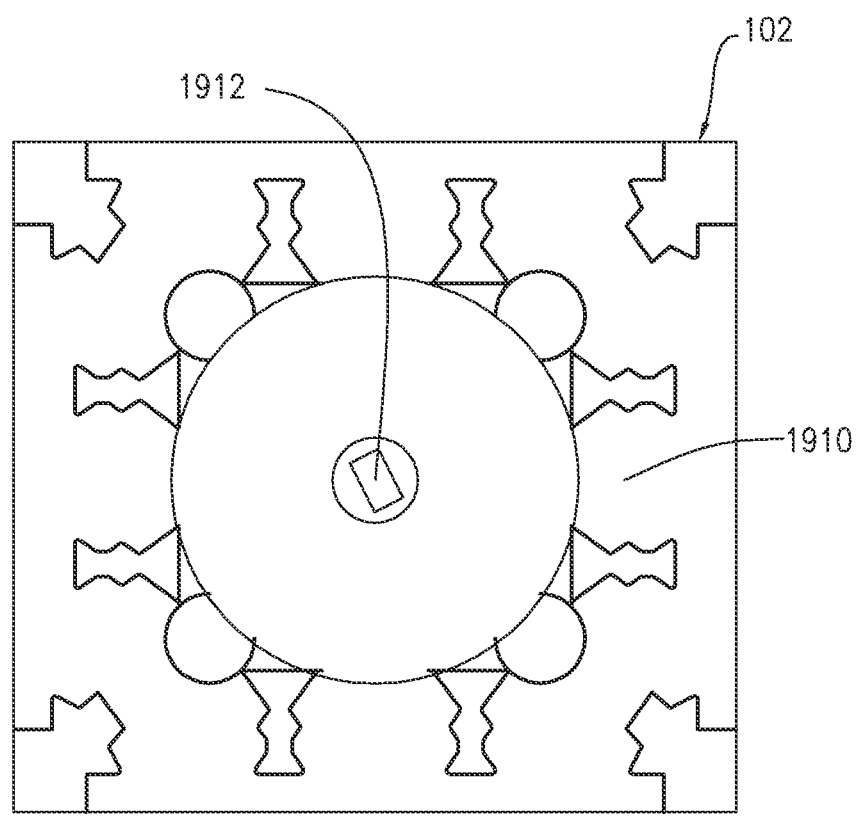
FIG. 62 is a top view of a game tile unit according to the present disclosure including a modular illumination unit positioned therein.

FIG. 62 is a diagram showing a modular illumination unit 1910 positioned within a game tile 102 (see, e.g., FIG. 5) according to the present disclosure. The modular illumination unit can include the functionality of the illuminated tile units 1506 described herein (e.g., activation by the control device 1550) and can be configured to be removably positioned within a cavity 101 of the game tile 102, or within similar cavities of one or more game tiles or components disclosed herein, thereby enhancing the functionality of the game tile 102 and providing illumination thereof. Accordingly, the modular illumination unit 1910 can include one or more light sources 1912 (e.g., RGB LEDs), a switch (e.g., a reed switch, Hall-effect sensor, proximity sensor, RFID circuit, etc.) that can be actuated by the control device 1550, an internal power source (e.g., a battery), and control circuitry (e.g., an integrated circuit).

Figure 63:
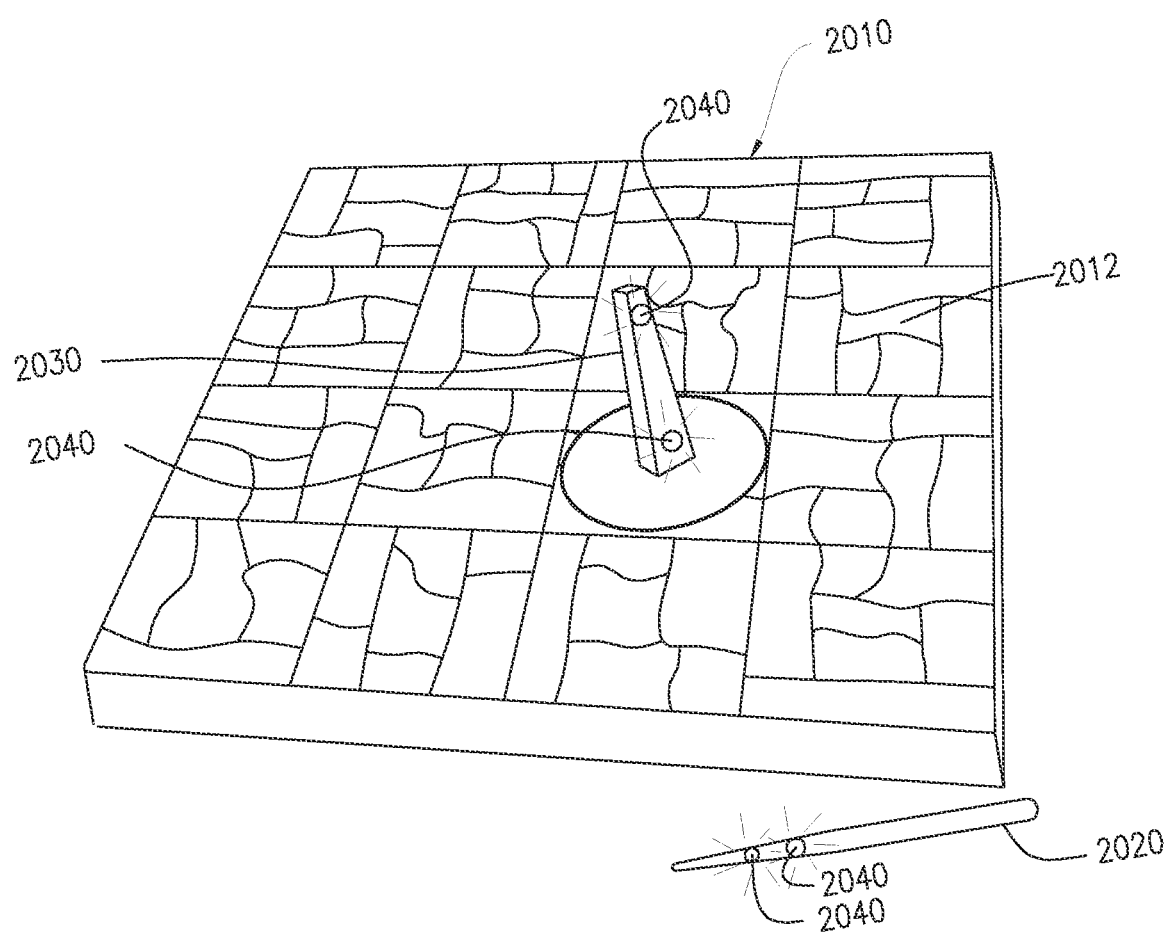
FIG. 63 is a perspective view of the tile game system according to the present disclosure having wireless power transfer components arranged in an exemplary configuration.
Figure 64:
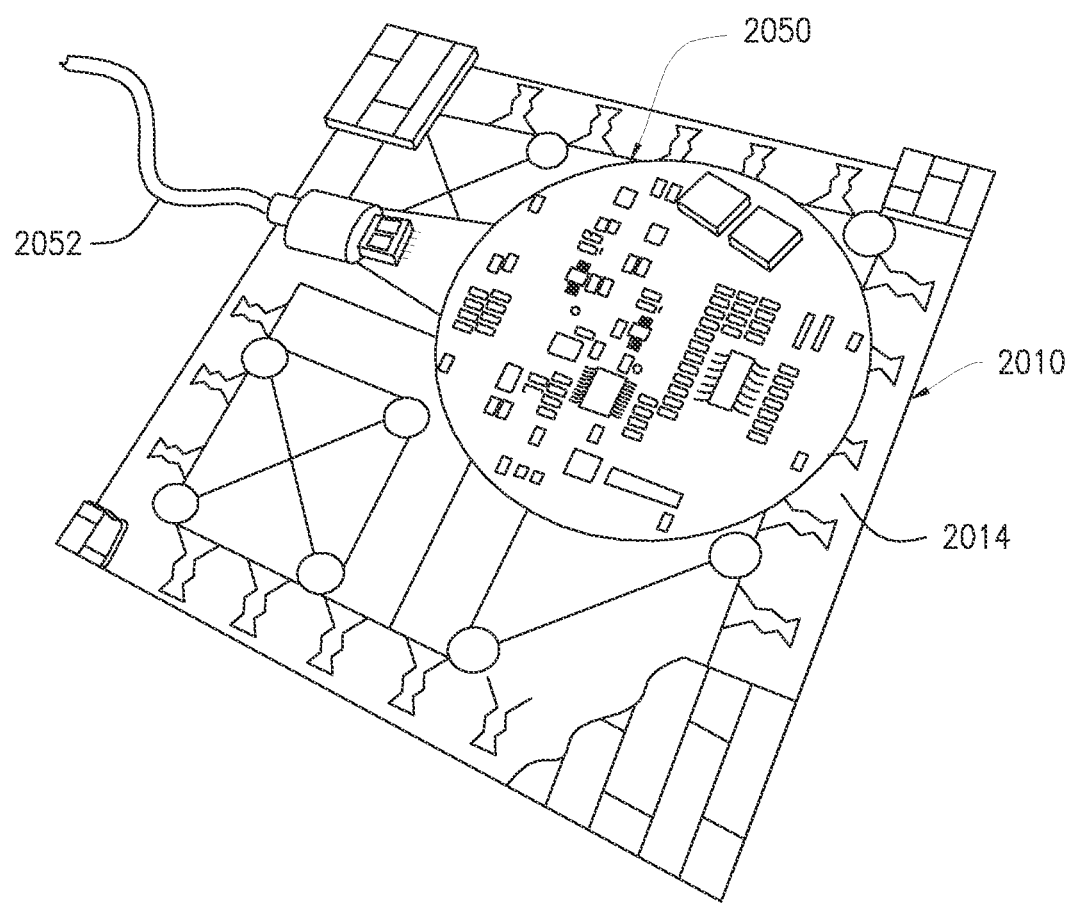
FIG. 64 is a perspective view illustrating components of a game tile having wireless power transfer components therein.
Figure 65:
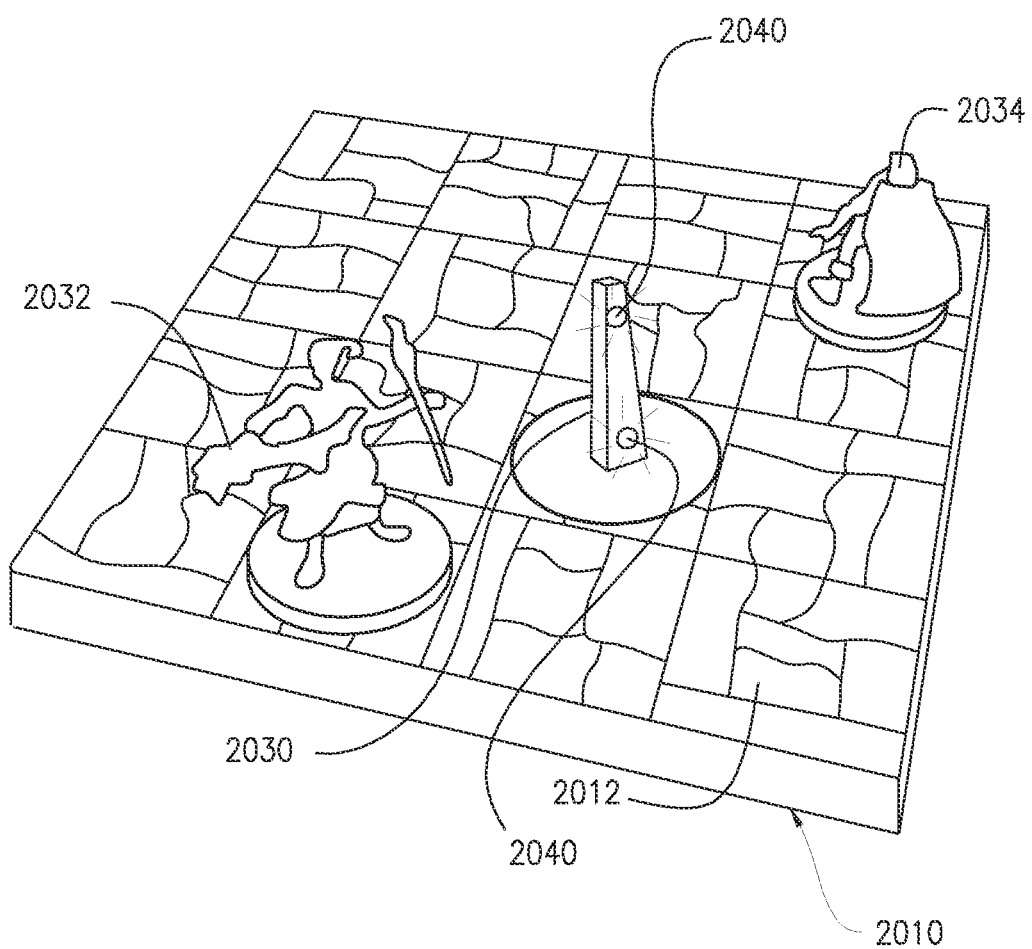
FIG. 65 is a perspective view of the tile game system according to the present disclosure having wireless power transfer components arranged in an exemplary configuration.

In another embodiment, as shown in FIGS. 63-65, a tile section 2010 is shown. Also shown is a wand 2020, and a game piece 2030, each of which may have one or more wireless receivers, such as receiver LEDs 2040, which include an LED and circuitry that is powered by induction, for example by a wireless power transmitter, such as a tile-based power transmitter. One or more receiver LEDs 2040 could be embedded in a game piece 2030, which could be a miniature figure, and one or more receiver LEDs 2040 could be embedded in a wand 2020, for example, at or near the tip of the wand 2020. The receiver LEDs 2040 can respond to the power transmitter when the receiver LEDs 2040 are located at certain positions on a tile section 2010.

Alternatively, or additionally, wand 2020 could have a wand power transmitter, not shown, that could actuate receiver LEDs 2040 in a game piece 2030 when the wand power transmitter in the wand 2020 is charged and positioned proximate to the receiver LEDs 2040 to inductively power the receiver LEDs 2040 in the game piece 2030.

As shown in FIGS. 63 and 64, a tile 2010 can have a standard appearance on an upper surface 2012 for supporting a game piece 2030 thereon, and can have a wireless power transmitter circuit 2050 attached to an underside 2014 of tile 2010. The power transmitter circuit 2050 can have a charging surface positioned at the underside 2014 of the tile 2010 to create an induction charging field on and above the upper surface 2012, or portions thereof, of the tile 2010. The wireless power transmitter circuit 2050 can have a power cord 2052 and a plurality of electronic components to create an induction field that can electrify or illuminate items that include induction illumination features. For example, a game piece or a wand can include one or more receiver LEDs 2040 which are illuminated when positioned over or proximate to the wireless power transmitter circuit 2050, so as to light-up or flash. Any suitable wireless charging circuit can be used, such as the wireless charger made and sold by Yootech, for example, model number F500. Such a circuit can energize receiver LEDs 2040 to cause same to flash or otherwise respond to the wireless power transmitter circuit 2050.

FIG. 65 shows tile 2010 with top surface 2012 with game piece 2030, and FIGS. 2032 and 2034, thereon. Game piece 2030 includes receiver LEDs 2040 that are illuminated because the game piece 2030 is positioned over a wireless power transmitter circuit (not shown) positioned under the top surface 2012 of tile 2010. As with any electronic apparatus disclosed herein, the power source can be A/C or D/C and can be obtained from batteries or from an outlet through a wire.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A modular tile game system with one or more game tiles and illuminating components, comprising:
   at least one modular illuminated unit of a tile game configured to be removably attached to one or more adjacent game tiles, the modular illuminated unit housing at least one light source, at least one contactless switch, a power source, and a controller coupled to the at least one light source, the at least one contactless switch, and the power source;
   at least one game figure on a game tile;
   at least one control device, external to the at least one game figure, configured to directly actuate the contactless switch;
   the contactless switch configured to transmit a control signal to the controller when in proximity to the control device; and
   the controller adapted to alter operation of the at least one light source in response to the control signal from the contactless switch.

2. The tile game system of claim 1, wherein the at least one contactless switch comprises a magnetically activated switch and the control device generates a magnetic field.

3. The tile game system of claim 2, wherein the magnetically activated switch comprises a reed switch.

4. The tile game system of claim 2, wherein the magnetically activated switch comprises a Hall-effect sensor.

5. The tile game system of claim 1, wherein the modular illuminated unit is an illuminated tile unit.

6. The tile game system of claim 1, wherein the modular illuminated unit is an illuminated wall unit.

7. The tile game system of claim 1, wherein the modular illuminated unit is an illuminated boundary unit.

8. The tile game system of claim 2, wherein the control device is a wand.

9. The tile game system of claim 2, wherein the at least one game figure includes a light source therein.

10. The tile game system of claim 2, wherein the magnetically activated switch defines an activation area on a portion of a surface of the modular illuminated unit.

11. The tile game system of claim 1, wherein the control device includes one or more actuation mechanisms.

12. The tile game system of claim 1, wherein the control device includes a light source.

13. The tile game system of claim 8, wherein the wand includes one or more actuation mechanisms.

14. The tile game system of claim 8, wherein the wand includes a magnet at a first end thereof.

15. The tile game system of claim 8, wherein the wand includes a light source.

* * * * *